United States Patent
Ukita et al.

(10) Patent No.: US 8,675,490 B2
(45) Date of Patent: Mar. 18, 2014

(54) COMMUNICATION BANDWIDTH CONTROL DEVICE AND COMMUNICATION BANDWIDTH CONTROL METHOD

(75) Inventors: Yosuke Ukita, Osaka (JP); Yosuke Matsushita, Osaka (JP); Hideki Homma, Osaka (JP)

(73) Assignee: Panasonic Corporation, Osaka (JP)

( * ) Notice: Subject to any disclaimer, the term of this patent is extended or adjusted under 35 U.S.C. 154(b) by 597 days.

(21) Appl. No.: 13/001,176

(22) PCT Filed: Apr. 19, 2010

(86) PCT No.: PCT/JP2010/002820
§ 371 (c)(1),
(2), (4) Date: Dec. 23, 2010

(87) PCT Pub. No.: WO2010/125761
PCT Pub. Date: Nov. 4, 2010

(65) Prior Publication Data
US 2011/0110235 A1    May 12, 2011

(30) Foreign Application Priority Data
May 1, 2009    (JP) .................................. 2009-111843

(51) Int. Cl.
*H04W 36/22* (2009.01)
(52) U.S. Cl.
USPC .......... 370/235; 370/229; 370/231; 379/90.1; 379/100.01
(58) Field of Classification Search
USPC .......... 370/229–231, 235; 379/90.01, 100.01, 379/100.09
See application file for complete search history.

(56) References Cited

U.S. PATENT DOCUMENTS

| 2003/0172183 | A1* | 9/2003 | Anderson et al. ............. 709/245 |
| 2007/0263818 | A1* | 11/2007 | Sumioka et al. ......... 379/201.01 |
| 2008/0002741 | A1* | 1/2008 | Maheshwari et al. ........ 370/473 |

FOREIGN PATENT DOCUMENTS

| JP | 10-145424 | 5/1998 |
| JP | 2000-244524 | 9/2000 |
| JP | 2002-118588 | 4/2002 |
| JP | 2010-74653 | 4/2010 |

OTHER PUBLICATIONS

International Search Report issued Jul. 20, 2010 in corresponding International Application No. PCT/JP2010/002820.
Ken Nakajima et al., "QoS control of video distribution service in home network", IEICE Technical Report NS2008-125 to 142 [Network System], Jan. 15, 2009, vol. 108, No. 392, pp. 73-78 (with English abstract).

* cited by examiner

*Primary Examiner* — Un C Cho
*Assistant Examiner* — Siming Liu
(74) *Attorney, Agent, or Firm* — Wenderoth, Lind & Ponack, L.L.P.

(57) ABSTRACT

The present invention can prevent a fuzzy image, which is caused due to insufficient bandwidth when the bandwidth necessary for transmitting a content cannot be secured, to be displayed on a display device. When a relay apparatus (100) receives, from a DNS server, a DNS response packet regarding a domain name of a server which transmits a content, a condition judging section (210) in the relay apparatus (100) judges whether a required bandwidth for the content corresponding to the domain name can be secured in a communication path connecting to another relay apparatus (100). If the condition judging section (210) judges that the required bandwidth cannot be secured, a DNS modifying section (250) in the relay apparatus (100) rewrites a reply IP address included in the DNS response packet to an IP address of the relay apparatus (100).

9 Claims, 42 Drawing Sheets

Fig.4

| REGISTRATION NO. | DNS INQUIRY NAME (DOMAIN NAME) | SERVICE PARAMETER | | |
|---|---|---|---|---|
| | | SERVICE NAME | TRANSFER RATE (bps) | LAYER 4 PROTOCOL |
| 1 | xx.yy.tv | TV PROGRAM DISTRIBUTION BY COMPANY X | 10M | TCP |
| 2 | abc.xyz.com | VIDEO DISTRIBUTION BY COMPANY A | 6M | UDP |
| 3 | zzz.ddd.tv | TV PROGRAM DISTRIBUTION BY COMPANY Z | 15M | TCP |
| 4 | def.sss.com | VIDEO DISTRIBUTION BY COMPANY D | 10M | UDP |
| 5 | ghi.bb.com | VIDEO DISTRIBUTION BY COMPANY G | 25M | TCP |

Fig.8

| zzz.ddd.tv | 1 | ... | 30 | ... | 10.20.30.1 | ... |

Fig.9

| ... |
| zzz.dddd.tv |
| 1 |
| ... |
| 0 |
| ... |
| 100.200.11.1 |
| ... |

Fig.16

| REGISTRATION NO. | DATA IDENTIFICATION PARAMETER | | | DATA GUARANTEE PARAMETER |
|---|---|---|---|---|
| | TRANSMISSION SOURCE IP ADDRESS | DESTINATION IP ADDRESS | Layer 4 Protocol | REQUIRED BANDWIDTH (bps) |
| 1 | 10.20.30.1 | 192.168.0.8 | TCP | 10M |
| 2 | 50.40.30.1 | 192.168.0.7 | UDP | 6M |
| 3 | | | | |
| ‥ | | | | |

Fig.17

| CURRENT TOTAL COMMUNICATION BANDWIDTH (bps) | | 30M |
|---|---|---|
| CURRENTLY USED COMMUNICATION BANDWIDTH (bps) | REGISTRATION NO.1 | 10M |
| | REGISTRATION NO.2 | 6M |
| | ... | ... |
| | TOTAL | 16M |
| AVAILABLE COMMUNICATION BANDWIDTH (bps) | | 14M |

Fig.26

| zzz.ddd.tv | 1 | ... | 0 | ... | 192.168.0.249 | ... |

Fig.29

| REGISTRATION NO. | DNS INQUIRY NAME (DOMAIN NAME) | SERVICE PARAMETER | | | |
|---|---|---|---|---|---|
| | | SERVICE NAME | TRANSFER RATE (bps) | Priority | LAYER 4 PROTOCOL |
| 1 | xx.yy.tv | TV PROGRAM DISTRIBUTION BY COMPANY X | 10M | 7 | TCP |
| 2 | abc.xyz.com | VIDEO DISTRIBUTION BY COMPANY A | 6M | 4 | UDP |
| 3 | zzz.ddd.tv | TV PROGRAM DISTRIBUTION BY COMPANY Z | 15M | 6 | TCP |
| 4 | def.sss.com | VIDEO DISTRIBUTION BY COMPANY D | 10M | 3 | UDP |
| 5 | ghi.bb.com | VIDEO DISTRIBUTION BY COMPANY G | 25M | 5 | TCP |

Fig.30

| REGISTRATION NO. | DATA IDENTIFICATION PARAMETER | | | DATA GUARANTEE PARAMETER | |
|---|---|---|---|---|---|
| | TRANSMISSION SOURCE IP ADDRESS | DESTINATION IP ADDRESS | Layer 4 Protocol | REQUIRED BANDWIDTH (bps) | PRIORITY |
| 1 | 10.20.30.1 | 192.168.0.8 | TCP | 10M | 7 |
| 2 | 50.40.30.1 | 192.168.0.7 | UDP | 6M | 4 |
| 3 | | | | | |
| .. | | | | | |

Fig.39

| TRANSMISSION SOURCE IP ADDRESS | DNS INQUIRY NAME (DOMAIN NAME) |
|---|---|
| 10.20.30.1 | xx.yy.tv |
| 50.40.30.1 | abc.xyz.com |
| .. | .. |

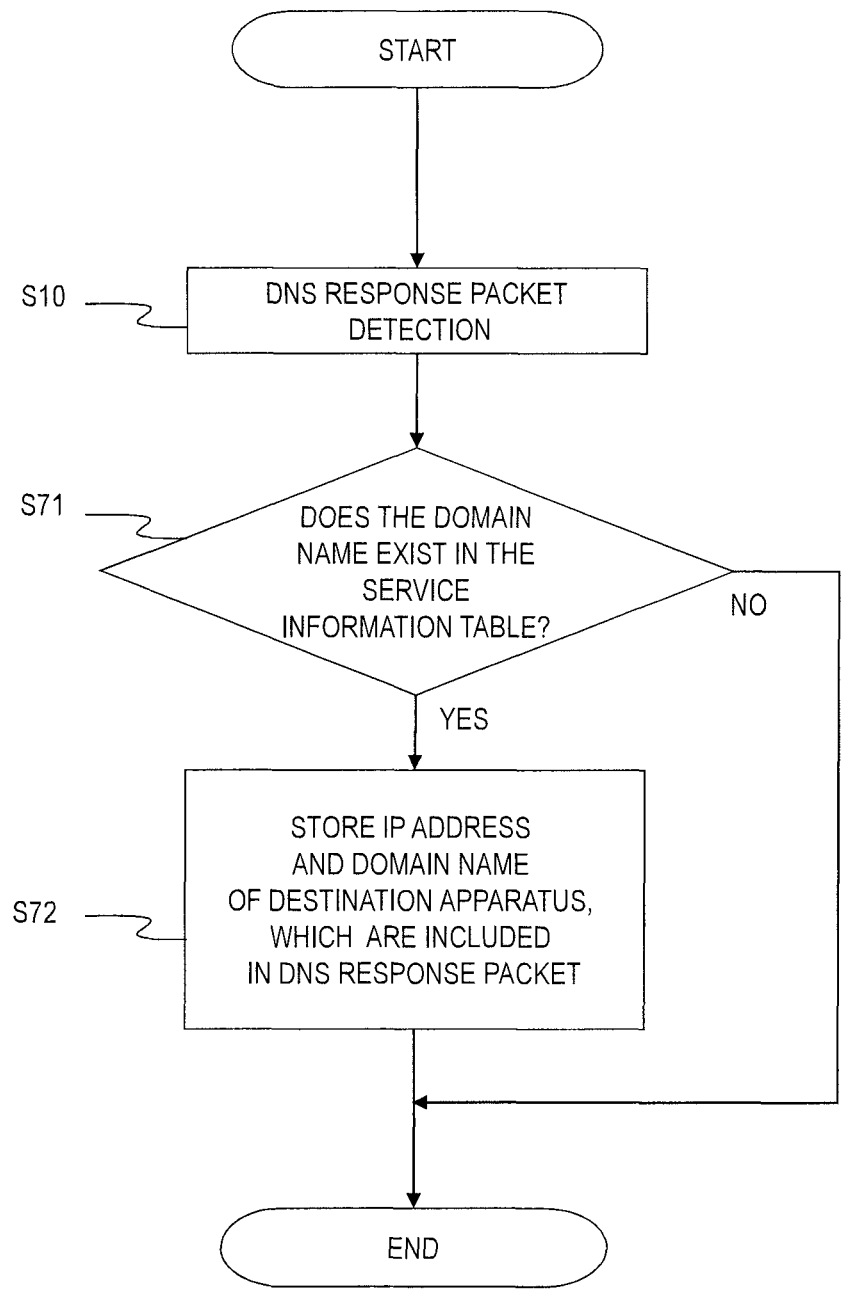

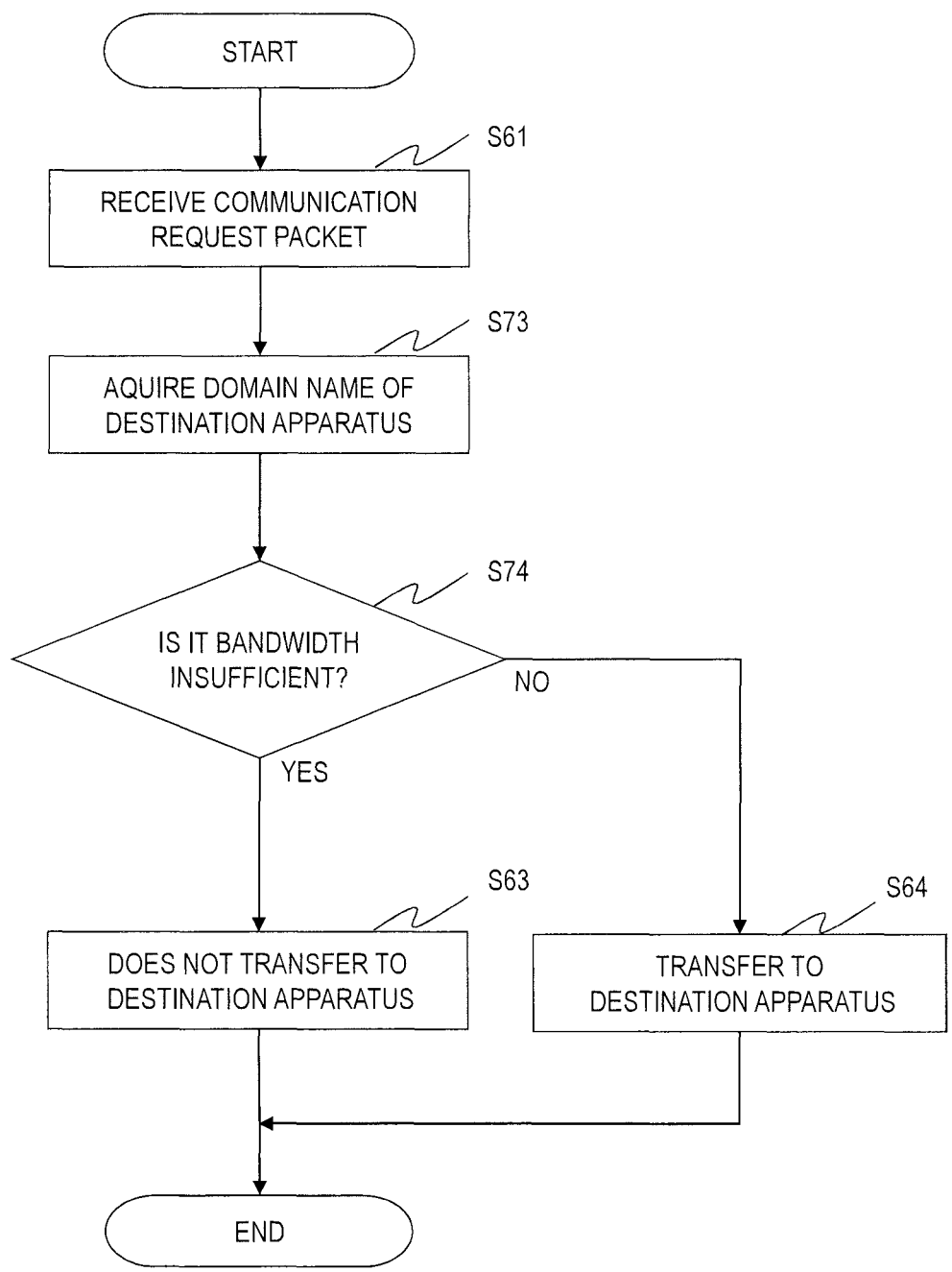

COMMUNICATION BANDWIDTH CONTROL DEVICE AND COMMUNICATION BANDWIDTH CONTROL METHOD

TECHNICAL FIELD

The present invention relates to a communication bandwidth control device, which is included in a relay apparatus for relaying data that is transmitted and received in a communication network for controlling a communication bandwidth, and to a communication bandwidth control method.

BACKGROUND ART

In recent years, Quality of Service (QoS) technology has been considered as a technology that guarantees communication service quality of real time communications such as Internet telephone, VOD (Video on Demand) service, or the like. QoS technology is used by a relay apparatus which relays a content in a communication path between a communication request apparatus utilizing contents, and a server (hereinafter, referred to as a destination apparatus) providing the contents. For example, a standardized QoS technology for a relay apparatus used in a wireless LAN (Local Area Network) is established by IEEE (Institute of Electrical and Electronics Engineers) 802.11e standard. In addition, the Homeplug alliance has been put to practical use of a QoS technology for a relay apparatus used in PLC (Power Line Communications).

In real time communication, in order to prevent disposal or delay of a packet, a relay apparatus reserves a bandwidth necessary to transmit a content in a communication path, and guarantees a constant communication speed. As a result, services that cannot tolerate delays or terminations of communication, such as video telephone and real time transmission of audio or video, can be transmitted by being given priority over other services (e.g., patent literature 1).

CITATION LIST

Patent Literature

[PTL 1] Japanese Laid-Open Patent Publication No. H10-145424

SUMMARY OF THE INVENTION

Problems to be Solved by the Invention

With conventional technology, it is necessary to configure parameters in a relay apparatus in order to reserve the bandwidth. The parameters include: for identifying whether a packet should be guaranteed of quality, a transmission source IP address that belongs to a transmission source of a content and a destination IP address that is a destination of the content; a bandwidth necessary to transmit the content; and the like. Therefore, when requesting a reservation of a bandwidth with the relay apparatus, a communication request apparatus transmits, to the relay apparatus, a control packet including these parameters, directly or via a destination apparatus. By receiving the control packet, the relay apparatus can comprehend the bandwidth necessary to transmit the content.

However, in conventional technology, the communication request apparatus needs to include a function of generating the control packet; the destination apparatus needs to include a function of sending the control packet transmitted from the communication request apparatus back to the communication request apparatus; and the relay apparatus needs to include a function (hereinafter, referred to as "QoS configuration function") of processing the control packet and configuring these parameters. To require the communication request apparatus, the destination apparatus, and the relay apparatus, which are on the communication path, to all include a function regarding QoS configuration is a usage limitation. This has been a problem that brings a large restriction on an in-home network in which various instruments, such as new products, old products, and products from other manufacturers, are expected to coexist.

Such problem can be solved by connecting the relay apparatus to a DNS (Domain Name System) server which manages IP addresses of servers. In this network system, the communication request apparatus and the relay apparatus are connected via an internal network. In addition, the destination apparatus, the DNS server, and the relay apparatus are connected via an external network. The DNS server keeps a management table that associates a domain name indicating a computer name or a type of the content, to an IP address of a server corresponding to the domain name. Furthermore, the relay apparatus keeps a table that associates a domain name to a bandwidth necessary to transmit the content corresponding to the domain name.

In such a communication system, first, the communication request apparatus transmits a DNS request packet to the DNS server via the relay apparatus in order to acquire the IP address of the destination apparatus. The DNS request packet includes a domain name of the destination apparatus. The DNS server associates the domain name and the IP address of the server when the DNS server receives the DNS request packet. Next, the DNS server writes the IP address of the destination apparatus in a DNS response packet, and sends it to the communication request apparatus via the relay apparatus as a reply. When the relay apparatus receives the DNS response packet, the relay apparatus acquires a bandwidth necessary to transmit the content corresponding to the domain name by referring to the previously described table, and reserves the bandwidth. Then, the communication request apparatus receives the DNS response packet from the relay apparatus and acquires the IP address of the destination apparatus. When the communication request apparatus receives the DNS response packet, the communication request apparatus transmits a content acquisition request to the destination apparatus.

As described above, the communication request apparatus transmits the DNS request packet to the DNS server; and in the process of receiving the DNS response packet from DNS server, the relay apparatus reserves the bandwidth based on the DNS response packet transmitted from the DNS server. Therefore, the reservation of the bandwidth is conducted without having the communication request apparatus recognizing that the relay apparatus has reserved the bandwidth. As a result, it is not necessary for the communication request apparatus and the destination apparatus to include the function of setting the previously described parameters in the relay apparatus.

However, when such solution is applied, the communication request apparatus transmits the content acquisition request to the destination apparatus regardless of whether or not the relay apparatus can reserve the bandwidth, since the communication request apparatus does not recognize whether or not the relay apparatus has reserved the bandwidth. Therefore, the communication request apparatus transmits the content acquisition request to the destination apparatus even when the relay apparatus cannot reserve the necessary bandwidth due to insufficient bandwidth of the communication path. This results in a problem where a fuzzy image is transmitted to the communication request apparatus.

The present invention is arrived at in view of the above described problem, and the present invention aims to provide a communication bandwidth control device and a communication bandwidth control method used in a relay apparatus and the like. Even in a network that includes a communication request apparatus that does not have a QoS configuration function, if the bandwidth necessary to transmit a content cannot be secured, the communication bandwidth control device and the communication bandwidth control method prevent a fuzzy image caused due to insufficient bandwidth to be transmitted to the communication request apparatus.

Solution to the Problems

In order to achieve the above-described aim, the present invention has the following characteristics. A first aspect of the present invention is a communication bandwidth control device which is included in a relay apparatus and which controls a communication bandwidth of a communication processed by the relay apparatus, the relay apparatus relaying data that is transmitted and received between, a destination apparatus which is a communication partner, and a communication request apparatus which is on a communication network and which requests for communication, the communication bandwidth control device comprising: a packet detecting section which detects a DNS response packet transmitted by a DNS server in order to respond to an inquiry, the inquiry being sent to the DNS server by the communication request apparatus regarding an IP address corresponding to a domain name of the destination apparatus; a storage section which stores, a first correspondence relationship between the domain name of the destination apparatus and a required bandwidth which is determined in advance and which is necessary for the relay apparatus to communicate with another relay apparatus during communication between the destination apparatus and the communication request apparatus, and a bandwidth currently available between the relay apparatus and the other relay apparatus; a condition judging section, which specifies the domain name of the destination apparatus based on a communication packet generated in association with a communication request from the communication request apparatus, and which acquires the required bandwidth from the first correspondence relationship, and which judges if a first condition of whether the required bandwidth is larger than the bandwidth currently available is satisfied; and a QoS configuring section which establishes, if the first condition is satisfied, a configuration to block the communication between the communication request apparatus and the destination apparatus, based on information included in the DNS response packet.

Furthermore, the previously described storage section may further store a second correspondence relationship between the domain name of the destination apparatus and a priority of communication between the destination apparatus and the communication request apparatus, and a third correspondence relationship between communication currently conducted among the relay apparatus and the other relay apparatus and a priority of the communication. In addition, the previously described condition judging section may, if it is judged that the first condition is satisfied, obtain, from among the communication currently conducted between the relay apparatus and the other relay apparatus, communication that has a priority lower than the priority of the communication between the destination apparatus and the communication request apparatus by referencing the storage section, and may further judge if a second condition of whether it is not possible to secure the required bandwidth even when the obtained communication is terminated is satisfied.

Furthermore, the previously described condition judging section may specify the domain name of the destination apparatus based on a domain name included in the DNS response packet. In addition, the previously described QoS configuring section may further include a DNS modification section which rewrites the IP address that belongs to the destination apparatus and that is included in the DNS response packet, to the specified IP address, if the condition judging section judges that the first condition is satisfied.

Furthermore, the previously described condition judging section may specify the domain name of the destination apparatus based on a domain name included in the DNS response packet. In addition, the previously described QoS configuring section may further include a DNS modification section which rewrites the IP address that belongs to the destination apparatus and that is included in the DNS response packet, to the specified IP address, if the condition judging section judges that the second condition is satisfied.

Furthermore, the specified IP address is an IP address of an information provision apparatus which transmits, to the communication request apparatus, information indicating that the bandwidth is insufficient.

Alternatively, the specified IP address may be an IP address of the present relay apparatus. Then, the packet detecting section may further detect a communication request packet from the communication request apparatus destined to the IP address of the present relay apparatus. Here, the communication bandwidth control device of the present invention may further include an application processing section which transmits information indicating that the bandwidth is insufficient to the communication request apparatus when the packet detecting section detects the communication request packet.

Furthermore, the previously described condition judging section may specify the domain name of the destination apparatus based on a domain name included in the DNS response packet. In addition, the previously described storage section may further store the IP address of the destination apparatus as an unapproved address which is not approved by the relay apparatus for communication. Additionally, the previously described QoS configuring section may include an IP address storing section which stores, in the storage section, the IP address that belongs to the destination apparatus and that is included in the DNS response packet as the unapproved address, if the condition judging section judges that the first condition is satisfied. Here, the communication bandwidth control device of the present invention may further include a packet blocking section which does not transfer, to the other relay apparatus, the communication request packet that is destined to the unapproved address stored in the storage section.

Furthermore, the previously described condition judging section may specify the domain name of the destination apparatus based on a domain name included in the DNS response packet. In addition, the previously described storage section may further store the IP address of the destination apparatus as an unapproved address which is not approved by the relay apparatus for communication. Additionally, the previously described QoS configuring section may include an IP address storing section which stores, in the storage section, the IP address that belongs to the destination apparatus and that is included in the DNS response packet as the unapproved address, if the condition judging section judges that the second condition is satisfied. Here, the communication bandwidth control device of the present invention may further include a packet blocking section which does not transfer, to the other relay apparatus, the communication request packet that is destined to the unapproved address stored in the storage section.

Furthermore, the previously described storage section may further store a fourth correspondence relationship between the domain name and the IP address of the destination apparatus. In addition, the previously described QoS configuring section may include a destination apparatus information storing section which stores, in the storage section, the domain name and the IP address, both belonging to the destination apparatus and being included in the DNS response packet, as the fourth correspondence relationship. Additionally, the previously described packet detecting section may further detect a communication request packet from the communication request apparatus destined to the destination apparatus. Additionally, when the packet detecting section detects the communication request packet, the previously described condition judging section may reference the fourth correspondence relationship and may specify the domain name of the destination apparatus from a destination IP address in the communication request packet. Here, the communication bandwidth control device of the present invention may further include a packet blocking section which does not transfer the communication request packet to the other relay apparatus, if the condition judging section judges that the first condition is satisfied.

Furthermore, the previously described storage section may further store a fourth correspondence relationship between the domain name and the IP address of the destination apparatus. In addition, the previously described QoS configuring section may include a destination apparatus information storing section which stores, in the storage section, the domain name and the IP address, both belonging to the destination apparatus and being included in the DNS response packet, as the fourth correspondence relationship. Additionally, the previously described packet detecting section may further detect a communication request packet from the communication request apparatus destined to the destination apparatus. Additionally, when the packet detecting section detects the communication request packet, the previously described condition judging section may reference the fourth correspondence relationship and may specify the domain name of the destination apparatus from a destination IP address in the communication request packet. Here, the communication bandwidth control device of the present invention may further include a packet blocking section which does not transfer the communication request packet to the other relay apparatus, if the condition judging section judges that the second condition is satisfied.

Furthermore, the communication bandwidth control device of the present invention may further include a bandwidth reserving section which reserves the required bandwidth between the relay apparatus and the other relay apparatus if the previously described condition judging section judges that the first condition is not satisfied.

Furthermore, the communication bandwidth control device of the present invention may further include, a priority-control section which terminates communication having a priority that is lower than the priority of the communication between the destination apparatus and the communication request apparatus if the previously described condition judging section judges that the second condition is not satisfied, and a bandwidth reserving section which reserves the required bandwidth for the communication between the relay apparatus and the other request apparatus if the priority-control section terminates the communication having low priority.

Furthermore, the previously described DNS modifying section rewrites a cache time included in the DNS response packet transmitted to the communication request apparatus to 0.

A second aspect of the present invention is a communication bandwidth control method conducted by a relay apparatus for controlling a communication bandwidth of communication processed by the relay apparatus, the relay apparatus relaying data that is transmitted and received between, a destination apparatus which is a communication partner, and a communication request apparatus which is on a communication network and which requests for communication; the communication bandwidth control method including: a packet detection step of detecting a DNS response packet transmitted by a DNS server in order to respond to an inquiry, the inquiry being sent to the DNS server by the communication request apparatus regarding an IP address corresponding to a domain name of the destination apparatus; a condition judgment step of, specifying the domain name of destination apparatus based on a communication packet generated in association with a communication request from the communication request apparatus, acquiring a required bandwidth which is determined in advance and which is necessary for the relay apparatus to communicate with another relay apparatus during communication between the destination apparatus and the communication request apparatus, and judging if a first condition of whether the required bandwidth is larger than the bandwidth currently available between the relay apparatus and the other relay apparatus is satisfied; and a QoS configuration step of establishing, if the first condition is satisfied, a configuration to block the communication between communication request apparatus and the destination apparatus, based on information included in the DNS response packet.

A third aspect of the present invention is an integrated circuit which is included in a relay apparatus and which controls a communication bandwidth of communication processed by the relay apparatus, the relay apparatus relaying data that is transmitted and received between, a destination apparatus which is a communication partner, and a communication request apparatus which is on a communication network and which requests for communication, the integrated circuit integrating circuits that act as: a packet detecting section which detects a DNS response packet transmitted by a DNS server in order to respond to an inquiry, the inquiry being sent to the DNS server by the communication request apparatus regarding an IP address corresponding to a domain name of the destination apparatus; a storage section which stores, a first correspondence relationship between the domain name of the destination apparatus and a required bandwidth which is determined in advance and which is necessary for the relay apparatus to communicate with another relay apparatus during communication between the destination apparatus and the communication request apparatus, and a bandwidth currently available between the relay apparatus and the other relay apparatus; a condition judging section, which specifies the domain name of the destination apparatus based on a communication packet generated in association with a communication request from the communication request apparatus, and which acquires the required bandwidth from the first correspondence relationship, and which judges if a first condition of whether the required bandwidth is larger than the bandwidth currently available is satisfied; and a QoS configuring section which establishes, if the first condition is satisfied, a configuration to block the communication between the communication request apparatus and the destination apparatus, based on information included in the DNS response packet.

Advantageous Effects of the Invention

If the bandwidth necessary to transmit a content to the other relay apparatus cannot be secured, the communication bandwidth control device of the present invention can terminate transmission of a content to the communication request apparatus by establishing a configuration that does not allow communication between the communication request apparatus and the destination apparatus. As a result, the communication bandwidth control device of the present invention can prevent an image that is fuzzy due to insufficient bandwidth to be displayed on the communication request apparatus.

BRIEF DESCRIPTION OF THE DRAWINGS

FIG. 4 shows one example of a data structure in a service information table kept in the relay apparatus of the present invention.

FIG. 8 shows one example of a DNS packet before it is rewritten by a DNS modifying section according to the first embodiment of the present invention.

FIG. 9 shows one example of a DNS packet after it is rewritten by the DNS modifying section according to the first embodiment of the present invention.

FIG. 16 shows one example of a data structure in a QoS configuration information table kept in the relay apparatus of the present invention.

FIG. 17 shows one example of a data structure in a communication bandwidth management table kept in the relay apparatus of the present invention.

FIG. 26 shows one example of a DNS packet before it is rewritten by a DNS modifying section according to the third embodiment of the present invention.

FIG. 29 shows one example of a data structure in a service information table kept in the relay apparatus of the present invention.

FIG. 30 shows one example of a data structure in a QoS configuration information table kept in the relay apparatus of the present invention.

FIG. 39 shows one example of a data structure in an apparatus management table kept in the relay apparatus of the present invention.

FIG. 41 is a flowchart showing operations of S704 in FIG. 40 conducted by a communication bandwidth control device according to the sixth embodiment of the present invention.

FIG. 42 is a flowchart showing operations of S708 and S709 in FIG. 40 conducted by the communication bandwidth control device according to the sixth embodiment of the present invention.

DESCRIPTION OF EMBODIMENTS

First Embodiment

A relay apparatus including a communication bandwidth control device of a first embodiment of the present invention, and a communication bandwidth control method will be described next with reference to the drawings. Although the communication bandwidth control method and the communication bandwidth control device described in the present specification is applicable to many different types of networks, described next is a specific example in which they are applied in a network of power line communications (hereinafter, referred to as "PLC"). Nevertheless, the entirety or a part of the following disclosure is applicable to other network forms such as, for example, a wireless network and the like.

Figure 1:
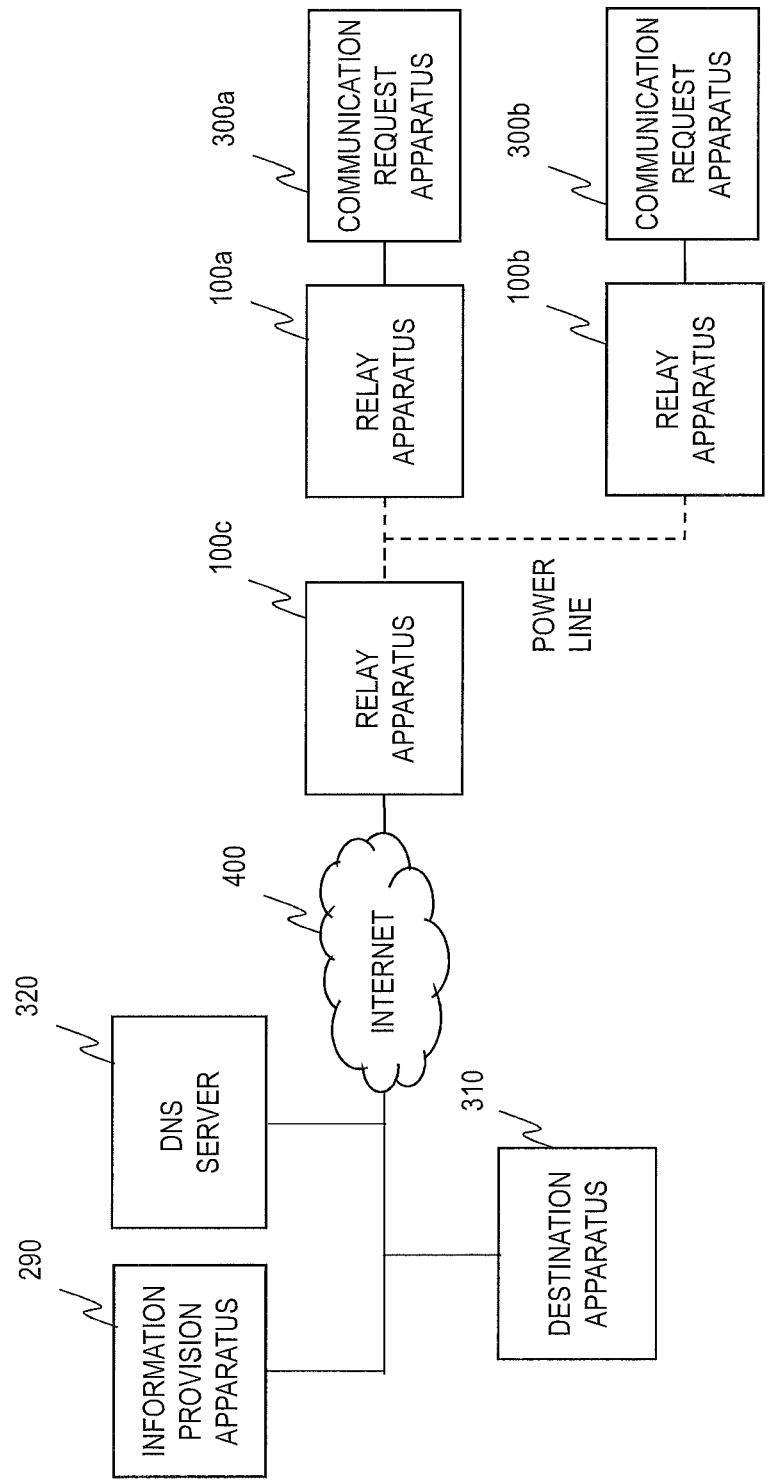
FIG. 1 shows one example of a network with an embodiment of the present invention.

FIG. 1 shows a configuration of a network with the first embodiment of the present invention. As shown in FIG. 1, the network of the present embodiment includes various types of communication request apparatuses 300, at least one destination apparatus 310, a DNS (Domain Name System) server 320, and at least one information provision apparatus 290. In FIG. 1, the various communication request apparatuses 300 are distinguished and described as 300a and 300b. In the following descriptions, each of the communication request apparatuses 300a and 300b is referred to in a general term of a communication request apparatus 300. Furthermore, in FIG. 1, relay apparatuses 100 are respectively distinguished and described as 100a to 100c. In the following descriptions, each of the relay apparatuses 100a to 100c is referred to in a general term of a relay apparatus 100.

The communication request apparatuses 300 and the destination apparatus 310 are connected via the relay apparatuses 100 and the Internet 400. More specifically, the communication request apparatuses 300a and 300b are respectively connected to the relay apparatuses 100a and 100b by an Ethernet (registered trademark (notation omitted in the following)) cable. Furthermore, the destination apparatus 310, the DNS server 320 and the information provision apparatus 290 are connected to the relay apparatus 100c via the Internet 400. Each of the intervals between the relay apparatuses 100a to 100c are connected via a power line.

The destination apparatus 310 is an audio-and-video server. The destination apparatus 310 holds various contents, and transmits a content to the communication request apparatuses 300.

The communication request apparatuses 300 receive the content from the destination apparatus 310, and reproduce an image or an audio. The communication request apparatuses 300 refer to, for example, an instrument such as a television, a personal computer, or the like.

The DNS server 320 manages a correspondence relationship between a domain name indicating a hostname of the destination apparatus 310 and an IP address of the destination apparatus 310 corresponding to the domain name. When the DNS server 320 receives a DNS request packet from the communication request apparatus 300, the DNS server 320 refers to the domain name included in the DNS request packet. Then, the DNS server 320 transmits a DNS response packet. The DNS response packet includes the domain name and the IP address of the destination apparatus 310 corresponding to the domain name. The number of destination apparatuses 310 corresponding to the domain name may not be limited to one, and there may be more than one. In such a case, the DNS response packet includes the domain name and multiple different IP addresses of the destination apparatuses 310.

The relay apparatuses 100a to 100c are PLC bridges, which bridge data that is transmitted and received via different types of networks. In the case in FIG. 1, the relay apparatuses 100a to 100c relay a content transmitted from the destination apparatus 310, and a DNS packet and the like transmitted and received between the communication request apparatus 300 and the DNS server 320.

The information provision apparatus 290 keeps information intended to display, on a viewer (web browser or the like) of the communication request apparatus 300, the fact that a communication bandwidth necessary for a communication between the relay apparatuses 100a to 100c could not be secured for a content transmission from the destination apparatus 310 to the communication request apparatus 300. If the information provision apparatus 290 receives a communication request packet requesting a content transmission from the communication request apparatus 300 under such a situation, the information provision apparatus 290 sends the information to the communication request apparatus 300 as a reply. Details of the function of the information provision apparatus 290 will be described below.

Figure 2:
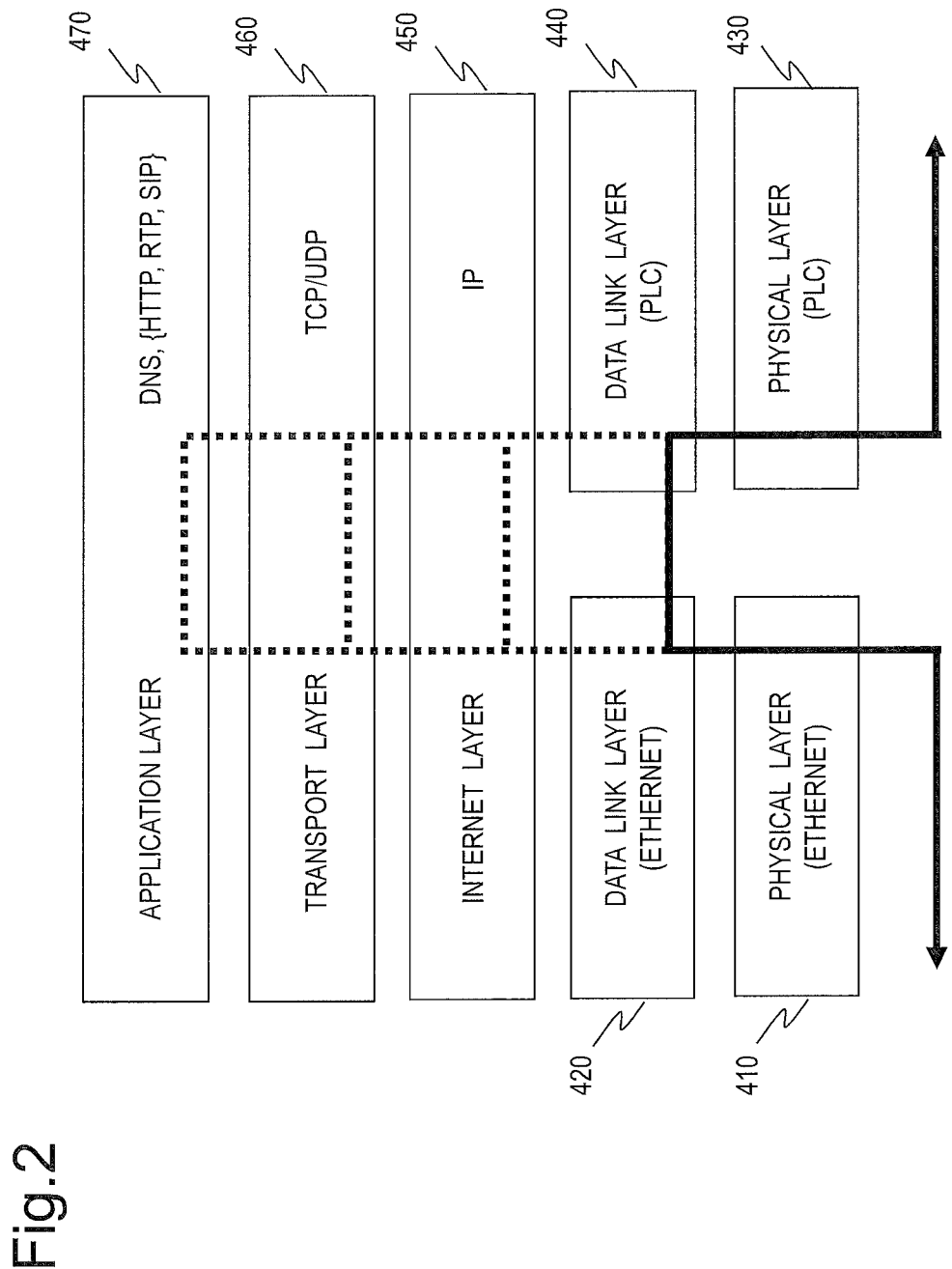
FIG. 2 shows a protocol stack installed in a relay apparatus of the present invention.

FIG. 2 shows a layered structure of protocols installed in the relay apparatus 100 of the present embodiment. In FIG. 2, five layers of protocols are installed in the relay apparatus 100.

In a physical layer (Ethernet) 410, transmission and reception of data are conducted with an instrument connected to the network. More specifically, in the case with the relay apparatus 100c, transmission and reception of data with the destination apparatus 310 are conducted in the physical layer (Ethernet) 410. Similarly, in the cases with the relay apparatuses 100a and 100b, transmission and reception of data with the communication request apparatuses 300a and 300b are conducted in the physical layer (Ethernet) 410, respectively.

In a data link layer (Ethernet) 420, media access control of data that is transmitted and received via the network is conducted.

In a physical layer (PLC) 430, modulation, demodulation, and transmission/reception of data are conducted. More specifically, when the relay apparatus 100c receives data from the destination apparatus 310, the relay apparatus 100c conducts modulation and transmission of the data at the physical layer (PLC) 430. On the other hand, when the relay apparatuses 100a and 100b receive the modulated data from the relay apparatus 100c, the relay apparatuses 100a and 100b conduct demodulation of the data at the physical layer (PLC) 430.

In a data link layer (PLC) 440, media access control of data that is transmitted and received among the relay apparatuses 100a to 100c is conducted.

An Internet layer 450 includes IP (Internet Protocol) and the like. In the Internet layer 450, a transmission source and a destination of a packet transmitted and received between different instruments are specified. The transmission source and the destination of the packet are specified by a transmission source IP address and a destination IP address included in this packet.

A transport layer 460 includes TCP (Transmission Control Protocol), UDP (User Datagram Protocol), and the like. In the transport layer 460, reliability, throughput, or the like of data communication is controlled.

An application layer 470 includes the DNS at the very least; and depending on the type of the data communicated between the destination apparatus 310 the communication request apparatus 300, also includes various protocols such as HTTP (HyperText Transfer Protocol), RTP (Realtime Transport Protocol), SIP (Session Initiation Protocol), and the like.

As shown in FIG. 2, when relaying and transferring a content transmitted from the destination apparatus 310, the relay apparatus 100c receives the content at the physical layer (Ethernet) 410 and the data link layer (Ethernet) 420, and relays the content to the relay apparatuses 100a and 100b via the data link layer (PLC) 440 and the physical layer (PLC) 430. Similarly, the relay apparatuses 100a and 100b receive and demodulate the content at the physical layer (PLC) 430, the data link layer (PLC) 440, and the Internet layer 450; and transmit the content to the communication request apparatus 300 via the data link layer (Ethernet) 420 and the physical layer (Ethernet) 410.

Furthermore, depending on the type of data that is being communicated, the communication may be conducted via the Internet layer 450, the transport layer 460, and the application layer 470 (dotted lines in FIG. 2). For example, the DNS response packet transmitted from the DNS server 320 is communicated also through the application layer 470.

Figure 3:
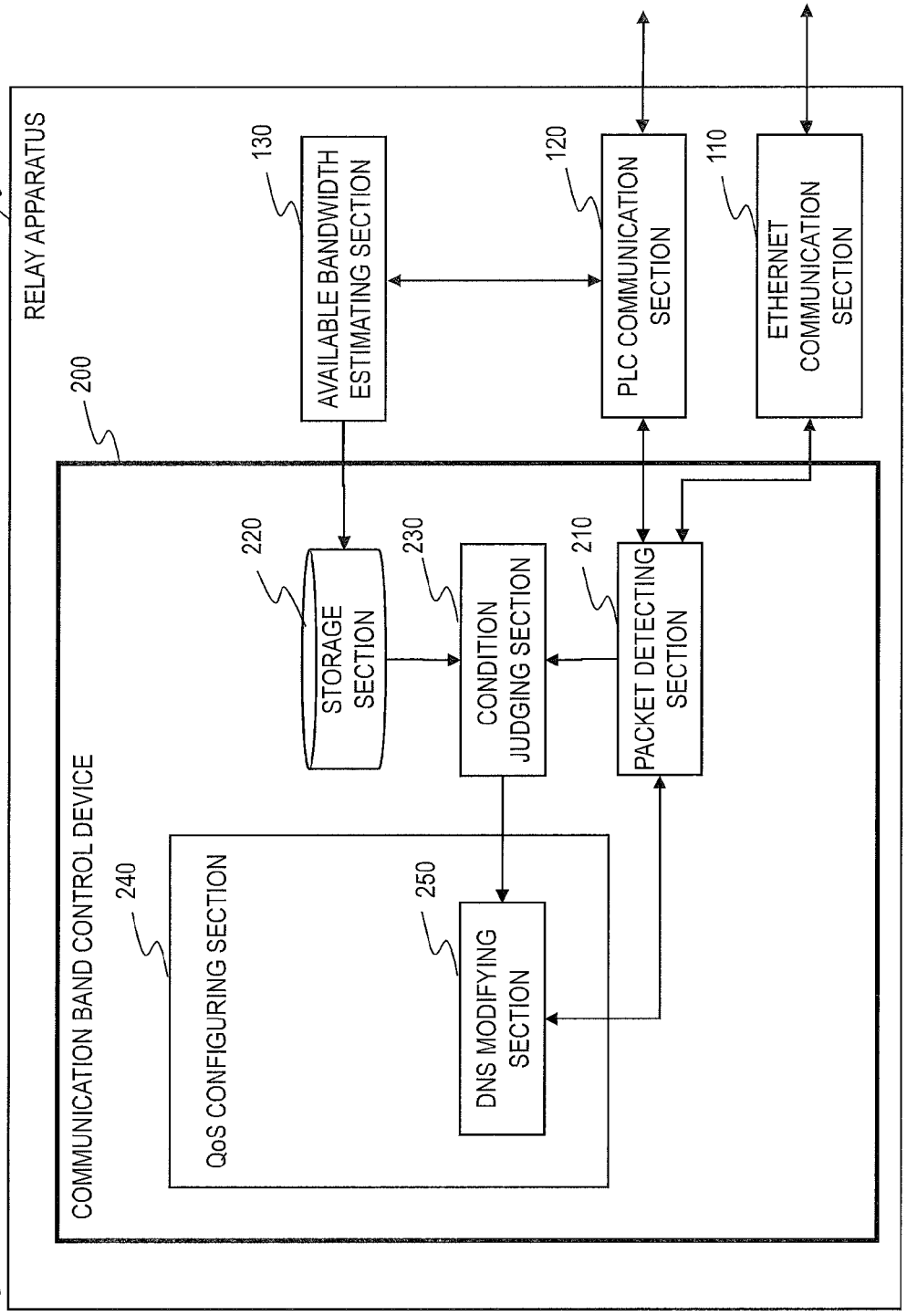
FIG. 3 shows functional blocks of the relay apparatus of a first embodiment of the present invention.

FIG. 3 is a diagram of an internal configuration of the relay apparatus 100 that includes a communication bandwidth control device 200 of present embodiment. The relay apparatus 100 includes an Ethernet communication section 110, a PLC communication section 120, an available bandwidth estimating section 130, and the communication bandwidth control device 200. The communication bandwidth control device 200 includes a packet detecting section 210, a storage section 220, a condition judging section 230, and a QoS configuring section 240. The QoS configuring section 240 includes a DNS modifying section 250.

The Ethernet communication section 110 conducts transmission and reception of data with the destination apparatus 310 and the information provision apparatus 290 via the Internet 400. The Ethernet communication section 110 is installed with the physical layer (Ethernet) 410, the data link layer (Ethernet) 420, the Internet layer 450, the transport layer 460, and the application layer 470 shown in FIG. 2.

The PLC communication section 120 conducts transmission and reception of data with another relay apparatus 100 via the power line. The PLC communication section 120 is installed with the physical layer (PLC) 430, the data link layer (PLC) 440, the Internet layer 450, the transport layer 460, and the application layer 470 shown in FIG. 2.

The available bandwidth estimating section 130 estimates the currently available bandwidth, by periodically transmitting and receiving a test packet via the PLC communication section 120 through the communication path between the relay apparatus 100 and the other relay apparatus 100. Here, as a method for estimation, an existing method such a Pathload method is applicable. The available bandwidth estimating section 130 writes the estimated currently available bandwidth in a communication bandwidth management table 520 stored in the storage section 220. Details of the communication bandwidth management table 520 will be described below with reference to FIG. 5.

The packet detecting section 210 detects a specific type of packet received by the Ethernet communication section 110 or the PLC communication section 120. More specifically, after the communication request apparatus 300 transmits, to the DNS server 320, a DNS request packet, which is an inquiry regarding an IP address corresponding to a domain name of the destination apparatus 310, the packet detecting section 210 detects a DNS response packet transmitted by the DNS server 320 in response to the DNS request packet. The packet detecting section 210 can identify a DNS response packet by referring to a port number (53) included in a TCP (UDP) header of the communicated packet. When the packet detecting section 210 detects a DNS response packet, the packet detecting section 210 transfers the DNS response packet to the condition judging section 230 and the QoS configuring section 240. The condition judging section 230 and the QoS configuring section will be described below. Details of the DNS response packet will be described below with reference to FIG. 6.

The storage section 220 includes a service information table 510 and the communication bandwidth management table 520. The service information table 510 associates and stores the domain name indicating a hostname of the destination apparatus 310, and various parameters related to the domain name (hereinafter referred to as "service parameters"). The service parameters include the name of service provided by the destination apparatus 310, and a bandwidth necessary to transmit the content corresponding to the domain name (hereinafter, referred to as a "required bandwidth"). Details of the service information table 510 will be described below with reference to FIG. 4. The communication bandwidth management table 520 manages a bandwidth currently available in the communication path between the relay apparatus 100 and the other relay apparatus 100. Details of the communication bandwidth management table 520 will be described below with reference to FIG. 5.

The condition judging section 230 refers to the domain name included in the DNS response packet, and specifies the domain name of the destination apparatus 310. Next, the condition judging section 230 acquires the required bandwidth corresponding to the domain name from the service information table 510 in the storage section 220. Then, the condition judging section 230 acquires the bandwidth currently available between the relay apparatus 100 and the other relay apparatus 100 by referring to the communication bandwidth management table 520 in the storage section 220. Next, the condition judging section 230 judges whether the required bandwidth is larger than the bandwidth currently available between the relay apparatus 100 and the other relay apparatus 100. In the following description, the situation in which the required bandwidth is larger than the bandwidth currently available between the relay apparatus 100 and the other relay apparatus 100 is simply referred to as "bandwidth insufficient".

When it is judged to be "bandwidth insufficient", the QoS configuring section 240 establishes a configuration to block communication between the communication request apparatus 300 and the destination apparatus 310 based on information included in the DNS response packet. The DNS modifying section 250 is contained inside the QoS configuring section 240.

If the condition judging section 230 judges that it is "bandwidth insufficient", the DNS modifying section 250 rewrites the IP address that belongs to the destination apparatus 310 and that is included in the DNS response packet, to an IP address of the information provision apparatus 290. When there are multiple information provision apparatuses 290, in order to avoid concentration of access to a single information provision apparatus 290, the DNS modifying section 250 selects one information provision apparatus 290 that has not been selected for a predefined period at the present moment, and rewrites the IP address to that of the one selected information provision apparatus 290. In addition, the DNS modifying section 250 rewrites a "TTL (cache time)" included in the DNS response packet to "0".

FIG. 4 shows one example of a data structure of the service information table 510. In FIG. 4, the service information table 510 stores item "registration No.", item "DNS inquiry name (domain name)", and item "service parameter" in association with one another. The item "service parameter" includes item "service name", item "transfer rate (bps)", and item "Layer 4 Protocol".

Stored in the item "registration No." is a serial number for specifying each service information.

Stored in the item "DNS inquiry name (domain name)" is a domain name, which is the hostname of the destination apparatus 310.

Here, the domain name will be described. The domain name does not only indicate the hostname of the destination apparatus 310. If the domain name includes a string of letters that represents the type of content such as "stream", "video", "movie", "music", or "game"; the relay apparatus 100 can identify the destination apparatus 310 as an audio-and-video server that transmits a content corresponding to the string of letters. Furthermore, the relay apparatus 100 can also identify the type of content that is transmitted by the destination apparatus 310, from a level domain such as a top-level domain, a second-level domain, or a third-level domain of a domain name. Thus, the domain name may be a FQDN (Fully Qualified Domain Name), or may be one part of a domain name indicating the type of content, such as a top-level domain of a domain name.

Stored in the item "service name" is a service name corresponding to the domain name. The service name includes, for example, a providing company of the service or the type of the content.

Stored in the item "transfer rate (bps)" is a transfer rate that indicates the required bandwidth necessary for transmitting the content corresponding the top-level domain of the domain name.

Stored in the item "Layer 4 Protocol" is a string of letters representing communication protocols such as, for example, TCP, UDP, and the like. The value here can be used to determine how the relay apparatus 100 conducts a QoS configuration. For example, the relay apparatus 100 can conduct a QoS configuration in a bi-directional link if the value is TCP, and can conduct a QoS configuration only in a unidirectional link (down link or up link) if the value is UDP.

As shown in FIG. 4 and in the following description, the service information table 510 manages five service information. As the service information in registration No. 1, "xx.yy.tv" is stored in item "domain name"; "TV program distribution by company X" is stored in the item "service name"; "10M" is stored in the item "transfer rate (bps)"; and "TCP" is stored in the item "Layer 4 Protocol". Thus, the service information of registration No. 1 indicates that "a content kept in the destination apparatus 310 having a hostname of xx.yy.tv is transmitted by a TV program distribution service of company X, and 10M of bandwidth is necessary to transmit the content to the communication request apparatus 300". Similar service information can be found in registration No. 2 to registration No. 5.

Figure 5:
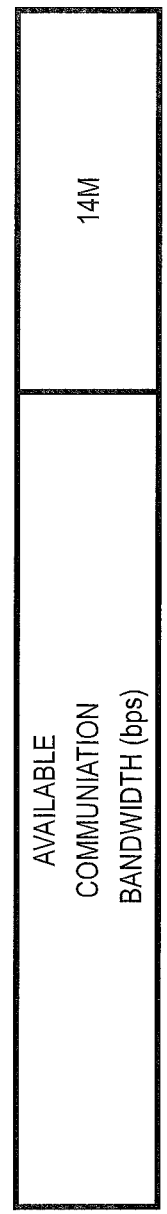
FIG. 5 shows one example of a data structure in a communication bandwidth management table kept in the relay apparatus of the present invention.

FIG. 5 shows one example of a data structure of the communication bandwidth management table 520. The communication bandwidth management table 520 manages a communication bandwidth in a communication path between the relay apparatus 100 and the other relay apparatus 100. The communication bandwidth management table 520 includes item "available communication bandwidth (bps)".

In FIG. 5, "14M" is stored in the item "available communication bandwidth (bps)". According to this information, in the communication path between the relay apparatus 100 and the other relay apparatus 100, it can be understood that "the currently available communication bandwidth is 14 Mbps".

Figure 6:
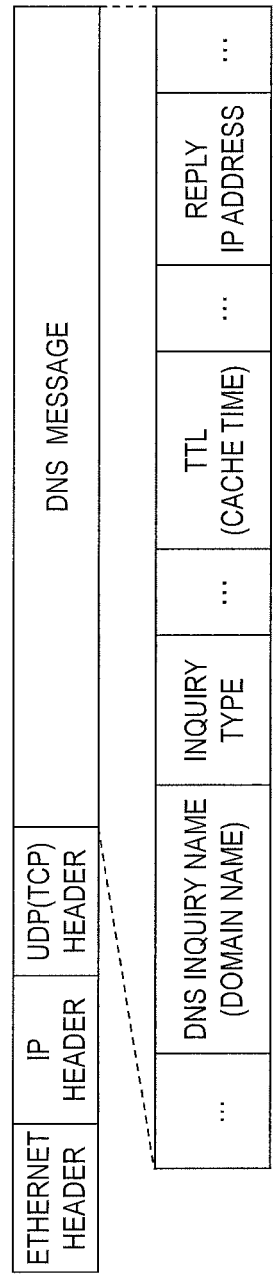
FIG. 6 shows a packet configuration of a DNS packet.

FIG. 6 shows a packet configuration of the DNS response packet. In FIG. 6, the DNS response packet includes each of the fields of "Ethernet header", "IP header", "UDP (TCP) header", and "DNS message". Furthermore "DNS message" includes each of the fields of "DNS inquiry name (domain name)", "inquiry type", "TTL (cache time)", and "reply IP address". Detailed description of the DNS response packet is omitted since it is well known. Descriptions of components that are relevant only to the present invention are provided in the following.

Stored in "DNS inquiry name (domain name)" is the domain name indicating the hostname of the destination apparatus 310.

Stored in the "inquiry type" is the type of inquiry given to the DNS is stored. For example, if "1" is stored in the "inquiry type", it indicates that the DNS inquiry name is an IP address of IPv4. On the other hand, if "28" is stored in the "inquiry type", it indicates that the DNS inquiry name is an IP address of IPv6.

Stored in the "TTL (cache time)" is retention time, which is time approved to retain the IP address of the destination apparatus 310 in the communication request apparatus 300 and "TTL" is also referred to as Time To Live.

Stored in the "reply IP address" is the IP address of the destination apparatus 310 corresponding to the domain name. The communication request apparatus 300, which received the DNS response packet, sets the IP address included in the "reply IP address" as an IP address of a connection destination. Furthermore, in a case where multiple destination apparatuses 310 exist, multiple reply IP addresses are stored. In such case, the communication request apparatus 300 sets one IP address that is arbitrary selected as an IP address of the connection destination.

Operations of the relay apparatus 100 will be described next in detail by referencing the drawings, and by using an example in which there is a request for a transmission of a content by the communication request apparatus 300a in FIG. 1.

Figure 7:
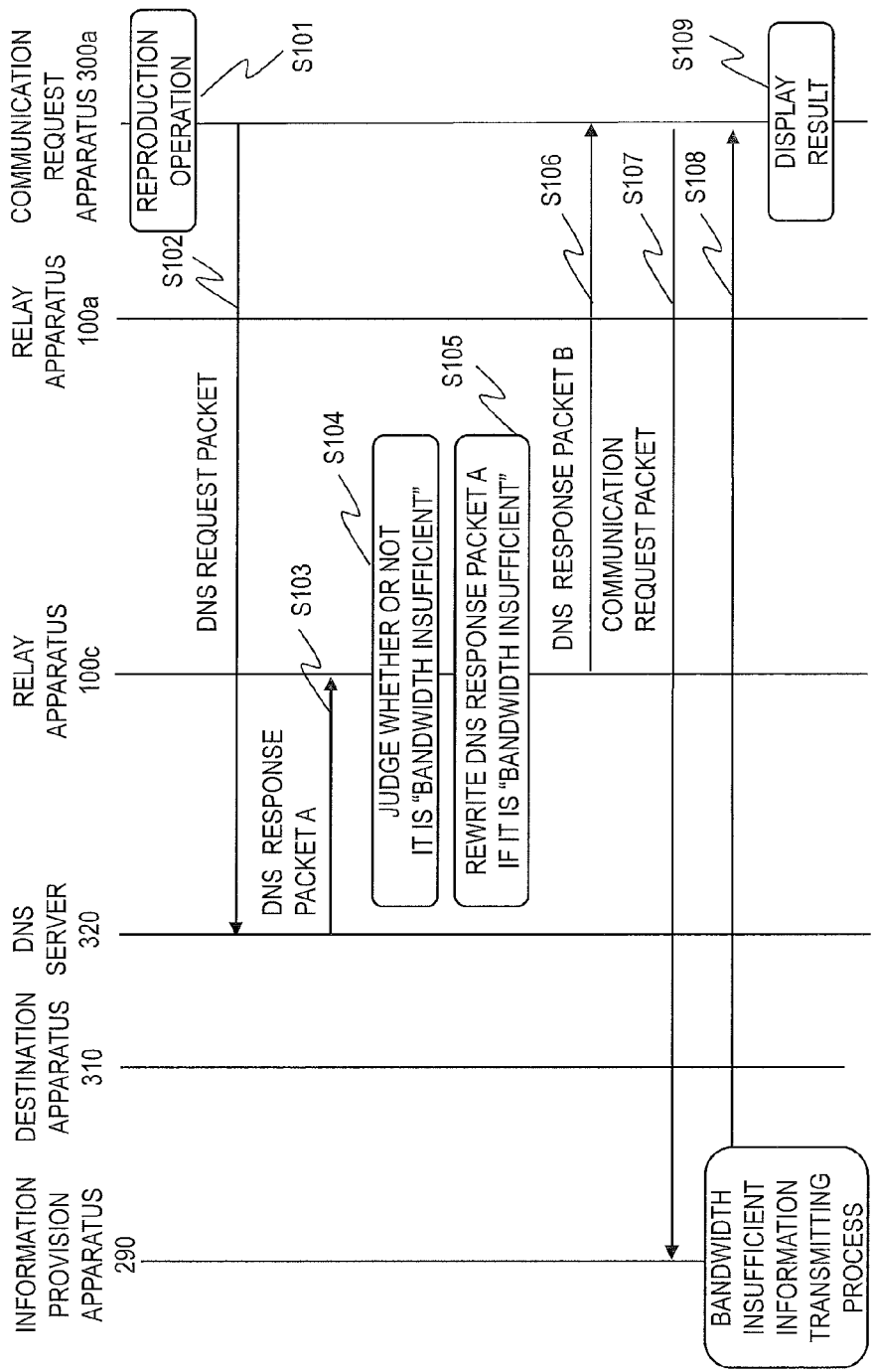
FIG. 7 shows a sequence of operations by each instrument when it is "bandwidth insufficient" in a network with the first embodiment of the present invention.
Figure 8:
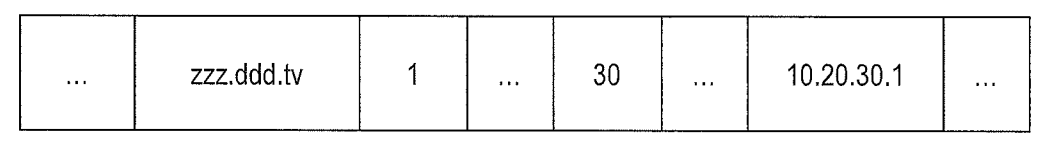
Figure 9:
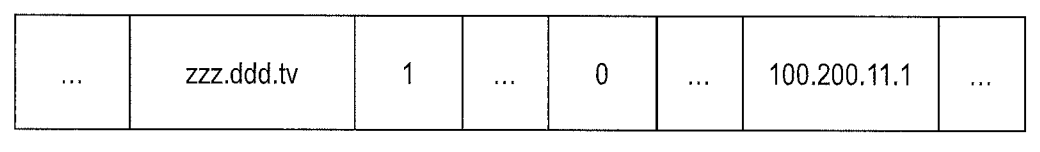

FIG. 7 shows a sequence of operations by each instrument when it is "bandwidth insufficient" in a network with an embodiment of the present invention. In this case, among the fields in the DNS response packet shown in FIG. 6, the relay apparatus 100c rewrites the reply IP address and the TTL (cache time). In FIG. 7, "DNS response packet A" represents a DNS response packet before it is rewritten by the DNS modifying section 250 of the relay apparatus 100c. FIG. 8 shows one example of the "DNS response packet A". Furthermore, "DNS response packet B" represents a DNS response packet after it is rewritten by the DNS modifying section 250 of the relay apparatus 100c. FIG. 9 shows one example of the "DNS response packet B". In the following, an IP address of the destination apparatus 310 will be described as "10.20.30.1", and an IP address of the information provision apparatus 290 will be described as "100.200.11.1".

First, when a reproduction operation of a content is conducted (S101), the communication request apparatus 300a transmits a DNS request packet to the DNS server 320 (S102).

When the DNS server 320 receives the DNS request packet, the DNS server writes, in the DNS response packet A, a cache time and an IP address of the destination apparatus 310 corresponding to a domain name in the DNS request packet; and sends the DNS response packet A to the relay apparatus 100c as a reply (S103). For example, as shown in FIG. 8, in the DNS response packet A of the destination apparatus 310 which has a domain name of "zzz.ddd.tv", "10.20.30.1", which is the IP address of the destination apparatus 310, is written as the "reply IP address", and "30" is written as the "TTL (cache time)".

Next, the Ethernet communication section 110 of the relay apparatus 100c receives the DNS response packet A. Then, the communication bandwidth control device 200 of the relay apparatus 100c judges whether or not a required bandwidth corresponding to the domain name in the DNS response packet A can be secured in a communication path between the relay apparatus 100c and the relay apparatus 100a, i.e., judges whether it is "bandwidth insufficient" or not (S104). If it is judged to be "bandwidth insufficient", the communication bandwidth control device 200 of the relay apparatus 100c rewrites the "TTL (cache time)" in the DNS response packet A from "30" to "0" and rewrites the "reply IP address" in the DNS response packet A from "10.20.30.1" to "100.200.11.1". As a result, the relay apparatus 100c generates a DNS response packet B as shown in FIG. 9 (S105).

Then, the PLC communication section 120 of the relay apparatus 100c transmits the DNS response packet B to the communication request apparatus 300a via the relay apparatus 100a (S106).

When the communication request apparatus 300a receives the DNS response packet B, the communication request apparatus 300a refers to the reply IP address included in the DNS response packet B. Since the IP address of the information provision apparatus 290 is written in the reply IP address in this case, the communication request apparatus 300a transmits a communication request packet requesting a content transmission destined for the information provision apparatus 290 (S107).

When the information provision apparatus 290 receives the communication request packet, the information provision apparatus 290 transmits, to the communication request apparatus 300a, information (hereinafter, referred to as "bandwidth insufficient information") indicating that the required bandwidth could not be secured (in the following description, this operation is referred to as "bandwidth insufficient information transmitting process") (S108).

Figure 10:
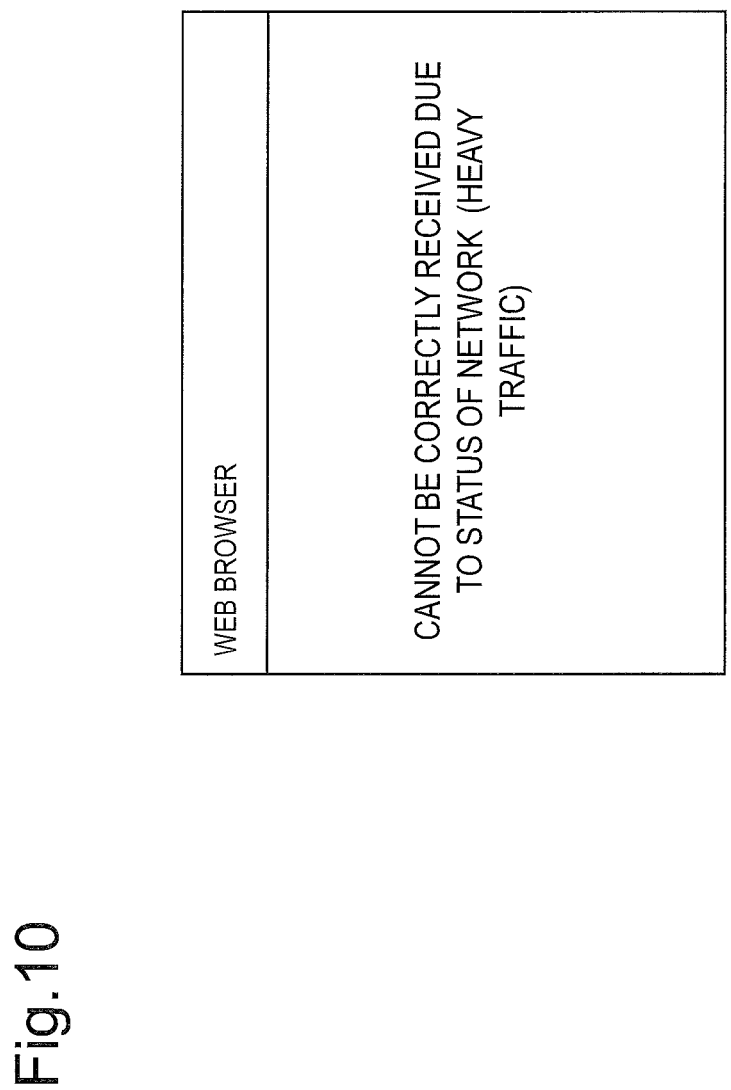
FIG. 10 shows one example of a screen displayed on a viewer of a communication request apparatus when it is "bandwidth insufficient".
Figure 11:
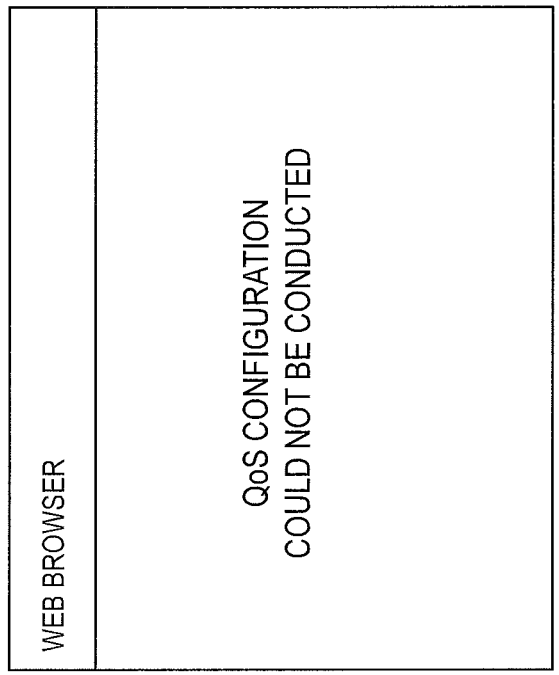
FIG. 11 shows one example of a screen displayed on the viewer of the communication request apparatus when it is "bandwidth insufficient".

When the communication request apparatus 300a receives the "bandwidth insufficient information" from the information provision apparatus 290, the communication request apparatus 300a displays this on a viewer (S109). For example, the communication request apparatus 300a displays a screen as shown in FIG. 10 or FIG. 11, on a viewer such as a web browser or the like. As a result, a user can understand that the communication path has insufficient bandwidth in order for the destination apparatus 310 to transmit the content to the communication request apparatus 300a.

Furthermore, since the TTL of the DNS response packet B is rewritten to 0, the communication request apparatus 300a does not store the IP address of the information provision apparatus 290 in association with the domain name of the destination apparatus 310. Therefore, in another session after accessing the information provision apparatus 290, the communication request apparatus 300a transmits a DNS request packet to the DNS server 320 once again. Thus, the communication request apparatus 300a does not futilely continue accessing the information provision apparatus 290.

Figure 12:
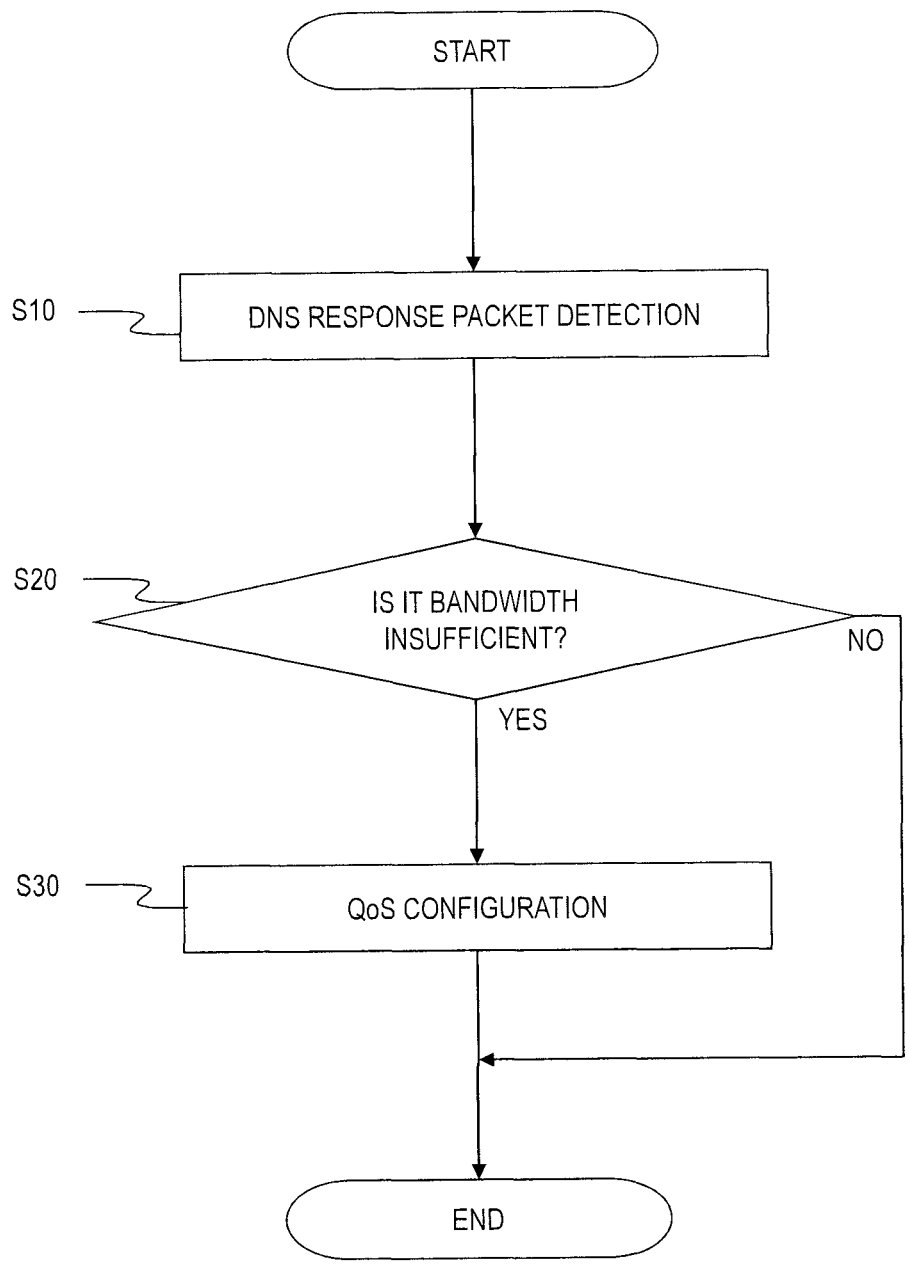
FIG. 12 is a flowchart showing operations of S104 and S105 in FIG. 7 conducted by a communication bandwidth control device according to the first embodiment of the present invention.

FIG. 12 is a flowchart showing operations of S104 and S105 in FIG. 7 conducted by the communication bandwidth control device 200 of the relay apparatus 100c.

First, the packet detecting section 210 detects a DNS response packet among packets received by the Ethernet communication section 110 or the PLC communication section 120 (S10).

Figure 13:
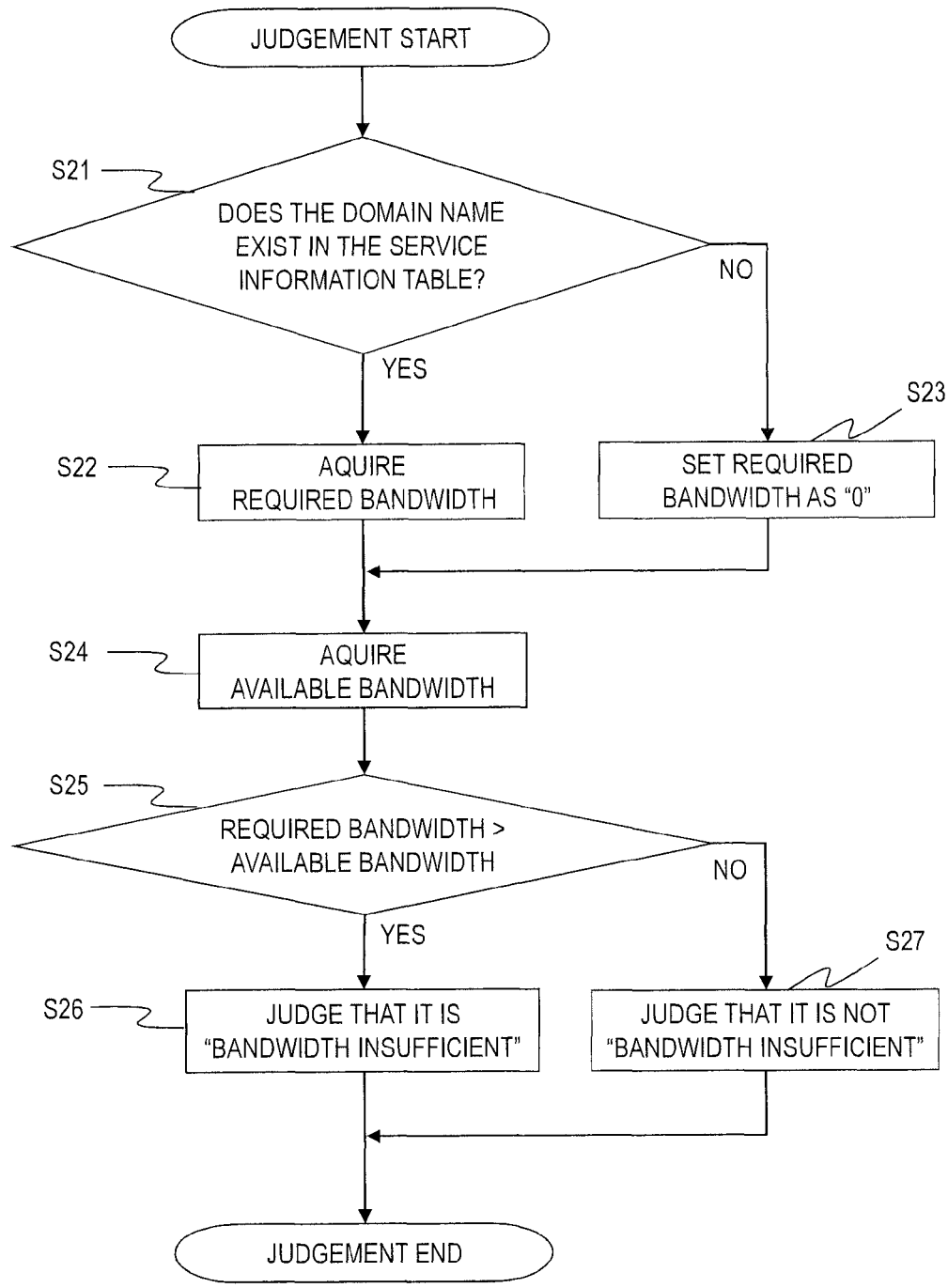
FIG. 13 is a flowchart showing detailed operations of S20 in FIG. 12 conducted by the communication bandwidth control device according to the first embodiment of the present invention.

Next, the condition judging section 230 judges whether it is "bandwidth insufficient" (S20). FIG. 13 shows the details of the processes at S20. In FIG. 13, the condition judging section 230 judges whether the domain name in the DNS response packet exists in the service information table 510 (S21). If the domain name in the DNS response packet exists in the service information table 510 (Yes at S21), the condition judging section 230 refers to the item "transfer rate (bps)" and acquires the required bandwidth corresponding to the domain name (S22). If the domain name in the DNS response packet does not exist in the service information table 510 (No at S21), the condition judging section 230 sets the required bandwidth corresponding to the domain name to "0" (S23).

For example, if the domain name in the DNS response packet is "zzz.ddd.tv", this domain name exists in the service information table 510 in FIG. 4. Therefore, the condition judging section 230 refers to the item "transfer rate (bps)" and acquires a required bandwidth of "15M". Similarly, if the domain name in the DNS response packet is "def.sss.com", this domain name exists in the service information table 510 in FIG. 4. Therefore, the condition judging section 230 refers to the item "transfer rate (bps)" and acquires a required bandwidth of "10M".

After S22 or S23, the condition judging section 230 refers to the communication bandwidth management table 520 in FIG. 5, and acquires the available bandwidth in the communication paths connecting to the relay apparatuses 100a and 100b (S24).

Next, the condition judging section 230 judges whether or not the required bandwidth is larger than the currently available bandwidth (S25). If the required bandwidth is larger than the currently available bandwidth (Yes at S25), i.e., if the required bandwidth cannot be secured, the condition judging section 230 judges that it is "bandwidth insufficient" (S26). If the required bandwidth is equal to or smaller the currently available bandwidth (No at S25), the condition judging section 230 judges that it is not "bandwidth insufficient" (S27).

Returning back to FIG. 12, when the condition judging section 230 judges that it is "bandwidth insufficient" (Yes at S20; S26 in FIG. 13), the QoS configuring section 240 establishes a configuration to block communication between the communication request apparatus 300a and the destination apparatus 310 based on information included in the DNS response packet (S30). More specifically, the DNS modifying section 250 in the QoS configuring section 240 rewrites the reply IP address included in the DNS response packet to the IP address of the information provision apparatus 290, and the TTL (cache time) to 0. For example, the DNS modifying section 250 rewrites the DNS response packet in FIG. 8 to that in FIG. 9. When the condition judging section 230 judges that it is not "bandwidth insufficient" (No at S20; S27 in FIG. 13), the DNS modifying section 250 does not conduct any processes.

Figure 14:
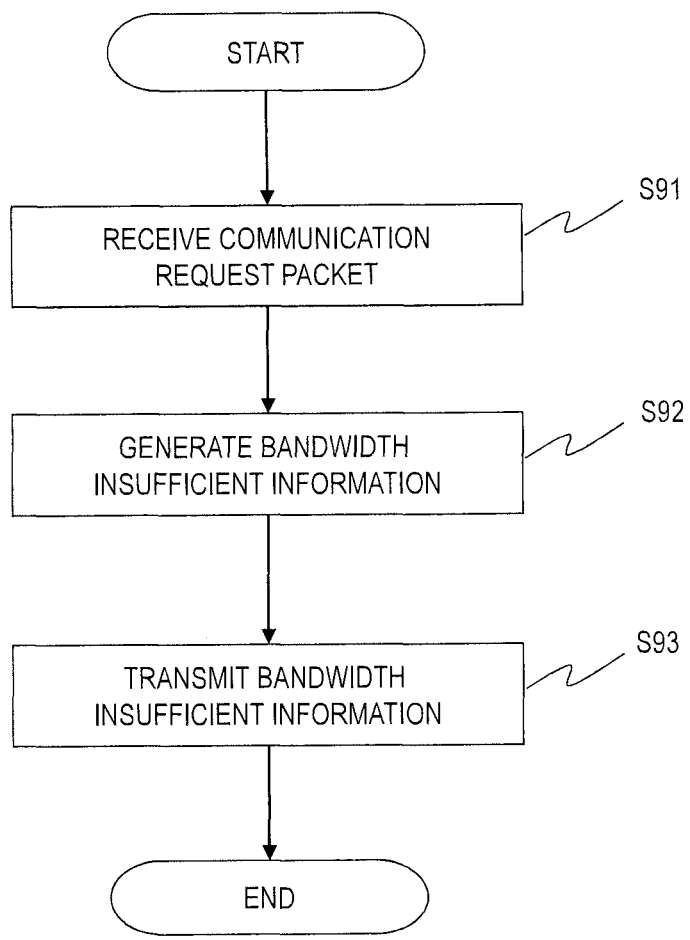
FIG. 14 is a flowchart showing operations of S108 in FIG. 7 conducted by the communication bandwidth control device according to the first embodiment of the present invention.

FIG. 14 is a flowchart showing operations of S108 in FIG. 7. When the information provision apparatus 290 receives the communication request packet requesting for a content transmission (S91), the information provision apparatus 290 generates the bandwidth insufficient information (S92). Then, the information provision apparatus 290 transmits the bandwidth insufficient information to the communication request apparatus 300a (S93). For example, if the information provision apparatus 290 includes a web application function (Apache and the like) and when the information provision apparatus 290 has received a communication request packet that is a http request packet, the information provision apparatus 290 writes the bandwidth insufficient information in a http response packet (S92), and sends it to the communication request apparatus 300a as a reply (S93).

As described above, according to the first embodiment, when the relay apparatus 100c receives the DNS response packet from the destination apparatus 310, the relay apparatus 100c judges whether or not the required bandwidth necessary for transmitting the content in the communication paths connecting to the relay apparatuses 100a and 100b can be secured. If the required bandwidth cannot be secured, the relay apparatus 100c rewrites the IP address that belongs to the destination apparatus 310 and that is included in the DNS response packet, to the IP address of the information provision apparatus 290. As a result, a fuzzy image caused due to being "bandwidth insufficient" will not be displayed on the communication request apparatus 300a. Furthermore, since the communication request apparatus 300a can acquire the bandwidth insufficient information from the information provision apparatus 290, the user of the communication request apparatus 300a can take the appropriate measures such as to wait until the bandwidth becomes vacant.

In the first embodiment, the following process may be conducted if the domain name in the DNS response packet does not exist in the service information table 510. At S10 in FIG. 12, if the domain name in the DNS response packet does not exist in the service information table 510, the packet detecting section 210 may avoid detecting it as a DNS response packet. In this case, the condition judging section 230 may skip the processes of S21 and S23 in FIG. 13.

Second Embodiment

In the first embodiment, if it is "bandwidth insufficient", the communication bandwidth control device 200 in the relay apparatus 100 rewrites the TTL and the IP address of the destination apparatus 310, which are included in the DNS response packet. On the other hand, the communication bandwidth control device 200 did not conduct any processes if it is "bandwidth insufficient". In a second embodiment, if it is "bandwidth insufficient", a communication bandwidth control device 201 of the present invention included in a relay apparatus 101 reserves the required bandwidth necessary for the destination apparatus 310 to transmit the content to the communication request apparatus 300.

In the following, the relay apparatus 101 according to the second embodiment of the present invention and a control method of the relay apparatus 101 will be described. The network configuration in the present embodiment will be described as being identical to the network configuration shown in FIG. 1. However, the relay apparatus 101 of the second embodiment corresponding to the relay apparatuses 100a, 100b, or 100c in FIG. 1 is referred to as the relay apparatuses 101a, 101b, or 101c.

Figure 15:
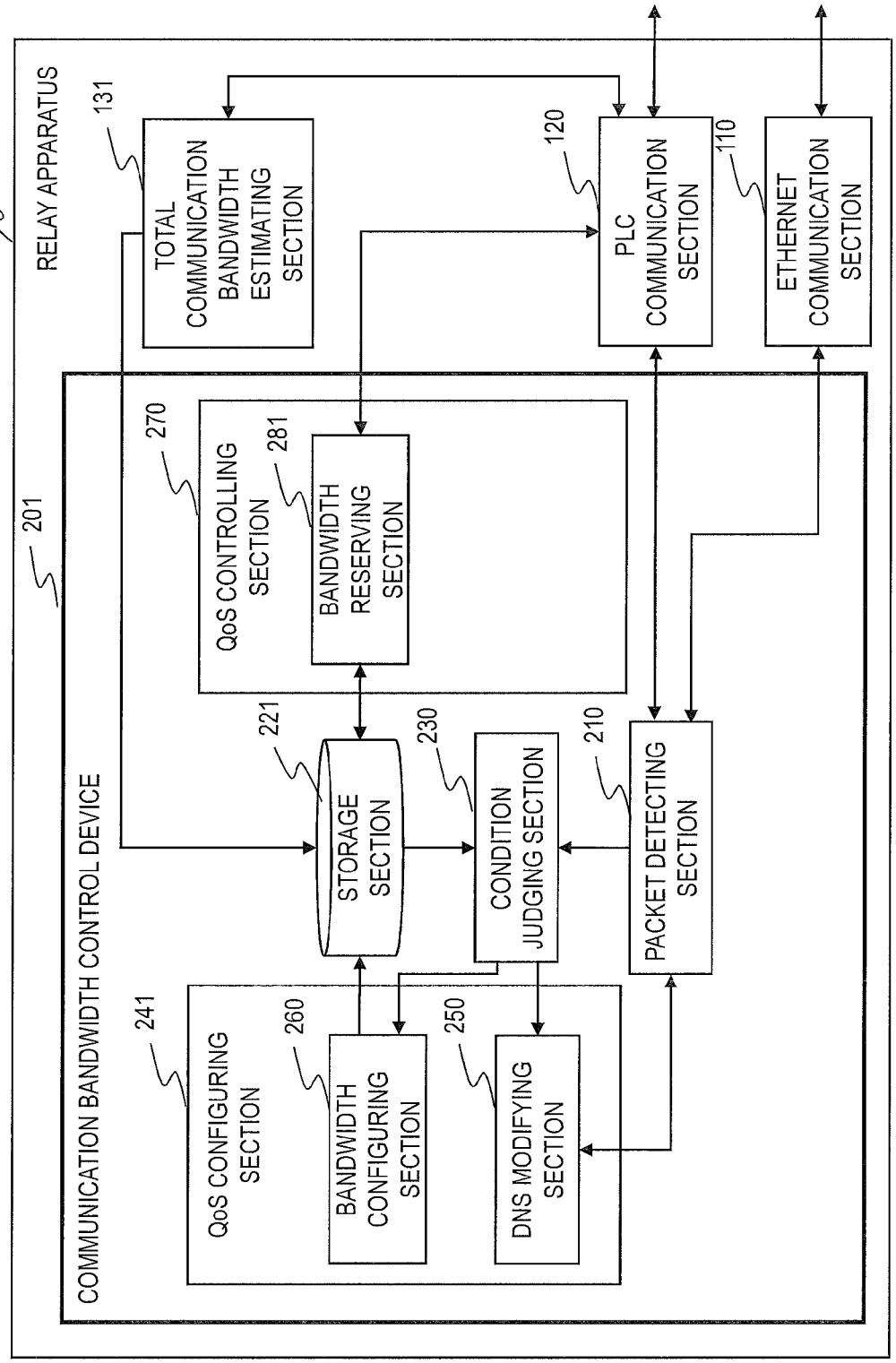
FIG. 15 shows functional blocks of a relay apparatus of a second embodiment of the present invention.

FIG. 15 is a view of an internal configuration of the relay apparatus 101 that includes the communication bandwidth control device 201 of the present embodiment. The relay apparatus 101 includes the Ethernet communication section 110, the PLC communication section 120, a total communication bandwidth estimating section 131, and the communication bandwidth control device 201. The communication bandwidth control device 201 includes the packet detecting section 210, a storage section 221, the condition judging section 230, a QoS configuring section 241, and a QoS controlling section 270. The QoS configuring section 241 includes the DNS modifying section 250 and a bandwidth configuring section 260. The QoS controlling section 270 includes a bandwidth reserving section 281. Here, those that have operations identical to those in the first embodiment are given the same reference characters of FIG. 3, and descriptions of those are omitted.

In a communication path in which multiple relay apparatuses 100 exist, the total communication bandwidth estimating section 131 estimates the total communication bandwidth of the communication path. The relay apparatus 101 periodically estimates the total communication bandwidth at an initial state in which the relay apparatus 101 has not yet reserved the required bandwidth. The estimation method of the communication bandwidth will be described below with reference to FIG. 18 and FIG. 19.

The storage section 221 includes the service information table 510, a communication bandwidth management table 521, and a QoS configuration information table 530. Here, description of the service information table 510 is omitted since it is identical to that in the first embodiment. The communication bandwidth management table 521 and the QoS configuration information table 530 store various parameters (hereinafter, referred to as "QoS configuration parameters") necessary to reserve the bandwidth. Details of the communication bandwidth management table 521 and the QoS configuration information table 530 will be described below with reference to FIG. 16 and FIG. 17.

When compared to the QoS configuring section 240, the QoS configuring section 241 only differs from that by including the bandwidth configuring section 260. If the condition judging section 230 judges that it is not "bandwidth insufficient", the bandwidth configuring section 260 sets the QoS configuration parameters into the communication bandwidth management table 521 and the QoS configuration information table 530, and updates both tables (this operation is referred to as a "bandwidth configuration" in the following description). On the other hand, if the condition judging section 230 judges that it is "bandwidth insufficient", the bandwidth configuring section 260 does not conduct the "bandwidth configuration".

The QoS controlling section 270 conducts bandwidth control of various communications conducted by the PLC communication section 120. In the present embodiment, the QoS controlling section 270 conducts a bandwidth reservation.

The bandwidth reserving section 281 refers to the QoS configuration information table 530. Then, if the QoS configuration information table 530 is updated by the "bandwidth configuration", the bandwidth reserving section 281 reserves the required bandwidth included in the latest QoS configuration parameters for the communication path connecting to another relay apparatus 101. The reservation of bandwidth refers to an occupation, by one specific relay apparatus 101, of a time slot obtained by dividing a communication channel (communication frequency) along the time axis. One such example is TDMA (Time Division Multiple Access), and others include HCCA (Hybrid Coordination Function Controlled Channel Access) standardized by the IEEE 802.11e standard.

Furthermore, after the bandwidth reservation, the bandwidth reserving section 281 monitors whether data is transmitted through the reserved communication channel. If data is not transmitted in a predefined time period, the bandwidth reserving section 281 removes the bandwidth reservation, and deletes the content in the "bandwidth configuration" related to the communication. If data is not transmitted for more than the predefined time period after elapsing of the time period of the TTL included in the DNS response packet, the bandwidth reserving section 281 may delete the content in the "bandwidth configuration" related to the communication.

FIG. 16 shows one example of a data structure in the QoS configuration information table 530 stored in the storage section 221. The QoS configuration information table 530 stores the item "registration No.", item "data identification parameter", and item "data guarantee parameter" in association with one another. In the following descriptions, the item "data identification parameter" and the item "data guarantee parameter" are referred to as QoS configuration parameters.

Stored in the item "registration No." is a serial number for specifying each of the QoS configuration parameters. The item "data identification parameter" includes item "transmission source IP address", item "destination IP address", and the item "Layer 4 Protocol". The item "data guarantee parameter" includes item "required bandwidth (bps)". Stored in the item "transmission source IP address" is an IP address of the destination apparatus 310 that transmits the content. Stored in the item "destination IP address" is an IP address of the communication request apparatus 300 that receives the content. The item "Layer 4 Protocol" is identical to the item "Layer 4 Protocol" in the service information table 510.

In FIG. 16, the QoS configuration information table 530 stores QoS configuration parameters for two contents. As the first set of the QoS configuration parameters, "10.20.30.1" is configured in the item "transmission source IP address", "192.168.0.8" is configured in the item "destination IP address", "TCP" is configured in the item "Layer 4 Protocol", and "10M" is configured in the item "required bandwidth (bps)". Thus, it is indicated that "10 Mbps of communication bandwidth is reserved for transmitting a content from the destination apparatus 310 having an IP address of 10.20.30.1 to the communication request apparatus 300 having an IP address of 192.168.0.8".

As the second set of the QoS configuration parameters, "50.40.30.1" is configured in the item "transmission source IP address", "192.168.0.7" is configured in the item "destination IP address", "UDP" is configured in the item "Layer 4 Protocol", and "6M" is configured in the item "required bandwidth (bps)". Thus, it is indicated that "6 Mbps of communication bandwidth is reserved for transmitting a content from the destination apparatus 310 having an IP address of 50.40.30.1 to the communication request apparatus 300 having an IP address of 192.168.0.7".

FIG. 17 shows one example of a data structure in the communication bandwidth management table 521 stored in the storage section 221. The communication bandwidth management table 521 stores item "current total communication bandwidth (bps)", item "currently used communication bandwidth (bps)", and the item "available communication bandwidth (bps)".

Stored in the item "current total communication bandwidth (bps)" is the total communication bandwidth, which is estimated by the total communication bandwidth estimating section 131 and which is for the communication path between the relay apparatus 101 and a plurality of other relay apparatuses 101. The value in the item "current total communication bandwidth (bps)" is updated every time the total communication bandwidth estimating section 131 estimates the total communication bandwidth within the communication path.

Stored in the item "used communication bandwidth (bps)" is a bandwidth configured by the bandwidth configuring section 260. "Registration No. 1" and "registration No. 2" in the item "currently used communication bandwidth (bps)" both correspond to the item "registration No." in the QoS configuration information table 530. The "registration No. 1" and the "registration No. 2" in the item "currently used communication bandwidth (bps)" store values of the item "required bandwidth (bps)" corresponding to the respective "registration No.". The "total" in the item "currently used communication bandwidth (bps)" stores a sum of values of each of the "required bandwidth (bps)". Stored in the item "available communication bandwidth (bps)" is a value obtained by subtracting the value in the "total" in the item "currently used communication bandwidth (bps)" from the value in the item "current total communication bandwidth (bps)". The values in the item "currently used communication bandwidth (bps)" and the item "available communication bandwidth (bps)" are updated every time the bandwidth configuring section 260 newly conducts the "bandwidth configuration" or every time the bandwidth reserving section 281 deletes the content in the "bandwidth configuration".

In FIG. 17, "30M" is stored in the item "current total communication bandwidth (bps)". Furthermore, corresponding to the QoS configuration information table 530 in FIG. 16, stored in the item "currently used communication bandwidth (bps)" are the two required bandwidths of "10M" and "6M", and a total of these required bandwidths of "16M". In addition, "14M" is stored in the item "available communication bandwidth (bps)". Thus, it is indicated that, in the communication path between the relay apparatus 101 and the other relay apparatuses 101, "among the total communication bandwidth of 30 Mbps, a bandwidth of 16 Mbps is used and the currently available communication bandwidth is 14 Mbps".

Figure 18:
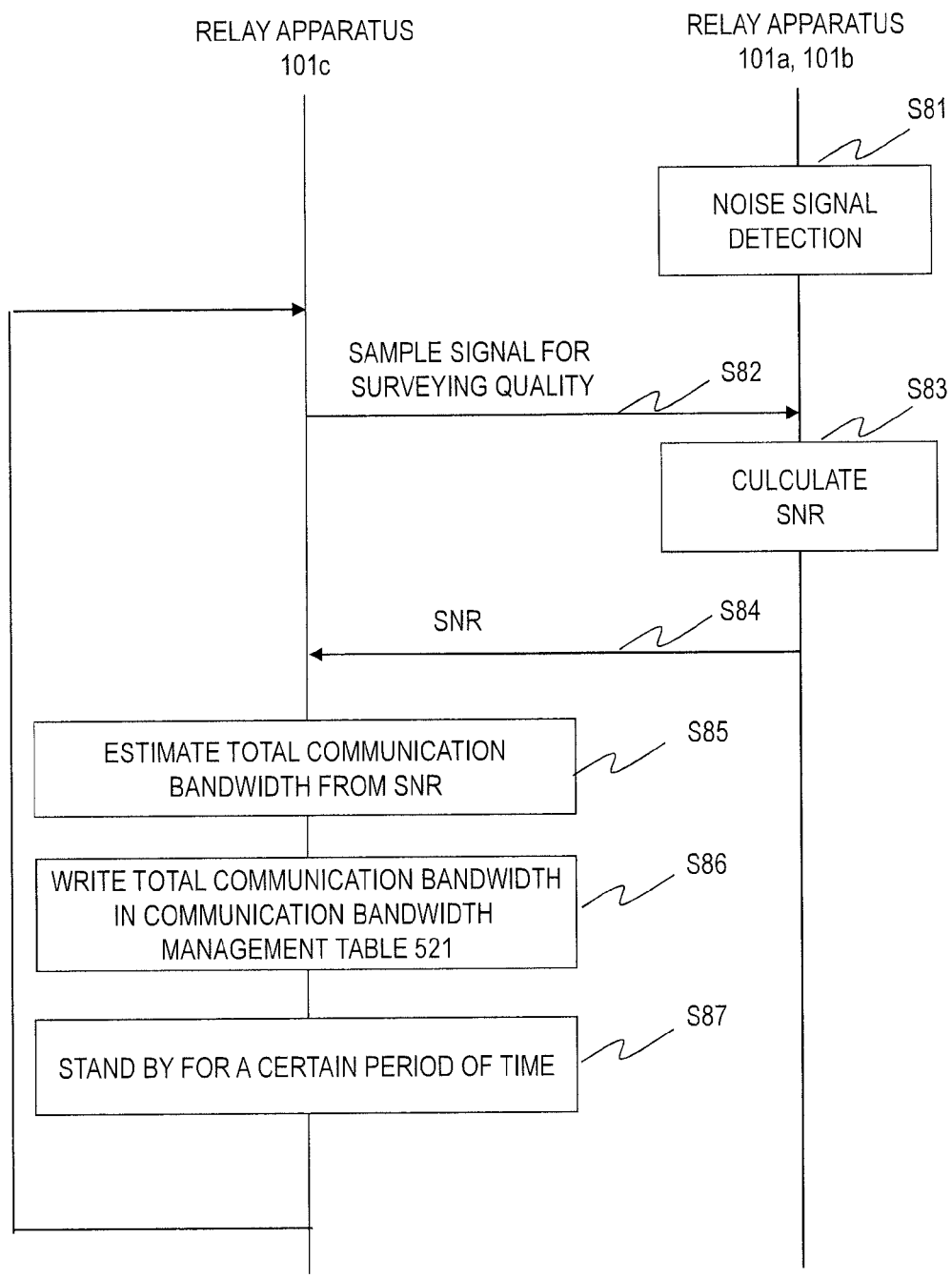
FIG. 18 is a sequence diagram of a method of estimating a total communication bandwidth, which is conducted by a total communication bandwidth estimating section of the present invention.

FIG. 18 is a sequence diagram showing a method conducted by the total communication bandwidth estimating section 131 to estimate the total communication bandwidth within the communication path between the multiple relay apparatuses 101. FIG. 18 is one example of the estimation method of a case where the relay apparatus 101*c* estimates the total communication bandwidth of the communication path connecting the relay apparatus 101*c* to the relay apparatuses 101*a* and 101*b*. The estimation method for the communication bandwidth described here is merely one example, and other methods may also be used.

First, the total communication bandwidth estimating section 131 in the relay apparatus 101*a* or the relay apparatus 101*b* detects a noise signal existing in the communication path connecting to the relay apparatus 101*c* (S81). This process is conducted before the next S82.

When the total communication bandwidth estimating section 131 of the relay apparatus 101*c* estimates the total communication bandwidth, first, the total communication bandwidth estimating section 131 of the relay apparatus 101*c* transmits a predefined sample signal to the relay apparatus 101*a* or 101*b* to acquire an SNR (S82).

Upon receiving the predefined sample signal, the total communication bandwidth estimating section 131 of the relay apparatus 101*a* or 101*b* calculates the electrical power of the predefined sample signal and the electrical power of the noise signal. Then, the total communication bandwidth estimating section 131 of the relay apparatus 101*a* or 101*b* obtains the SNR by calculating the ratio of these electrical powers (S83), and transmits the SNR to the relay apparatus 101*c* (S84).

Figure 19:
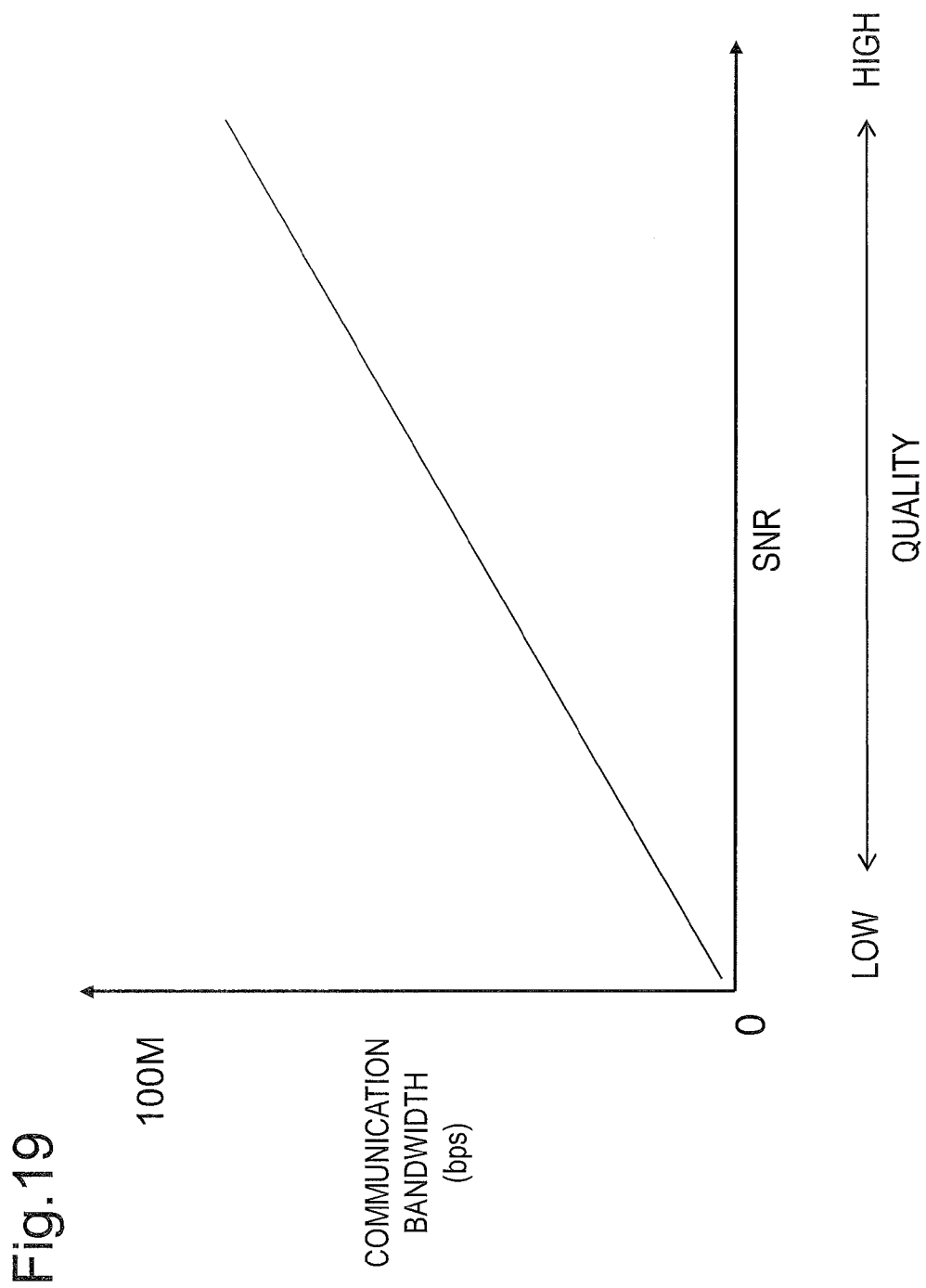
FIG. 19 shows one example of a correspondence relationship between SNR and communication bandwidth.

Upon receiving the SNR, the total communication bandwidth estimating section 131 of the relay apparatus 101*c* estimates the total communication bandwidth in the communication path connecting to the relay apparatus 101*a* or 101*b* based on a correspondence relationship between SNR and communication bandwidth, which is shown in FIG. 19 (S85).

As shown in FIG. 19, the total communication bandwidth becomes larger as the value of the SNR becomes larger. The correspondence relationship between SNR and communication bandwidth is configured in advance by the total communication bandwidth estimating section 131.

In addition, the relay apparatus 101c can also acquire RSSI (Received Signal Strength Indication), PER (Packet Error Rate), FER (Frame Error Rate), or BER (Bit Error Rate) from the relay apparatus 101a or 101b as a communication service quality of the communication path. Similar to the case with the SNR in FIG. 19, the total communication bandwidth becomes larger as the value of the RSSI becomes larger. Furthermore, the total communication bandwidth becomes larger as the value of the PER, FER, or BER becomes smaller. The total communication bandwidth estimating section 131 of the relay apparatus 101c may estimate the total communication bandwidth by using these values.

After estimating the total communication bandwidth as described above, the total communication bandwidth estimating section 131 of the relay apparatus 101c writes the estimated total communication bandwidth in the item "current total communication bandwidth (bps)" of the communication bandwidth management table 521 shown in FIG. 17 (S86).

Then, after standing by for a certain period of time (S87), the total communication bandwidth estimating section 131 of the relay apparatus 101c transmits the predefined sample signal to the relay apparatus 101a or 101b once again (S87 S82).

Figure 20:
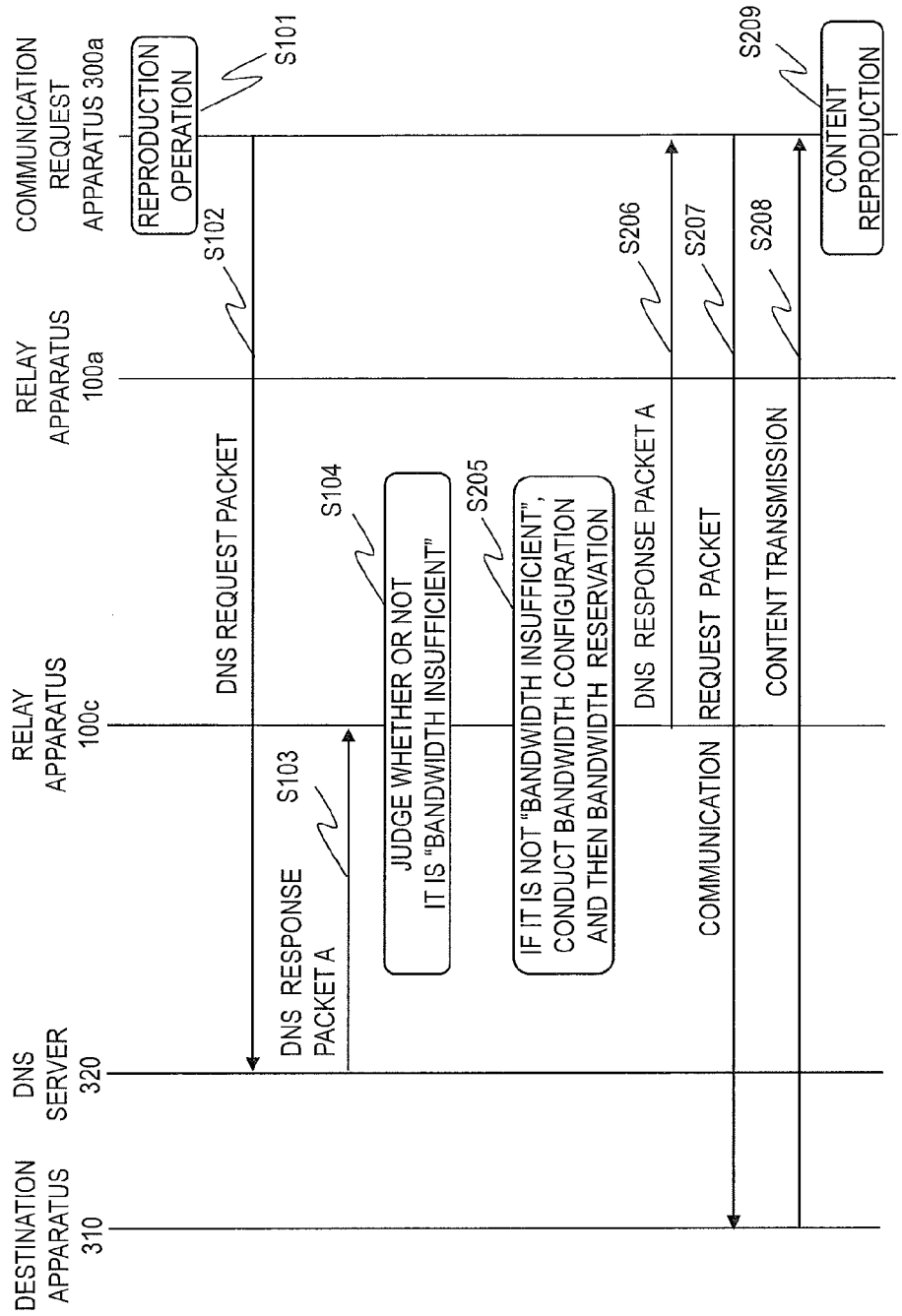
FIG. 20 shows a sequence of operations by each instrument when it is NOT "bandwidth insufficient" in a network with the second embodiment of the present invention.

FIG. 20 is a sequence diagram showing operations of each of the instruments when it is not "bandwidth insufficient" in the network in FIG. 1, which however includes the relay apparatus 101 of the second embodiment. Here, operations of each of the instruments will be described by using the example in which the communication request apparatus 300a shown in FIG. 1 requests for a content transmission. In FIG. 20, operations identical to those in FIG. 7 are given the same reference characters, and descriptions of these operations are omitted.

If the communication bandwidth control device 201 of the relay apparatus 101c judges that it is not "bandwidth insufficient", the communication bandwidth control device 201 conducts a bandwidth configuration for the required bandwidth corresponding to the domain name included in the DNS response packet A, and reserves the required bandwidth (S205). Then, the PLC communication section 120 of the relay apparatus 101c transmits the DNS response packet A to the communication request apparatus 300a via the relay apparatus 101a without rewriting the DNS response packet A (S206).

When the communication request apparatus 300a receives the DNS response packet, the communication request apparatus 300a refers to the reply IP address included in the DNS response packet A. Since the IP address of the destination apparatus 310 is written in the reply IP address in this case, the communication request apparatus 300a transmits a communication request packet requesting a content transmission destined for the destination apparatus 310 (S207).

When the destination apparatus 310 receives the communication request packet, the destination apparatus 310 transmits the content to the communication request apparatus 300a (S208). Then, the communication request apparatus 300a receives the content from the destination apparatus 310 and reproduces the content (S209).

Figure 21:
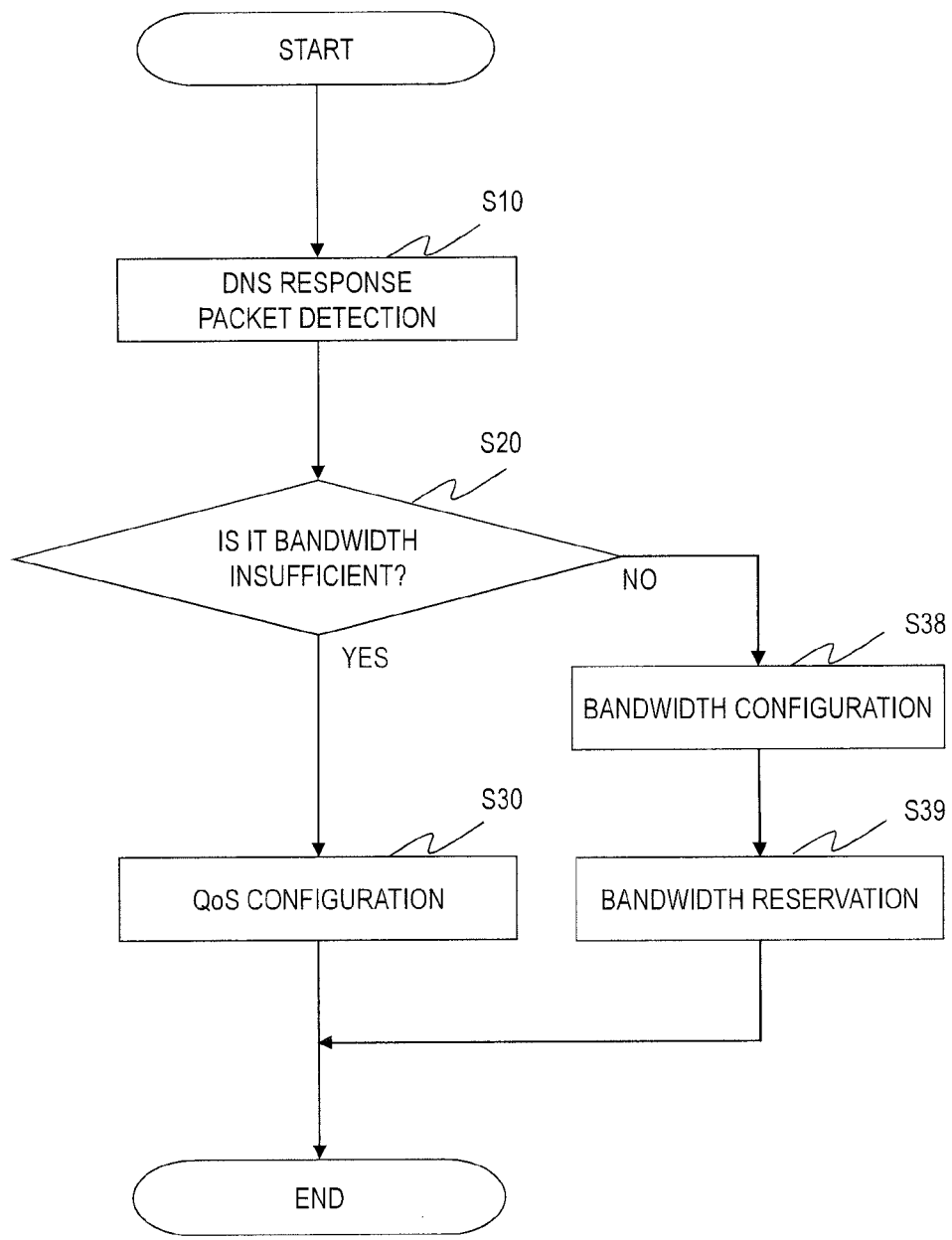
FIG. 21 is a flowchart showing operations of S104 and S105 in FIG. 7 and S104 and S205 in FIG. 20, which are conducted by a communication bandwidth control device according to the second embodiment of the present invention.

FIG. 21 is a flowchart showing operations of S104 and S205 in FIG. 20 and S104 and S105 in FIG. 7, which are conducted by the communication bandwidth control device 201 of the relay apparatus 101c. Here in FIG. 21, operations identical to those in FIG. 12 are given the same reference characters, and descriptions of these operations are omitted.

In FIG. 21, if the condition judging section 230 judges that it is not "bandwidth insufficient" (No at S20; S27 in FIG. 13), the QoS configuring section 240 conducts the "bandwidth configuration" (S38). More specifically, the bandwidth configuring section 260 in the QoS configuring section 240 sets the QoS configuration parameters into the communication bandwidth management table 521 and into the QoS configuration information table 530, and updates both tables. For example, in a case where the currently available bandwidth is "14M" as in FIG. 17, if the packet detecting section 210 detects a DNS response packet with a domain name "def.sss.com", the bandwidth configuring section 260 can configure a required bandwidth since the required bandwidth is "10M". Therefore, in this case, the bandwidth configuring section 260 writes the QoS configuration parameters in the third position in the QoS configuration information table 530 in FIG. 16. In addition, the bandwidth configuring section 260 writes the QoS configuration parameters in the third position in the communication bandwidth management table 521 in FIG. 17, and updates the bandwidth in the "total" to "26M" and the item "available communication bandwidth (bps)" to "4M".

When the "bandwidth configuration" is conducted as described above, the bandwidth reserving section 281 of the QoS controlling section 270 refers to the QoS configuration information table 530, and reserves the required bandwidth that has been newly configured in the QoS configuration information table 530 (S39).

As described above, even in a network that includes a communication request apparatus that does not have a QoS configuration function, the second embodiment enables the communication bandwidth control device 201 of the present invention to reserve the required bandwidth when it is not "bandwidth insufficient". As a result, the communication request apparatus 300 can properly receive the content without being subjected to interferences by other communications.

Furthermore, in the example shown in FIG. 20, the relay apparatuses 101a and 101b do not conduct bandwidth reservations in the communication path connecting to the relay apparatus 101c, since the transmission of the content is in one direction (downlink) from the destination apparatus 310 to the communication request apparatus 300a. However, if the communication is a two-way communication such as an Internet telephone or the like, it is necessary to secure a bandwidth for the communication in the opposite direction (uplink) from the communication request apparatus 300a to the destination apparatus. Therefore, in a two-way communication, if the relay apparatus 101c judges that it is not "bandwidth insufficient", the relay apparatus 101c may transmit a command to the relay apparatuses 101a and 101b to conduct a bandwidth reservation for the uplink; and the relay apparatuses 101a and 101b may conduct a bandwidth reservation for the uplink in accordance with the command.

Alternatively, the relay apparatus 101c may hold information regarding the required bandwidth necessary for the downlink and the relay apparatuses 101a and 101b may hold information regarding the required bandwidth necessary for the uplink, and each of the relay apparatuses 101a to 101c may judge whether it is "bandwidth insufficient" or not. Then, each of the relay apparatuses 101a to 101c that have judged that it is not "bandwidth insufficient" may conduct the bandwidth reservation.

Third Embodiment

In the first and second embodiments, the communication bandwidth control devices 200 and 201 in the relay apparatuses 100 and 101 rewrite the reply IP address in the DNS response packet to the address of the information provision apparatus 290 when it is "bandwidth insufficient". Therefore, the communication request apparatus 300 transmits the communication request packet to the information provision apparatus 290, and the information provision apparatus 290 receives this and sends the "bandwidth insufficient information" to the communication request apparatus 300 as a reply. As a result, the user of the communication request apparatus 300 can understand that the communication path has insufficient bandwidth. However, in a third embodiment, a communication bandwidth control device 202 has the function of the information provision apparatus 290, and the relay apparatus 102 of the present invention including the communication bandwidth control device 202 rewrites the reply IP address in the DNS response packet to an address of its own.

Figure 22:
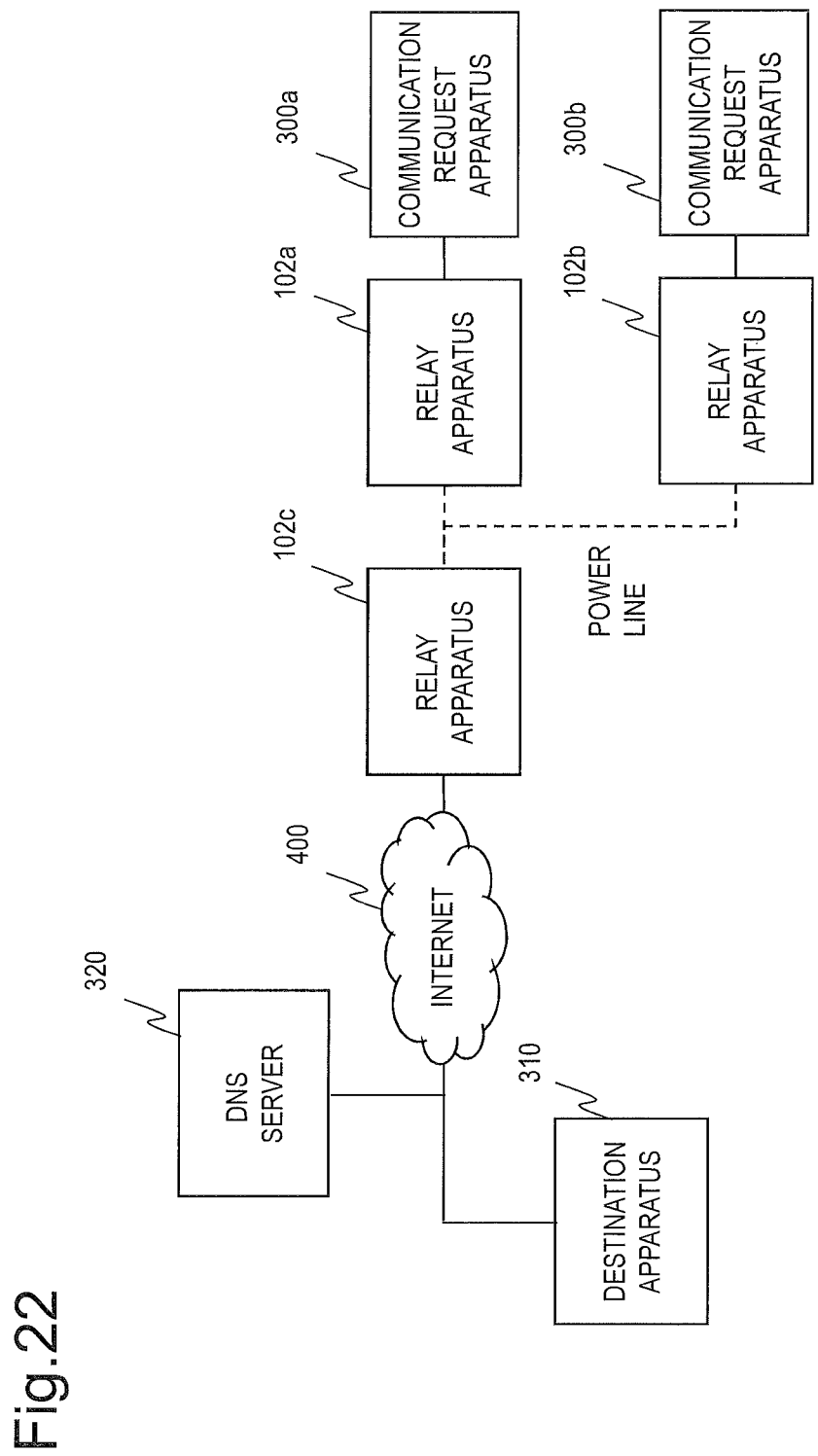
FIG. 22 shows one example of a network with an embodiment of the present invention.

FIG. 22 shows a configuration of a network with the third embodiment of the present invention. When compared to the network in FIG. 1, the network in FIG. 22 does not include the information provision apparatus 290, and instead of the relay apparatuses 100a to 100c, relay apparatuses 102a to 102c including the communication bandwidth control device 202 of the third embodiment are included.

Figure 23:
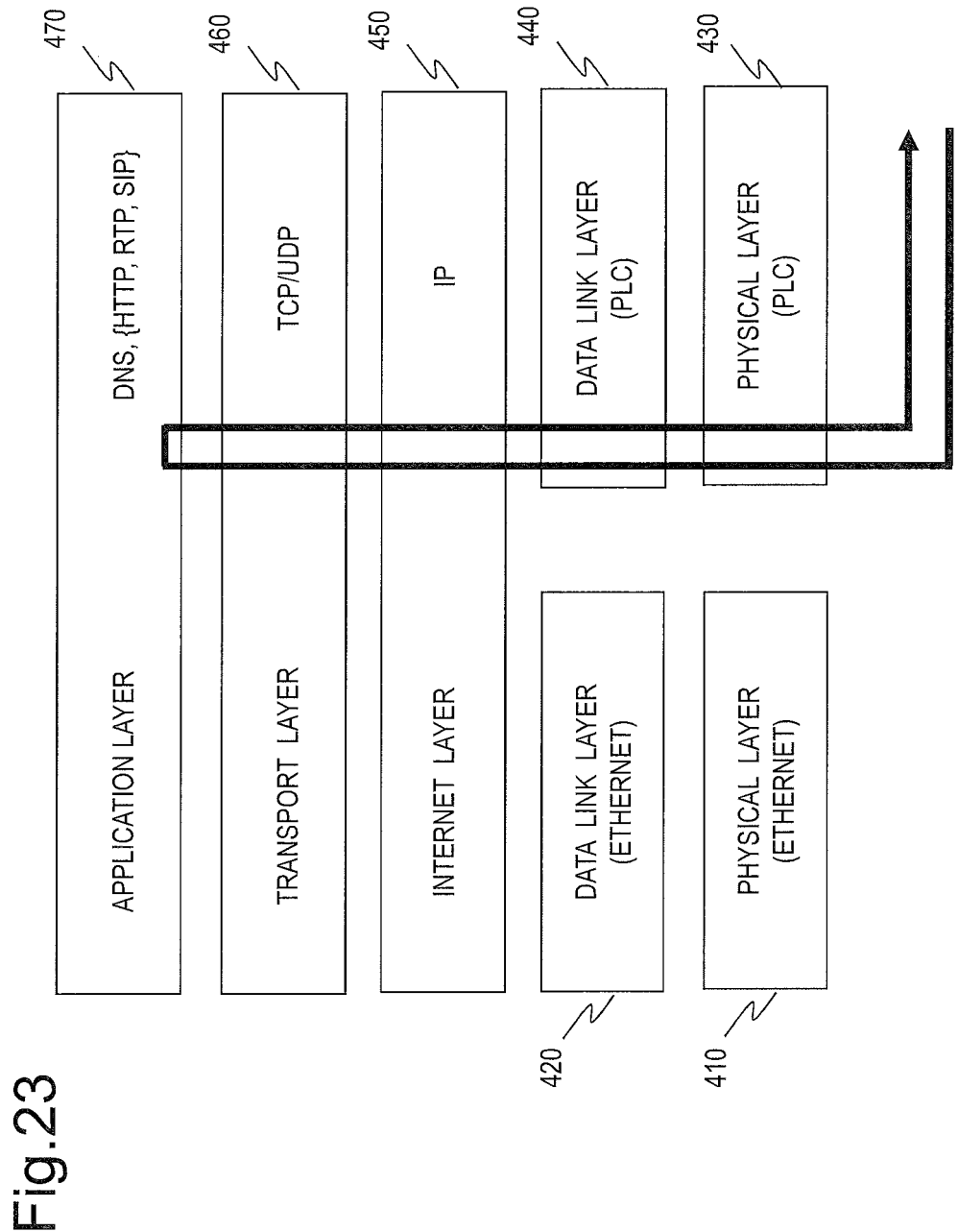
FIG. 23 shows a flow of data through each protocol stack when a communication request packet is received from a communication request apparatus of a third embodiment of the present invention.

FIG. 23 shows a flow of data through each protocol stack when a communication request packet requesting a content transmission is received from the communication request apparatus 300. When the relay apparatus 102c receives the communication request packet from the communication request apparatus 300, the relay apparatus 102c confirms a destination IP address in this packet at the transport layer 460. If the destination is the relay apparatus 102c, an application processing in accordance with the communication request packet is conducted at the application layer 470. Then, a result of the processing is transmitted to the communication request apparatus 300 via the physical layer (PLC) 430.

Figure 24:
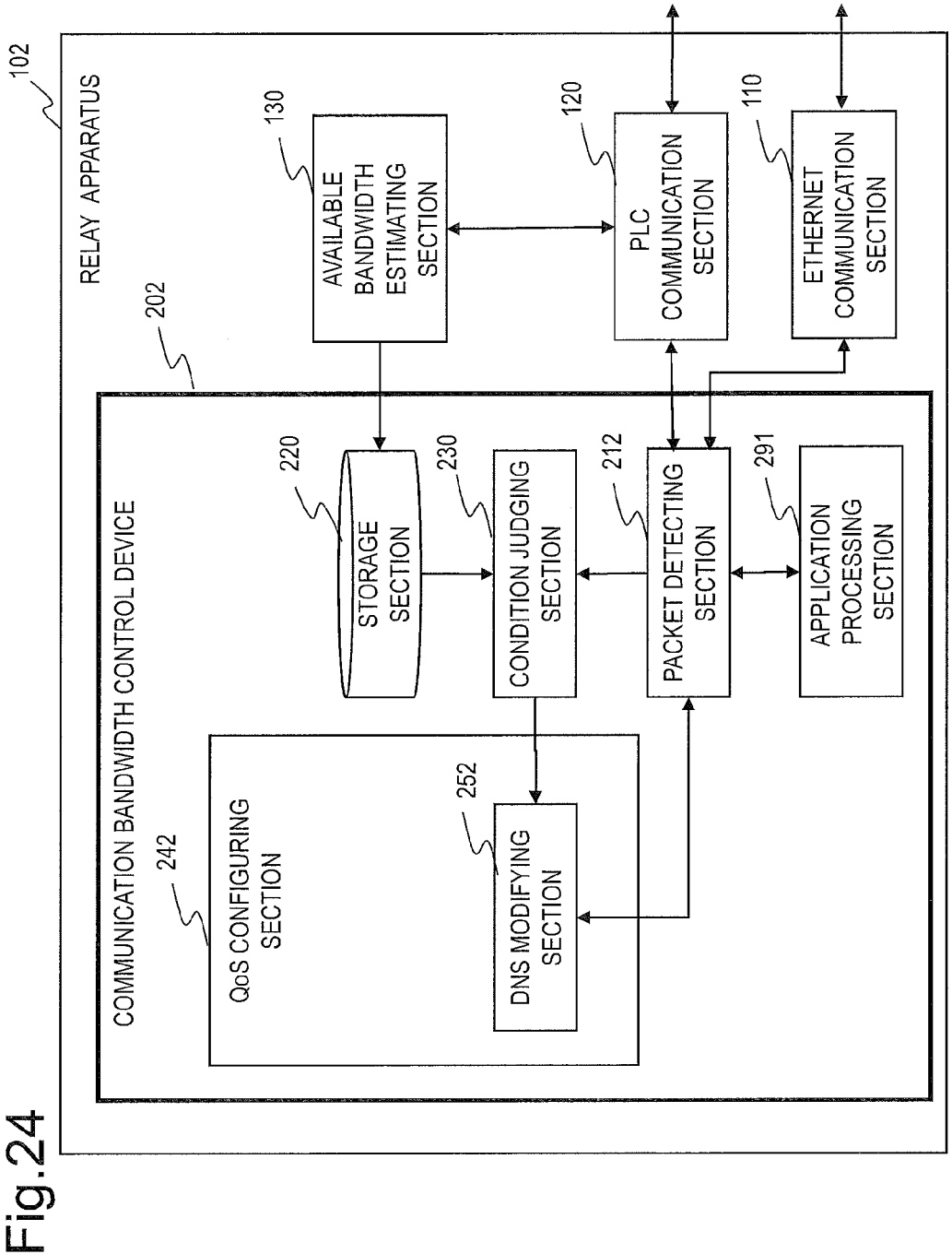
FIG. 24 shows functional blocks of a relay apparatus of the third embodiment of the present invention.

FIG. 24 is a diagram of an internal configuration of a relay apparatus 102 that includes the communication bandwidth control device 202 of the third embodiment. The relay apparatus 102 includes the Ethernet communication section 110, the PLC communication section 120, the available bandwidth estimating section 130, and the communication bandwidth control device 202. The communication bandwidth control device 202 includes a packet detecting section 212, the storage section 220, the condition judging section 230, a QoS configuring section 242, and an application processing section 291. The QoS configuring section 242 includes a DNS modifying section 252. Here, those that have operations identical to those in the first embodiment are given the same reference characters of FIG. 3, and descriptions of those are omitted.

In addition to the DNS response packet, the packet detecting section 212 also detects a communication request packet addressed to the relay apparatus 102 of its own. Then, the packet detecting section 212 transfers the detected communication request packet to the application processing section 291, which will be described below. The communication request packet includes an http request and the like. The packet detecting section 212 can identify the type of the communication request packet by using a port number in a TCP (UDP) header in the communication request packet. For example, http corresponds to port number 80.

If the destination IP address in the communication request packet is that of the relay apparatus 102, the application processing section 291 transmits the "bandwidth insufficient information" shown in FIG. 10 or FIG. 11 to the communication request apparatus 300.

The QoS configuring section 242 differs from the QoS configuring section 240 only in that the QoS configuring section 242 includes the DNS modifying section 252 instead of the DNS modifying section 250.

If the condition judging section 230 judges that it is "bandwidth insufficient", the DNS modifying section 252 rewrites the IP address that belongs to the destination apparatus and that is included in the DNS response packet, to the IP address of the relay apparatus 102 of its own. Furthermore, the DNS modifying section 252 rewrites the "TTL (cache time)" included in the DNS response packet to "0".

Figure 25:
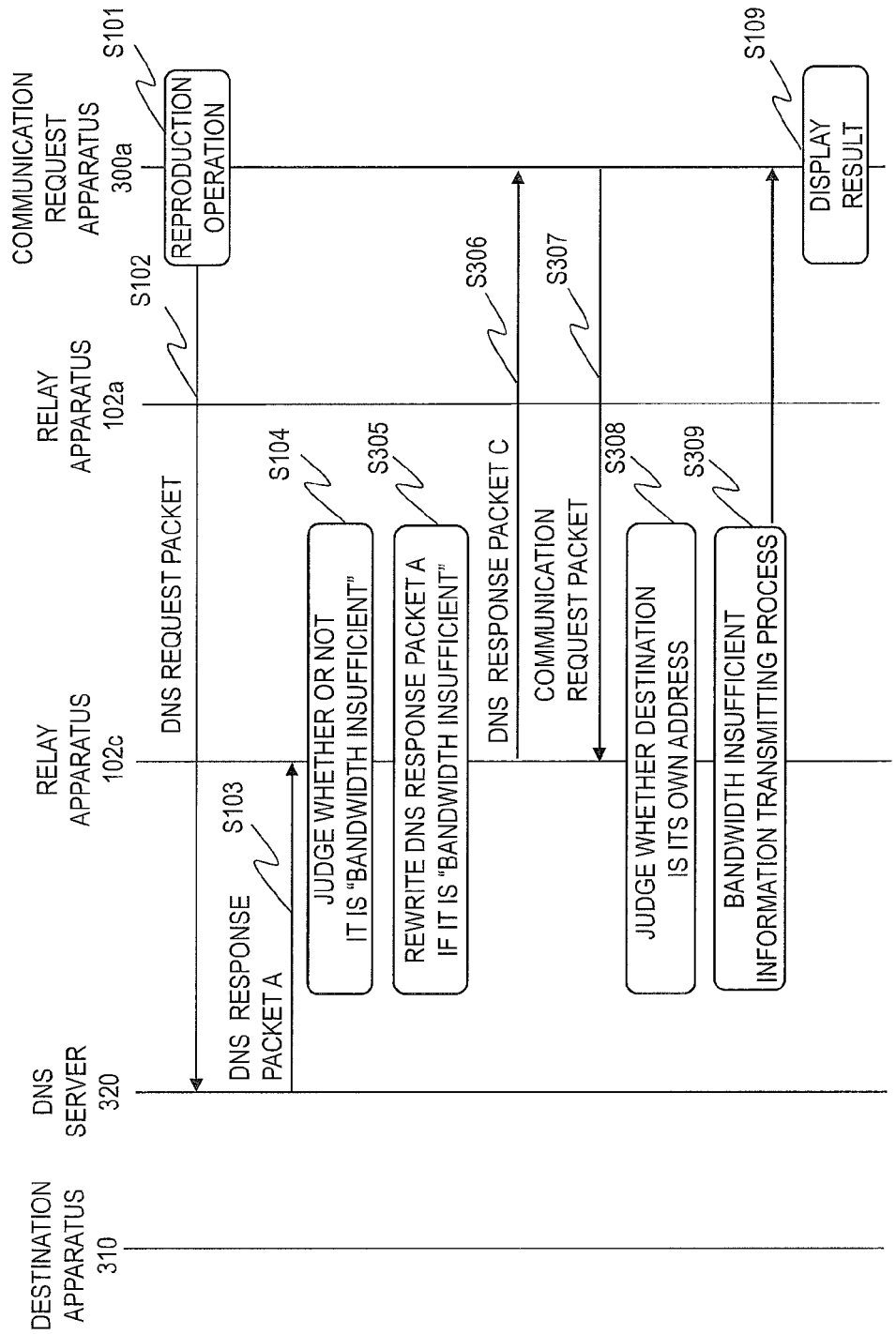
FIG. 25 shows a sequence of operations by each instrument when it is "bandwidth insufficient" in a network with the third embodiment of the present invention.

FIG. 25 is a sequence diagram showing operations of each of the instruments when it is "bandwidth insufficient" in the network in FIG. 22. In FIG. 25, the operations identical to those in FIG. 7 are given the same reference characters, and descriptions of these operations are omitted.

Figure 26:
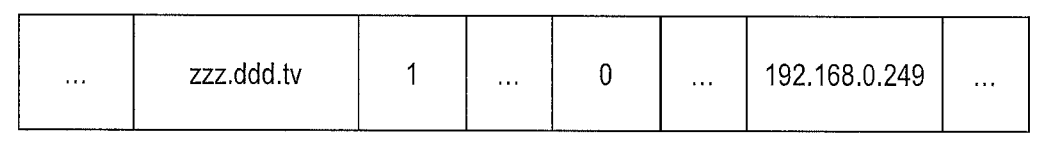

If it is judged to be "bandwidth insufficient", the communication bandwidth control device 202 of the relay apparatus 102c rewrites "TTL (cache time)" in the DNS response packet A, as shown in FIG. 8, from "30" to "0" and rewrites the "reply IP address" from "10.20.30.1" to "192.168.0.249" which is an IP address of the relay apparatus 102c. As a result, the relay apparatus 102c generates a DNS response packet C as shown in FIG. 26 (S305).

Then, the PLC communication section 120 of the relay apparatus 102c transmits the DNS response packet C to the communication request apparatus 300a via the relay apparatus 100a (S306).

When the communication request apparatus 300a receives the DNS response packet C, the communication request apparatus 300a refers to the reply IP address included in the DNS response packet C. Since the IP address of the relay apparatus 102c is written in the reply IP address in this case, the communication request apparatus 300a transmits a communication request packet requesting a content transmission destined for the relay apparatus 102c (S307).

When the communication bandwidth control device 202 of the relay apparatus 102c receives the communication request packet, the communication bandwidth control device 202 judges the destination of the communication request packet (S308). If it is judged that the destination is an address of the relay apparatus 102c of its own, the communication bandwidth control device 202 of the relay apparatus 102c transmits the "bandwidth insufficient information" to the communication request apparatus 300a ("bandwidth insufficient information transmitting process") (S309).

In the network in FIG. 22, operations by each instruments when it is not "bandwidth insufficient" are identical to those in FIG. 20, except for the following difference. Therefore, descriptions for those other than the difference are omitted. At S207 in FIG. 20, the communication bandwidth control device 202 of the relay apparatus 102c judges whether the destination of the communication request packet is the address of the relay apparatus 102 of its own. Then, since the destination is not the address of the relay apparatus 102 of its own, the communication bandwidth control device 202 transmits the communication request packet to the destination apparatus 310 without conducting any additional processes.

Next, operations of S104 and S305 conducted by the communication bandwidth control device 202 of the relay apparatus 102c in FIG. 25 will be described. These operations are almost identical to those in FIG. 12 and FIG. 13, and differ only in the specific process at S30 in FIG. 12. In this case, the DNS modifying section 252 in the QoS configuring section 242 rewrites the reply IP address included in the DNS response packet to the IP address of the relay apparatus 102c, and the TTL (cache time) to 0. For example, the DNS modifying section 250 rewrites the DNS response packet from that in FIG. 8 to that in FIG. 26.

Figure 27:
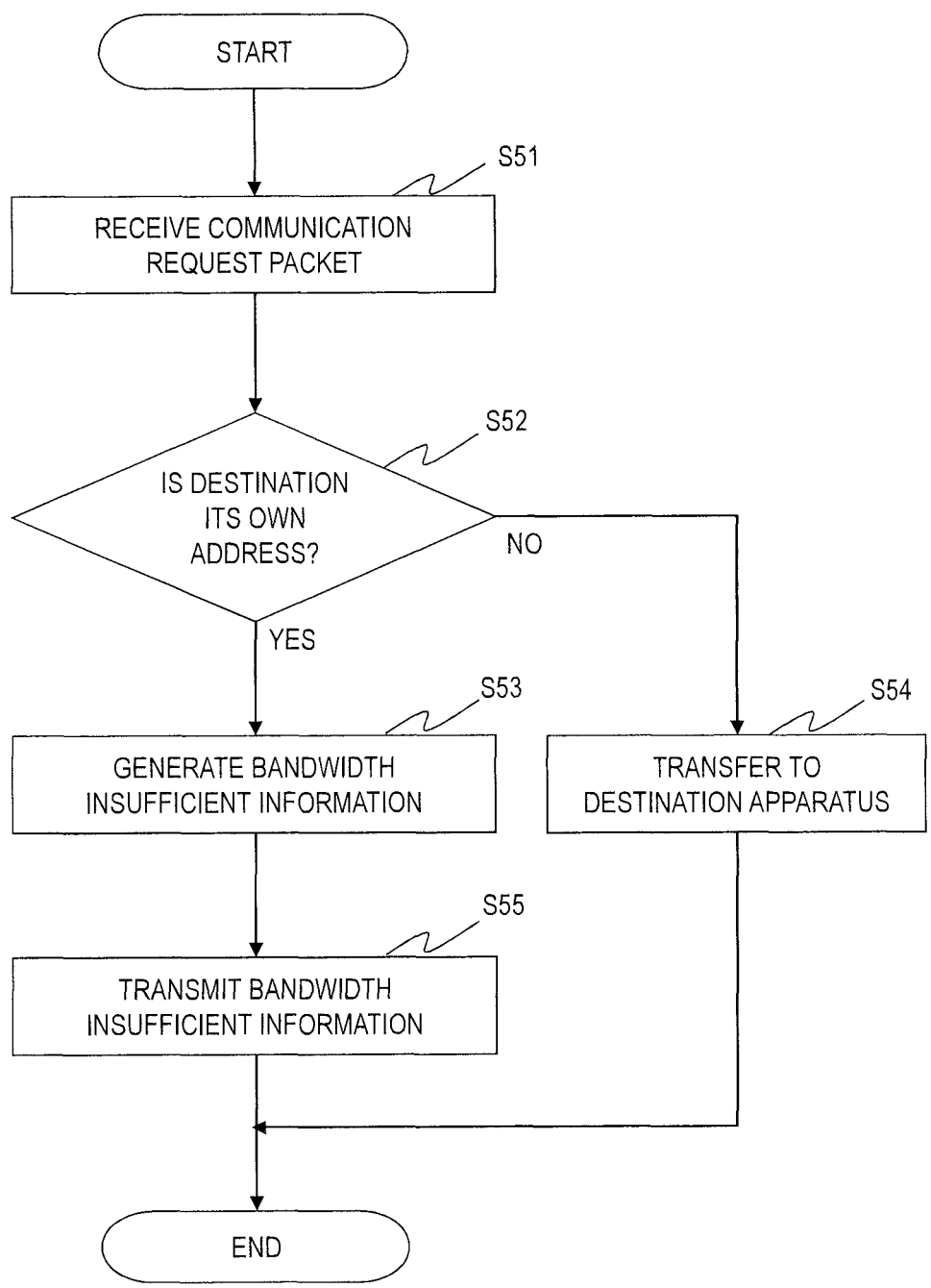
FIG. 27 is a flowchart showing operations of S308 and S309 in FIG. 25 conducted by a communication bandwidth control device according to the third embodiment of the present invention.

FIG. 27 is a flowchart showing operations of S308 and S309 in FIG. 25. When the packet detecting section 212 of the relay apparatus 102c receives the communication request packet from the communication request apparatus 300a (S51), the packet detecting section 212 judges whether or not the destination is the address of its own. If the packet detecting section 212 judges that the destination is not the address of its own (No at S52), the packet detecting section 212 transfers the communication request packet to the destination apparatus 310 (S54). On the other hand, if it is judged that the destination is the address of its own, the packet detecting section 212 transfers the communication request packet to the application processing section 291 of the relay apparatus 102c, and the application processing section 291 generates the "bandwidth insufficient information" (S53). Then, the application processing section 291 transmits the "bandwidth insufficient information" to the communication request apparatus 300a (S55).

As described above, according to the third embodiment, the communication bandwidth control device 202 of the present invention can attain an advantageous effect similar to the first embodiment without an installment of the provision apparatus 290, by including the application processing section 291.

The communication bandwidth control device 202 according to the third embodiment may be combined with the communication bandwidth control device 201 according to the second embodiment.

Fourth Embodiment

In the first to third embodiments, the communication bandwidth control devices 200 to 202 in the relay apparatuses 100 to 102 have rewritten the reply IP address and the TTL (cache time) included in the DNS response packet if it is judged to be "bandwidth insufficient" upon receiving the DNS response packet.

In a fourth embodiment, when a relay apparatus 103 including a communication bandwidth control device 203 of the present invention judges that it is "bandwidth insufficient", the relay apparatus 103 judges whether the required bandwidth can be secured by conducting a priority control. This "priority control" refers to a termination of communications having priorities lower than a priority of the communication corresponding to the domain name included in the DNS response packet. When the required bandwidth cannot be secured even if the priority control is conducted, the communication bandwidth control device 203 rewrites the reply IP address and the TTL (cache time) included in the DNS response packet. On the other hand, when the required bandwidth can be secured if the priority control is conducted, the communication bandwidth control device 203 conducts the priority control. As a result, a content in a communication with a high priority is prioritized and transmitted to the communication request apparatus 300.

The relay apparatus 103 according to the fourth embodiment of the present invention and a control method of the relay apparatus 103 will be described in the following. The network configuration in the present embodiment will be described as being identical to the network configuration shown in FIG. 1. However, the relay apparatus 103 of the fourth embodiment corresponding to the relay apparatus 100a, 100b, or 100c in FIG. 1 is referred to as the relay apparatus 103a, 103b, or 103c.

Figure 28:
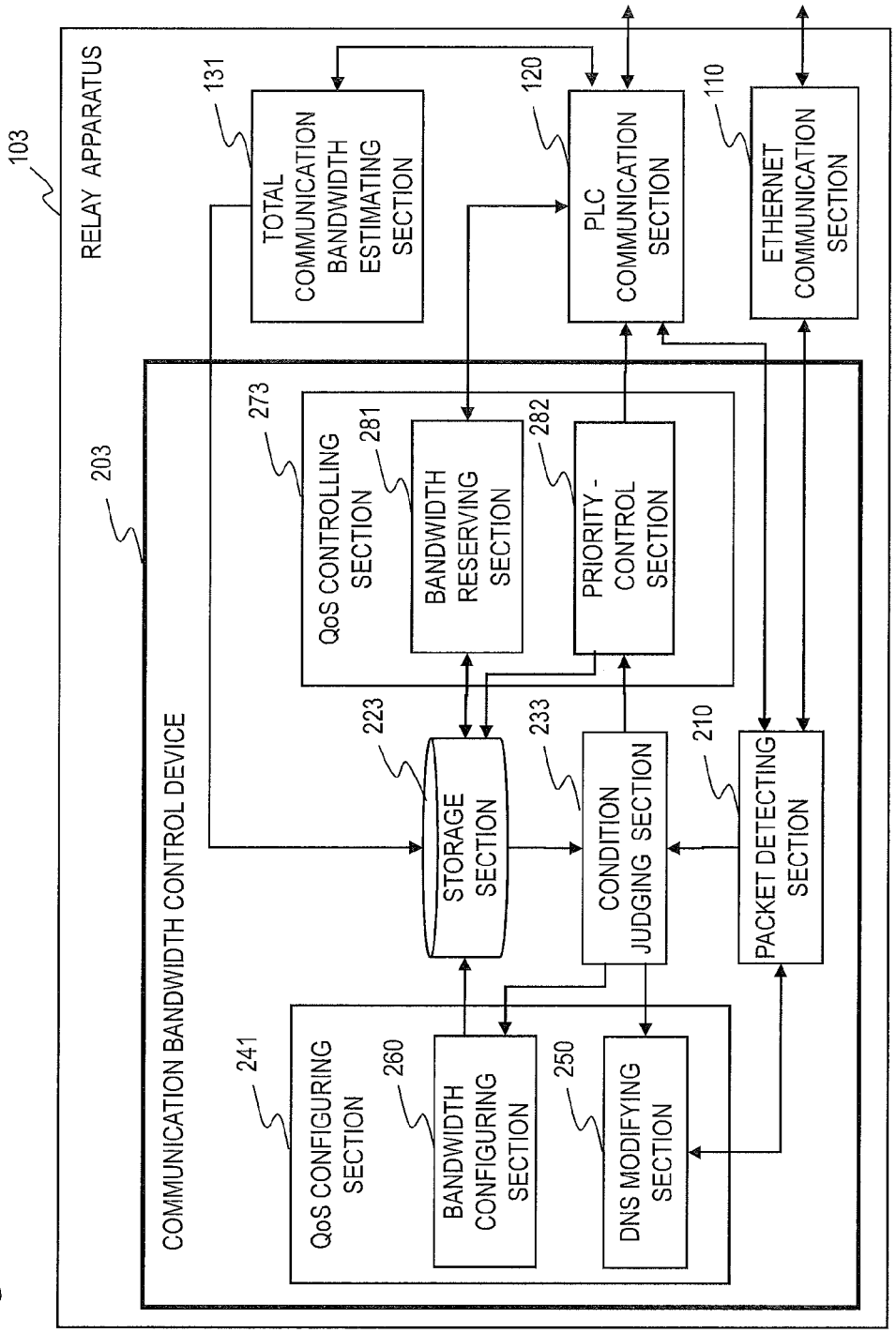
FIG. 28 shows functional blocks of a relay apparatus of a fourth embodiment of the present invention.

FIG. 28 is a diagram of an internal configuration of the relay apparatus 103 including the communication bandwidth control device 203 of the present embodiment. The relay apparatus 103 includes the Ethernet communication section 110, the PLC communication section 120, the total communication bandwidth estimating section 131, and the communication bandwidth control device 203. The communication bandwidth control device 203 includes the packet detecting section 210, a storage section 223, a condition judging section 233, the QoS configuring section 241, and a QoS controlling section 273. The QoS configuring section 241 includes the DNS modifying section 250, and the bandwidth configuring section 260. The QoS controlling section 273 includes the bandwidth reserving section 281 and a priority-control section 282. Here, those that have operations identical to those of the second embodiment are given the same reference characters as in FIG. 15, and descriptions of these operations are omitted.

The storage section 223 includes a service information table 511, the communication bandwidth management table 521, and a QoS configuration information table 531. Here, description of the communication bandwidth management table 521 is omitted, since it is identical to that in the second embodiment.

FIG. 29 shows one example of a data structure in the service information table 511 according to the present embodiment. When compared to the service information table 510 in FIG. 4, the service information table 511 differs from that by including item "priority" in the item "service parameter".

Stored in the item "priority" is a priority indicating a priority level of the communication corresponding to each domain name. A larger numerical value for the priority indicates that the communication corresponding to the domain name has a higher priority level. With regard to the communications of registration No. 1 to registration No. 5 listed in FIG. 29, a descending order of the priority level is "registration No. 1", "registration No. 3", "registration No. 5", "registration No. 2", and then "registration No. 4".

FIG. 30 shows one example of a data structure in the QoS configuration information table 531 according to the present embodiment. When compared to the QoS configuration information table 530 in FIG. 16, the QoS configuration information table 531 differs from that by having the item "priority" included in the item "data guarantee parameter". The item "priority" here is identical to the item "priority" in the service information table 511. Therefore, with regard to the communications of registration No. 1 and registration No. 2 in FIG. 30, a descending order of the priority level is "registration No. 1", and then "registration No. 2".

Returning back to FIG. 28, when the condition judging section 233 receives the DNS response packet, the condition judging section 233 refers to the communication bandwidth management table 521, and judges whether it is "bandwidth insufficient" or not. If it is judged not to be "bandwidth insufficient", the condition judging section 233 allows the bandwidth configuring section 260 to conduct the "bandwidth configuration".

On the other hand, if it is judged to be "bandwidth insufficient", the condition judging section 233 refers to the service information table 511, and obtains, from among the communications currently conducted with other relay apparatuses 103, a communication having a priority lower than the priority of the communication corresponding to the domain name included in the DNS response packet. Then, the condition judging section 233 judges whether or not the required bandwidth corresponding to the domain name included in the DNS response packet can be secured by terminating the obtained communication. When the condition judging section 233 judges that the required bandwidth can be secured, the condition judging section 233 allows the priority-control section 282 to terminate the obtained communication.

When compared to the QoS controlling section 270, the QoS controlling section 273 only differs from that by including the priority-control section 282. When the condition judging section 233 judges that the required bandwidth can be secured by conducting the priority control, the priority-control section 282 terminates a communication having a priority lower than the priority of the communication corresponding to the domain name included in the DNS response packet. Then, the priority-control section 282 deletes the content in the "bandwidth configuration" which is related to the communication and which is stored in the storage section 223.

Figure 31:
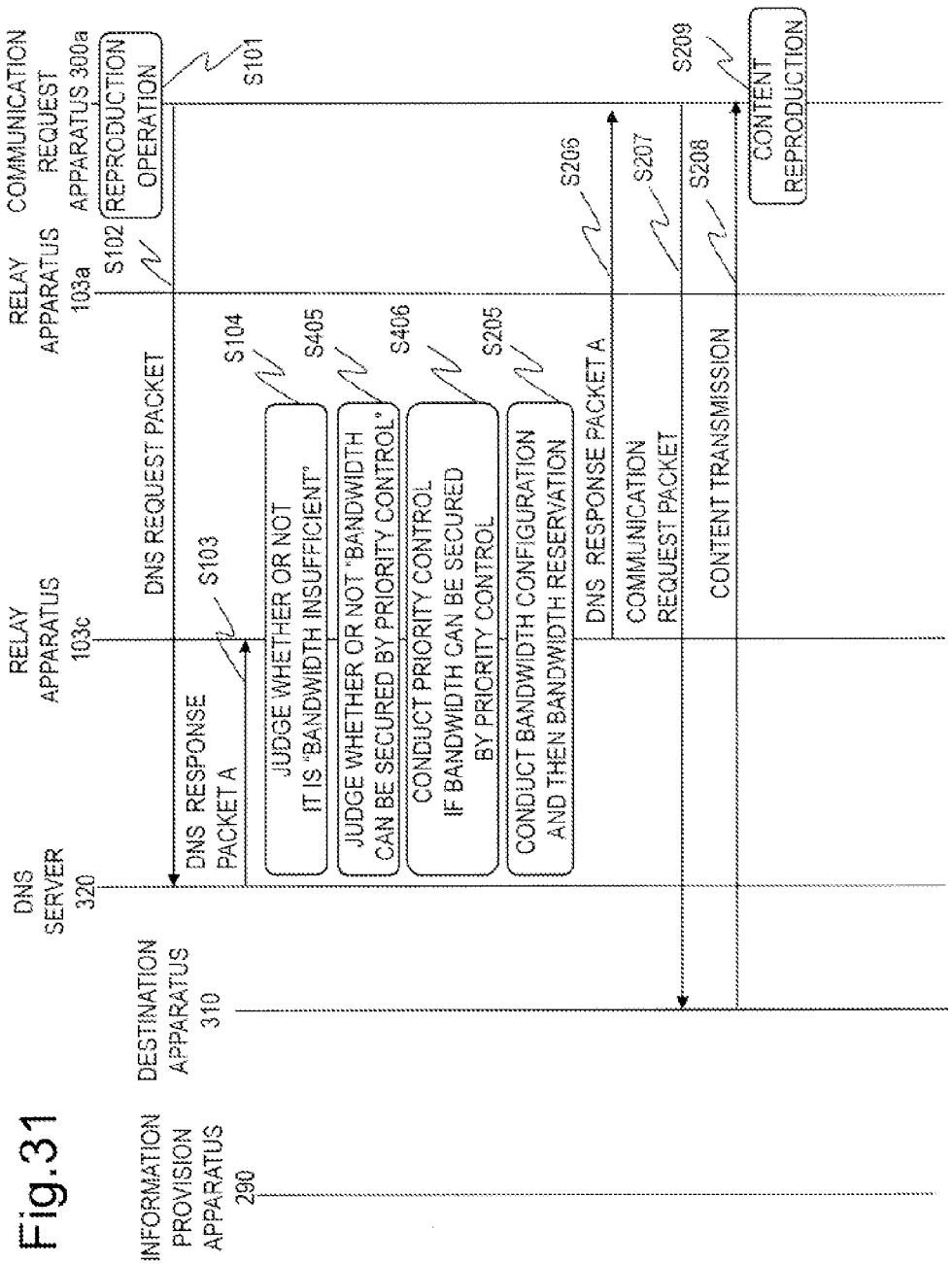
FIG. 31 shows a sequence of operations by each instrument when a required bandwidth for a content has been secured as a result of a priority control being conducted in a network with the fourth embodiment of the present invention.

FIG. 31 is a sequence diagram showing operations of each of the instrument when the required bandwidth has been secured by conducting the priority control in the network in FIG. 1, which however includes the relay apparatus 103 of the fourth embodiment. Here, operations of each of the instruments will be described by using the example in which there is a request for a content transmission by the communication request apparatus 300a shown in FIG. 1. In FIG. 31, operations identical to those in FIG. 20 and FIG. 25 are given the same reference characters, and descriptions of these operations are omitted.

If the communication bandwidth control device 203 of the relay apparatus 103c judges that it is "bandwidth insufficient", the communication bandwidth control device 203 obtains, from among the communications currently conducted with the relay apparatuses 103a and 103b, a communication having the communication priority lower than the communication priority corresponding to the domain name included in the DNS response packet. Then, the communication bandwidth control device 203 judges whether the required bandwidth corresponding to the domain name included in the DNS response packet can be secured by conducting a priority control of terminating the obtained communication (S405).

When the communication bandwidth control device 203 of the relay apparatus 103c judges that the required bandwidth can be secured by conducting the priority control, the communication bandwidth control device 203 conducts the priority control of terminating the obtained communication (S406). Then, the communication bandwidth control device 203 of the relay apparatus 103c conducts a bandwidth configuration for the required bandwidth corresponding to the domain name included in the DNS response packet A, and reserves the bandwidth (S205).

Figure 32:
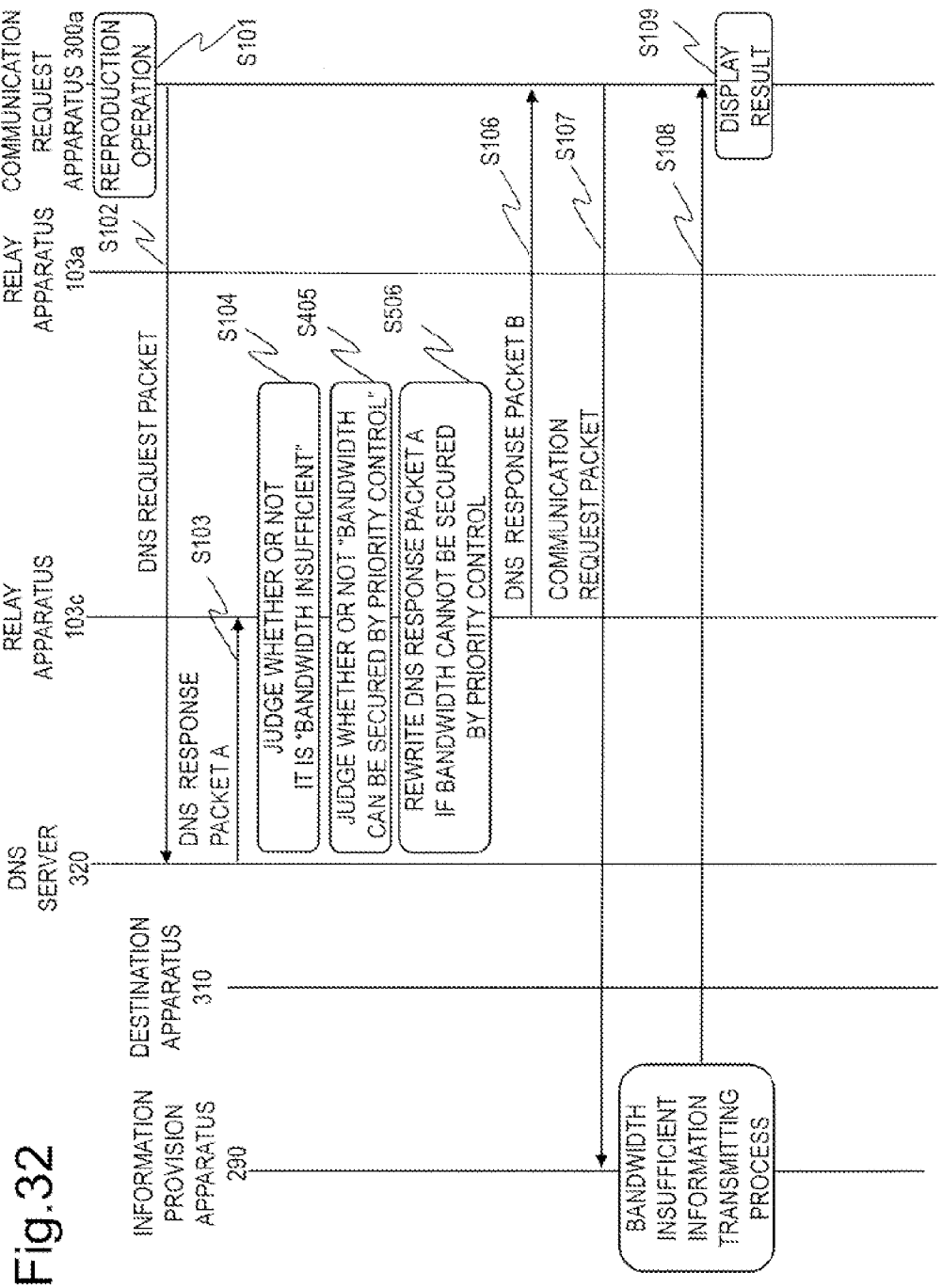
FIG. 32 shows a sequence of operations by each instrument when the required bandwidth for the content cannot be secured even if the priority control is conducted in the network with the fourth embodiment of the present invention.

FIG. 32 is a sequence diagram showing operations of each of the instruments when the required bandwidth cannot be secured even by conducting the priority control in the network in FIG. 1, which however includes the relay apparatus 103 of the fourth embodiment. In FIG. 32, operations identical to those in FIG. 7, FIG. 25, and FIG. 31 are given the same reference characters, and descriptions of these operations are omitted.

If the communication bandwidth control device 203 of the relay apparatus 103c judges that the required bandwidth cannot be secured even when the communication obtained at S405 is terminated, the communication bandwidth control device 203 rewrites the "TTL (cache time)" in the DNS response packet A to 0 and the "reply IP address" to the IP address of the information provision apparatus 290, and generates the DNS response packet B (S506). Then, the PLC communication section 120 of the relay apparatus 103c sends the DNS response packet B to the communication request apparatus 300a via the relay apparatus 103a as a reply (S106).

Figure 33:
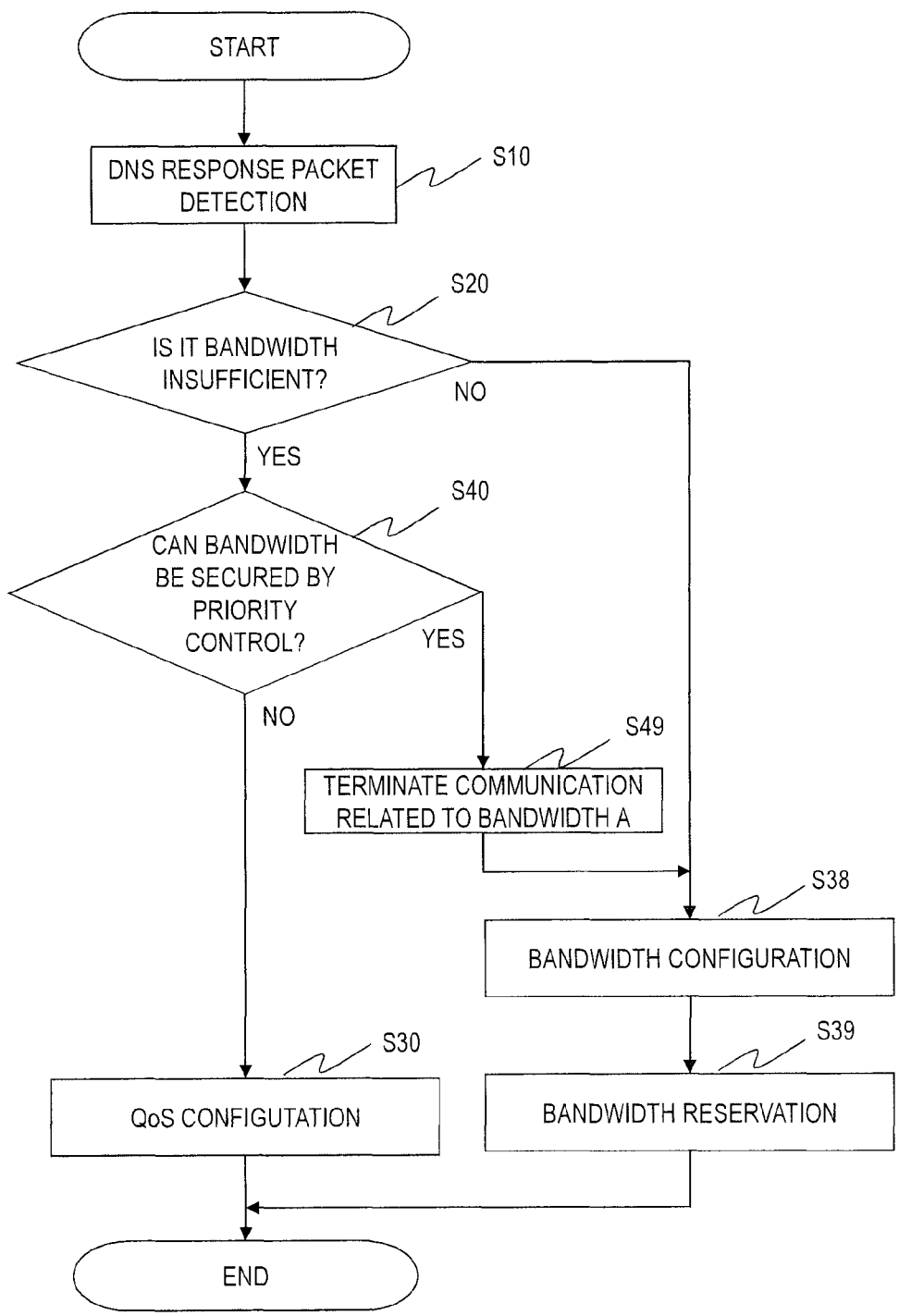
FIG. 33 is a flowchart showing operations of S104 to S205 in FIG. 31 and S104 to S506 in FIG. 32, which are conducted by a communication bandwidth control device according to the fourth embodiment of the present invention.

FIG. 33 is a flowchart showing operations of S104 to S205 in FIG. 31 and S104 to S506 in FIG. 32, which are conducted by the communication bandwidth control device 203 of the relay apparatus 103c. Here in FIG. 33, operations identical to those in FIG. 21 are given the same reference characters, and descriptions of these operations are omitted.

Figure 34:
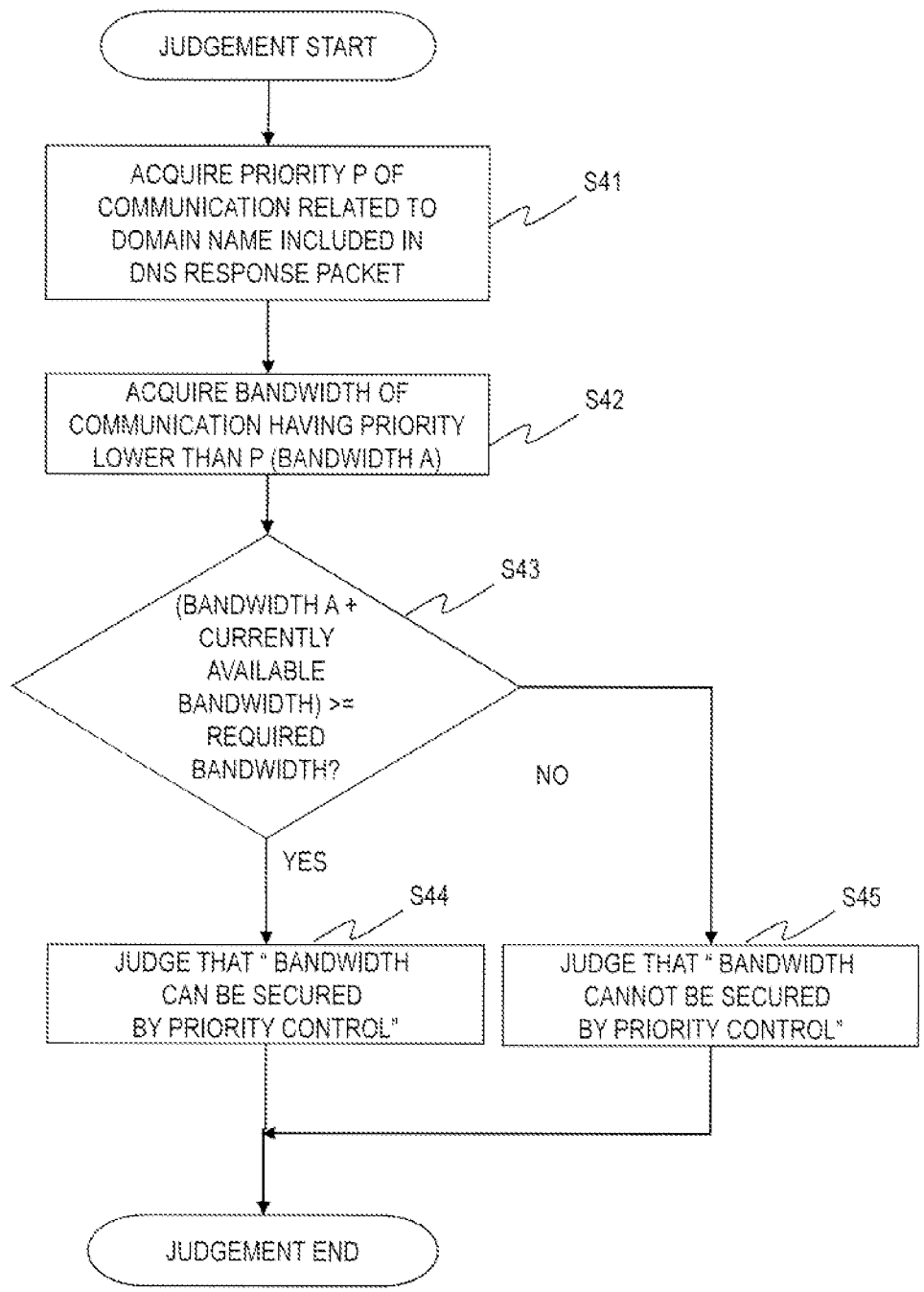
FIG. 34 is a flowchart showing detail operations of S40 in FIG. 33 conducted by the communication bandwidth control device according to the fourth embodiment of the present invention.

When the condition judging section 233 judges that it is "bandwidth insufficient", the condition judging section 233 judges whether or not the bandwidth can be secured by conducting the priority control (S40). Details of this judgment process are shown in FIG. 34. In this judgment process, first, the condition judging section 233 refers to the service information table 511, and acquires a priority P of the communication related to the domain name included in the DNS response packet (S41). For example, when the domain name included in the received DNS response packet is "zzz.ddd.tv", the condition judging section 233 acquires a priority "6" for the communication related to the domain name from the service information table 511 in FIG. 29.

Next, the condition judging section 233 refers to the QoS configuration information table 531, and obtains a communication having a priority lower than P. Then, the condition judging section 233 acquires, from the bandwidth that is currently used with the other relay apparatuses 103, a bandwidth (hereinafter, referred to as "bandwidth A") that is under use for the obtained communication (S42). For example, in a case with the QoS configuration information table 531 in FIG. 30, among the communications currently conducted in the communication paths connecting to the other relay apparatuses 103a and 103b, communications having a priority lower than the priority of "6" is the communication with a priority of "4". Therefore, in this case, the condition judging section 233 obtains "6M", which is the required bandwidth for the content with the priority of "4", as the bandwidth A.

Next, the condition judging section 233 judges whether or not the required bandwidth corresponding to the domain name included in the DNS response packet can be secured by terminating the obtained communication. More specifically, the condition judging section 233 judges whether or not the total of the bandwidth A and the currently available bandwidth is equal to or larger than the required bandwidth (S43). For example, in a case with the communication bandwidth management table 521 in FIG. 17, the currently available bandwidth of the communication path connecting to the other relay apparatuses 103a and 103b is "14M". Therefore, the condition judging section 233 judges whether or not the total "20M" of the currently available bandwidth "14M" and the bandwidth A "6M" is equal to or larger than the required bandwidth.

If the condition judging section 233 judges that the sum of the bandwidth A and the currently available bandwidth is equal to or larger than the required bandwidth (Yes at S43), the condition judging section 233 judges that "the bandwidth can be secured by conducting the priority control" (S44; Yes at S40 in FIG. 33). In this case, the priority-control section 282 terminates the communication obtained by the condition judging section 233, and frees the bandwidth A (S49). For example, if the domain name included in the DNS response packet is "zzz.ddd.tv", the relay apparatus 103 can secure the required bandwidth of "15M" by freeing the communication related to the bandwidth A (the communication of "registration No. 2" in FIG. 30). Therefore, the priority-control section 282 terminates the communication related to the bandwidth A.

When the required bandwidth is secured at S49, the bandwidth configuring section 260 conducts the "bandwidth configuration" to the QoS configuration information table 531 (S49→S38). Then, the bandwidth reserving section 281 reserves the required bandwidth (S39).

On the other hand, if the condition judging section 233 judges that the sum of the bandwidth A and the currently available bandwidth is smaller than the required bandwidth (No at S43 in FIG. 34), the condition judging section 233 judges that "the bandwidth cannot be secured by conducting the priority control" (S45; No at S40 in FIG. 33). In this case, the QoS configuring section 241 establishes a configuration to block the communication between the communication request apparatus 300a and the destination apparatus 310 based on the information included in the DNS response packet (S30). More specifically, the DNS modifying section 250 in the QoS configuring section 241 rewrites the reply IP address included in the DNS response packet to the IP address of the information provision apparatus 290, and the TTL (cache time) to 0. For example, if the domain name included in the DNS response packet is "ghi.bb.com", the required bandwidth is "25M" and the priority is "5" according to the service information table 511 in FIG. 29. In this case, the bandwidth that can be secured by having the priority-control section 282 terminate the communication with a priority of "4" is "20M" (the communication of "registration No. 2" in FIG. 30), and is less than the domain name's required bandwidth of "25M". Therefore, the priority-control section 282 does not terminate the communication with the priority of "4" (the communication of "registration No. 2" in FIG. 30), and the DNS modifying section 250 rewrites the reply IP address included in the DNS response packet to the IP address of the information provision apparatus 290, and the TTL (cache time) to 0.

As described above, according to the fourth embodiment, if it is "bandwidth insufficient", the communication bandwidth control device 203 of the present invention judges whether the bandwidth can be secured by conducting the priority control. When the bandwidth can be secured by conducting the priority control, the communication bandwidth control device 203 terminates the communication having a low priority, and secures the required bandwidth for the communication related to the domain name included in the DNS packet. When the bandwidth cannot be secured even by conducting the priority control, the communication bandwidth control device 203 does not terminate the communication having a low priority, and executes the operations shown in the first embodiment. As a result, the destination apparatus 310 can transmit, to the communication request apparatus 300, the content corresponding to the domain name having a higher priority.

The communication bandwidth control device 203 according to the fourth embodiment may be combined with the communication bandwidth control device 202 according to the third embodiment. That is, instead of the information provision apparatus 290 transmitting the "bandwidth insufficient information" to the communication request apparatus 300, the communication bandwidth control device 203 may include the application processing section 291 and the DNS modifying section 250 may rewrite the reply IP address included in the DNS response packet to the address of the relay apparatus 103.

Other than terminating the communication having a low priority, the priority-control section 282 of the fourth embodiment may conduct controls such as delaying the communication having a low priority, limiting the bandwidth of the communication having a low priority, and the like. By this means, a low priority content that cannot be fitted in the total communication bandwidth is not transmitted, resulting in the same outcome as terminating the transmission.

Fifth Embodiment

In the first to fourth embodiments, if it is "bandwidth insufficient", or if "the bandwidth cannot be secured even by conducting the priority control", the communication bandwidth control devices 200 to 203 of the present invention rewrites the reply IP address included in the DNS response packet, and transmits it to the communication request apparatus 300. In a fifth embodiment, if it is "bandwidth insufficient", a communication bandwidth control device 204 of the present invention does not rewrite the reply IP address, but separately stores the reply IP address as an unapproved address. Furthermore, when the communication request apparatus 300 transmits a communication request packet requesting a content transmission, the communication bandwidth control device 204 judges whether the destination of the communication request packet corresponds to the unapproved address. If it is judged to correspond to the unapproved address, the communication bandwidth control device 204 does not transfer the communication request packet to the destination apparatus 310. As a result, since the communication request packet does not reach the destination apparatus 310, the communication bandwidth control device 204 can prevent a content transmission from the destination apparatus 310.

A relay apparatus 104 including the communication bandwidth control device 204 according to the fifth embodiment of the present invention, and a control method of the relay apparatus 104 will be described in the following. The network configuration in the present embodiment will be described as being identical to the network configuration shown in FIG. 22. However, the relay apparatus 104 of the fourth embodiment corresponding to the relay apparatuses 102a, 102b, or 102c in FIG. 22 is referred to as the relay apparatuses 104a, 104b, or 104c.

Figure 35:
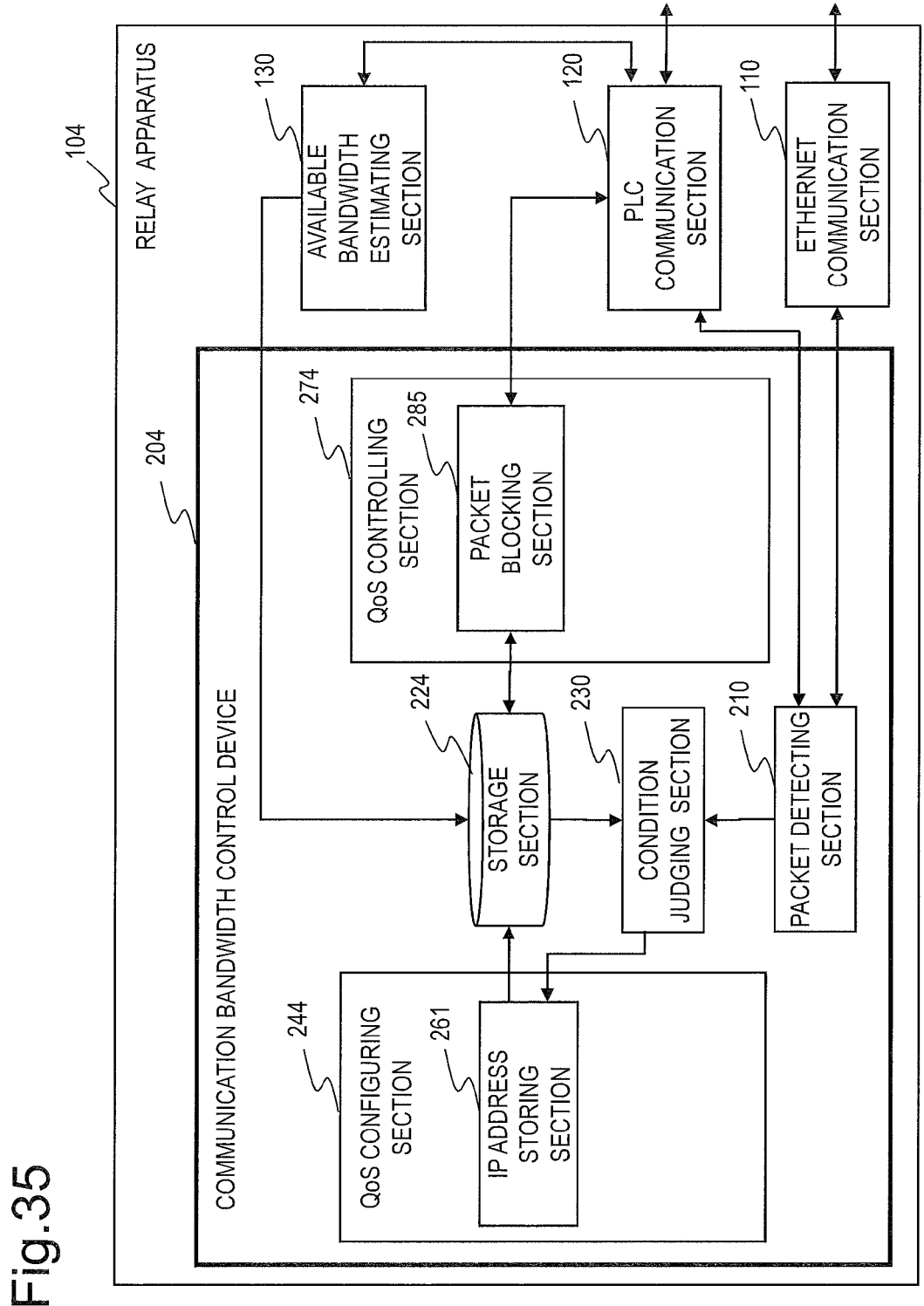
FIG. 35 shows functional blocks of a relay apparatus of a fifth embodiment of the present invention.

FIG. 35 is a diagram of an internal configuration of the relay apparatus 104 including the communication bandwidth control device 204 of the present embodiment. The relay apparatus 104 includes the Ethernet communication section 110, the PLC communication section 120, an available bandwidth estimating section 130, and the communication bandwidth control device 204. The communication bandwidth control device 204 includes the packet detecting section 210, a storage section 224, the condition judging section 230, a QoS configuring section 244, and a QoS controlling section 274. The QoS configuring section 244 includes an IP address storing section 261. The QoS controlling section 274 includes a packet blocking section 285. Here, those that have operations identical to those in the first embodiment are given the same reference characters of FIG. 3, and descriptions of those are omitted.

When compared to the storage section 220 of the first embodiment, the storage section 224 differs from that since, if the condition judging section 230 judges that it is "bandwidth insufficient", the storage section 224 stores the IP address that belongs to the destination apparatus 310 and that is included in the DNS response packet. In the following description, the IP address of the destination apparatus 310 stored in the storage section 224 is referred to as an unapproved address.

When compared to the QoS configuring section 240 of the first embodiment, the QoS configuring section 244 only differs from that by including the IP address storing section 261 instead of the DNS modifying section 250. When the condition judging section 230 judges that it is "bandwidth insufficient", the IP address storing section 261 stores the IP address that belongs to the destination apparatus 310 and that is included in the DNS response packet, as an unapproved address in the storage section 224.

When compared to the QoS controlling section 270 of the second embodiment, the QoS controlling section 274 only differs from that by including the packet blocking section 285 instead of the bandwidth reserving section 281. The packet blocking section 285 refers to the unapproved address stored in the storage section 224, and, among the communication request packets received at the PLC communication section 120 from the communication request apparatus 300, controls not to transfer, to the destination apparatus 310, those that have an unapproved address as the destination.

Figure 36:
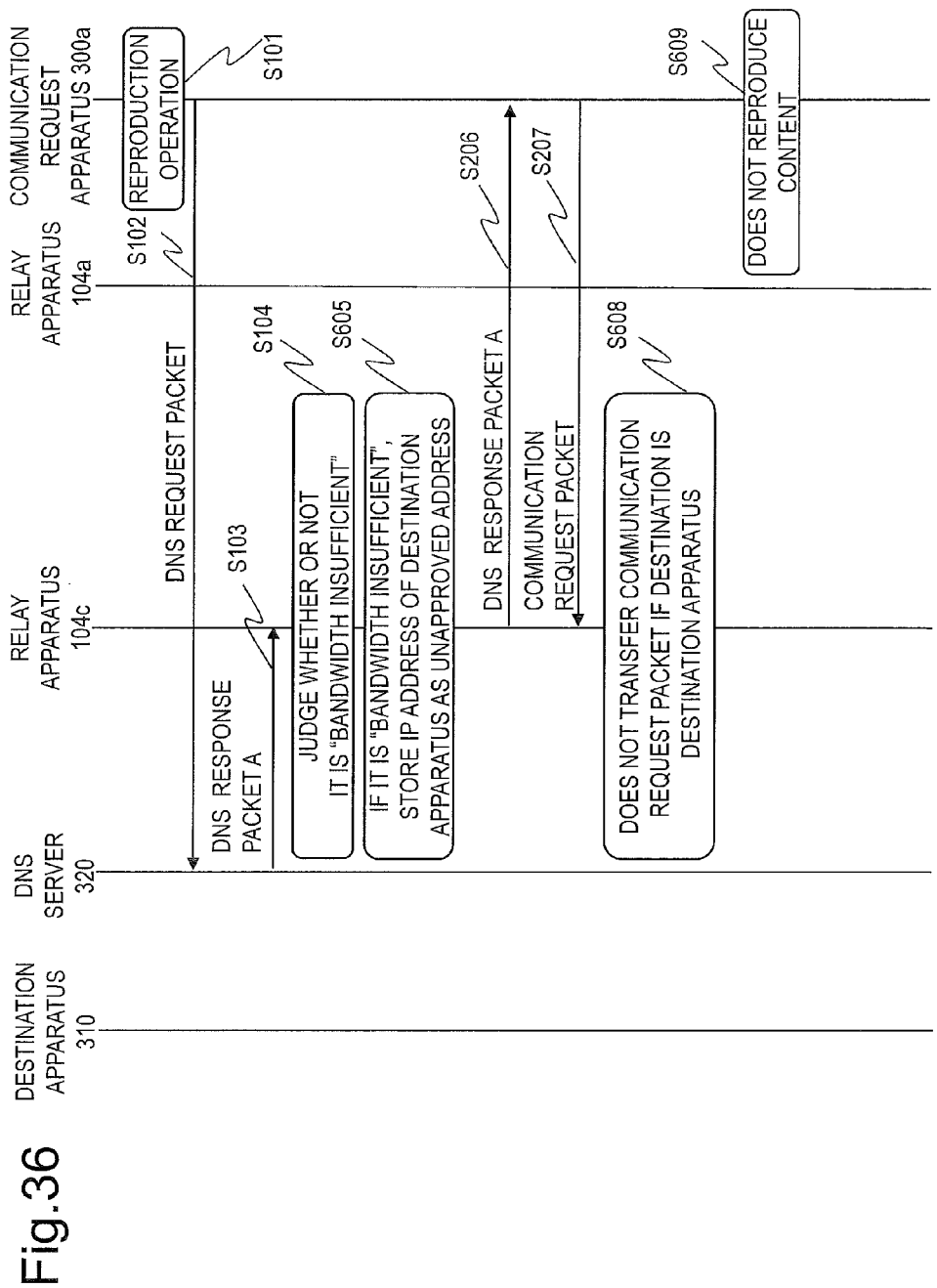
FIG. 36 shows a sequence of operations by each instrument when it is "bandwidth insufficient" in a network with the fifth embodiment of the present invention.

FIG. 36 is a sequence diagram showing operations of each of the instruments when it is "bandwidth insufficient" in the network in FIG. 22. In FIG. 36, operations identical to those in FIG. 20 are given the same reference characters, and descriptions of these operations are omitted.

If the communication bandwidth control device 204 of the relay apparatus 104c judges that it is "bandwidth insufficient", the communication bandwidth control device 204 stores the IP address that belongs to the destination apparatus 310 and that is the "reply IP address" in the DNS response packet A, as an unapproved address (S605).

Then a PLC communication section 120 of the relay apparatus 104c transmits, to the communication request apparatus 300a, the DNS response packet A without rewriting the DNS response packet A (S206).

Since the DNS response packet A has not been rewritten, the communication request apparatus 300a transmits the communication request packet in which the destination apparatus 310 is defined as the destination (S207). If the communication bandwidth control device 204 of the relay apparatus 104c receives the communication request packet, the communication bandwidth control device 204 does not transfer the communication request packet to the destination apparatus 310 since the destination in the communication request packet matches the unapproved address (S608). Since the communication request apparatus 300a does not receive the content, the communication request apparatus 300a will display an error message resulting from a time-out (S609).

Operations of S104 and S605 in FIG. 36 will be described next by using a flowchart. The present operations are similar to the operations of the communication bandwidth control device 200 of the first embodiment, i.e., the operations in FIG. 12. However, the specific operation conducted by the QoS configuring section 244 at S30 is different from that of the first embodiment. In the present embodiment, when the condition judging section 230 judges that it is "bandwidth insufficient", the IP address storing section 261 in the QoS configuring section 244 stores the IP address that belongs to the destination apparatus 310 and that is included in the DNS response packet, as an unapproved address in the storage section 224.

Figure 37:
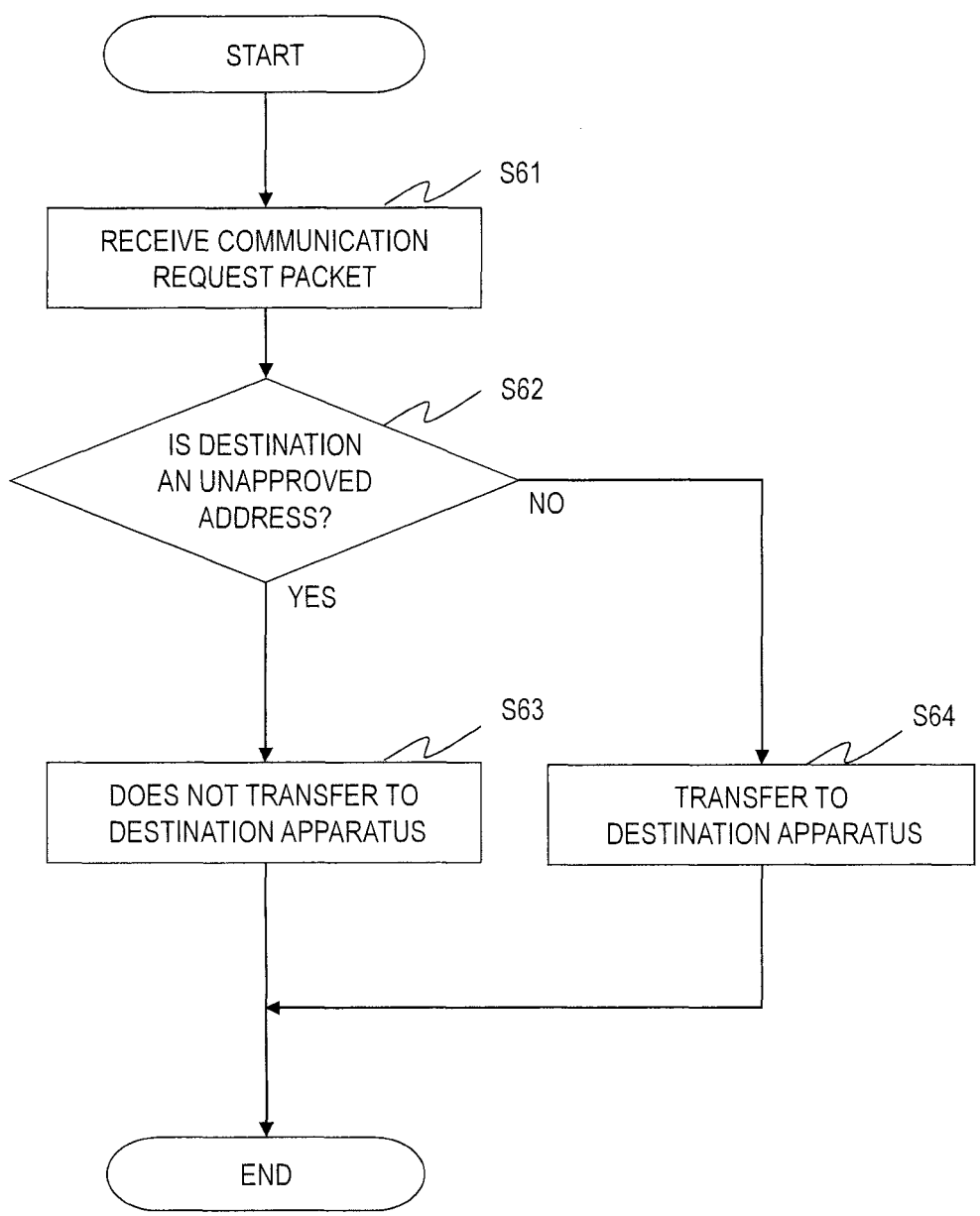
FIG. 37 is a flowchart showing operations of S608 in FIG. 36 conducted by a communication bandwidth control device according to the fifth embodiment of the present invention.

Next, FIG. 37 is a flowchart showing operations of S608 in FIG. 36. When the packet blocking section 285 of the relay apparatus 104c receives the communication request packet from the communication request apparatus 300a (S61), the packet blocking section 285 refers to a storage section 225 and judges whether or not the destination is an unapproved address (S62). If the packet blocking section 285 judges that the destination is not an unapproved address (No at S62), the packet blocking section 285 transfers the communication request packet to the destination apparatus 310 via the Ethernet communication section 110 (S64). On the other hand, if it is judged that the destination is an unapproved address, the packet blocking section 285 does not transfer the communication request packet to the destination apparatus 310 (S63).

As described above, according to the fifth embodiment, since the communication bandwidth control device 204 of the present invention does not transfer the communication request packet to the destination apparatus 310 if it is "bandwidth insufficient", the transmission of the content from the destination apparatus 310 to the communication request apparatus 300 can be prevented. As a result, a fuzzy image caused due to being "bandwidth insufficient" will not be displayed on the communication request apparatus 300a.

The communication bandwidth control device 204 of the fifth embodiment may further include the application processing section 291, and may transmit the "bandwidth insufficient information" to the communication request apparatus 300 when the communication request packet is not transferred to the destination apparatus 310. Alternatively, the information provision apparatus 290 may further be included in the network; and when the communication request packet is not transferred to the destination apparatus 310, the communication bandwidth control device 204 may transfer it to the information provision apparatus 290 and the information provision apparatus 290 may transmit the "bandwidth insufficient information" to the communication request apparatus 300. As a result, the user of the communication request apparatus 300 can understand the situation of "bandwidth insufficient", and can take the appropriate measures such as to wait until the bandwidth becomes vacant.

Besides being used alone, the communication bandwidth control device 204 of the fifth embodiment may be combined with the communication bandwidth control devices 201 and 203 of the second and fourth embodiments.

Sixth Embodiment

The communication bandwidth control device 204 according to the fifth embodiment judges whether or not it is "bandwidth insufficient" when the communication bandwidth control device 204 receives the DNS response packet. If it is judged to be "bandwidth insufficient", the communication bandwidth control device 204 stores the IP address that belongs to the destination apparatus 310 and that is included in the DNS response packet as an unapproved address. If the destination of the communication request packet is an unapproved address, the communication bandwidth control device 204 does not transfer the communication request packet to the destination apparatus 310. As a result, since the communication request packet does not reach the destination apparatus 310, the communication bandwidth control device 204 can prevent the transmission of a content from the destination apparatus 310.

On the other hand, a communication bandwidth control device 205 according to a sixth embodiment does not judge whether or not it is "bandwidth insufficient" when the communication bandwidth control device 205 receives the DNS response packet. However, the communication bandwidth control device 205 simply stores a correspondence relationship which is between the IP address of the destination apparatus 310 and the domain name of the destination apparatus 310 and which is written in the DNS response packet. If the communication request packet is transmitted, the communication bandwidth control device 205 specifies the domain name of the destination apparatus 310 from the IP address of the destination of the communication request packet, acquires the required bandwidth from the domain name of the destination apparatus 310, and judges whether or not it is "bandwidth insufficient". Then, if the communication bandwidth control device 205 judges that it is "bandwidth insufficient", the communication bandwidth control device 205 does not transfer the communication request packet to the destination apparatus 310.

A relay apparatus 105 including the communication bandwidth control device 205 according to the sixth embodiment of the present invention, and a control method of the relay apparatus 105 will be described in the following. The network configuration in the present embodiment will be described as being identical to the network configuration shown in FIG. 22. However, the relay apparatus 105 of the sixth embodiment corresponding to the relay apparatuses 102a, 102b, or 102c in FIG. 22 is referred to as the relay apparatuses 105a, 105b, or 105c.

Figure 38:
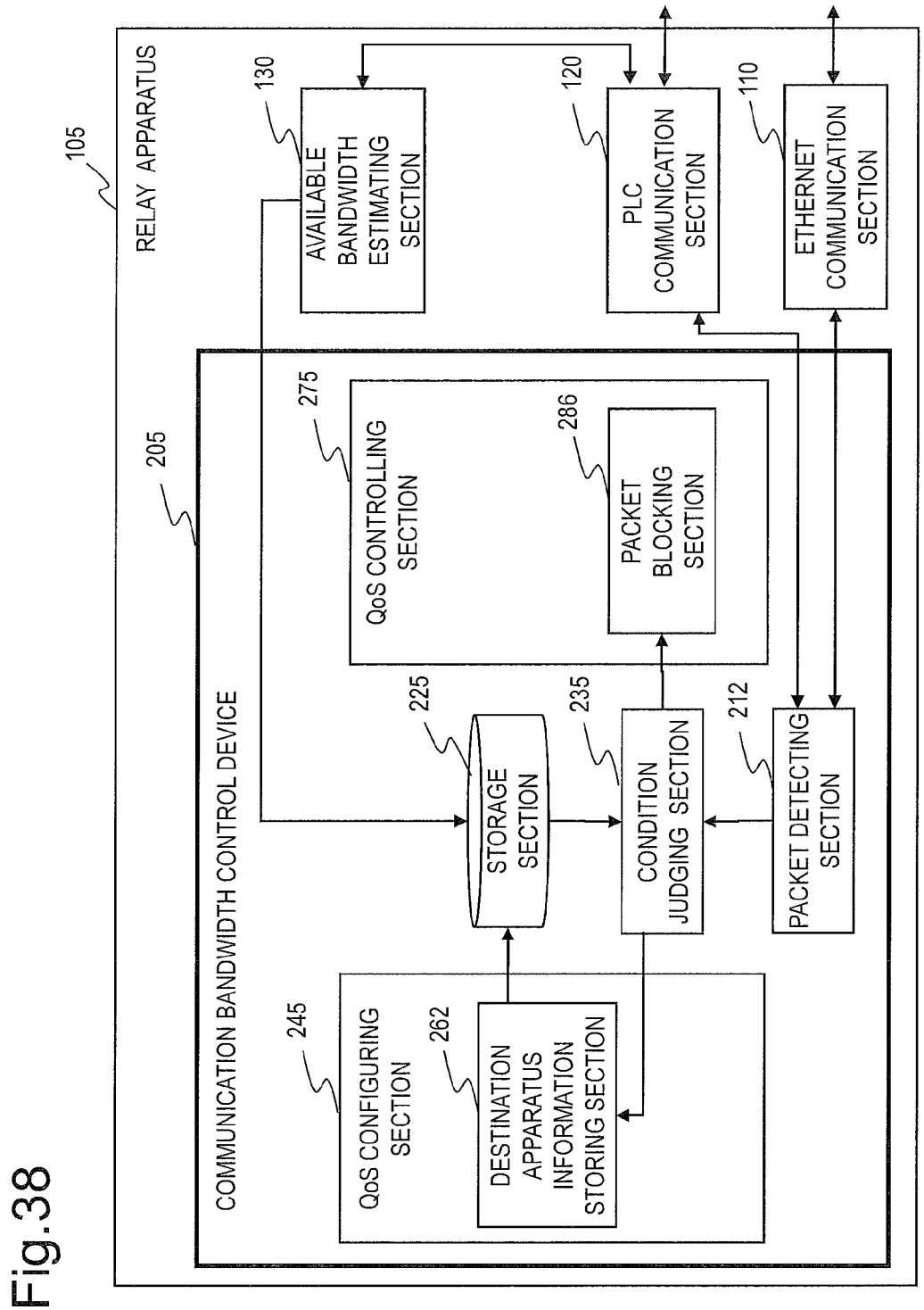
FIG. 38 shows functional blocks of a relay apparatus of a sixth embodiment of the present invention.

FIG. 38 is a diagram of an internal configuration of the relay apparatus 105 including the communication bandwidth control device 205 of the present embodiment. The relay apparatus 105 includes the Ethernet communication section 110, the PLC communication section 120, the available bandwidth estimating section 130, and the communication bandwidth control device 205. The communication bandwidth control device 205 includes the packet detecting section 212, the storage section 225, a condition judging section 235, a QoS configuring section 245, and a QoS controlling section 275. The QoS configuring section 245 includes a destination apparatus information storing section 262. The QoS controlling section 275 includes a packet blocking section 286. Here, those that have operations identical to those in the fifth embodiment are given the same reference character of FIG. 35, and descriptions of those are omitted.

In addition to the service information table 510 and the communication bandwidth management table 520, the storage section 225 further includes an apparatus management table 550 which manages a correspondence relationship between the IP address of the destination apparatus 310 and the domain name that belongs to the destination apparatus 310 and that is included in the DNS response packet. FIG. 39 shows one example of a data structure in the apparatus management table 550. In FIG. 39, the apparatus management table 550 stores the item "transmission source IP address" and the item "DNS inquiry name (domain name)" in association with one another.

Stored in the item "transmission source IP address" is the IP address that belongs to the destination apparatus 310 and that is included in the DNS response packet.

Stored in the item "DNS inquiry name (domain name)" is the domain name, which is the hostname of the destination apparatus 310 and which is included in the DNS response packet.

When compared to the QoS configuring section 240 of the first embodiment, the QoS configuring section 245 only differs from that by including the destination apparatus information storing section 262 instead of the DNS modifying section 250. When the packet detecting section 212 detects the DNS response packet, the destination apparatus information storing section 262 stores, in the apparatus management table 550 of the storage section 225, the domain name of the destination apparatus 310 and the IP address of the destination apparatus 310, which are included in the DNS response packet.

When the packet detecting section 212 detects the communication request packet, the condition judging section 235 refers to the apparatus management table 550 of the storage section 225, and specifies the domain name of the destination apparatus 310 from the IP address of the destination of the communication request packet. Then, through a process similar to that in the first embodiment, the condition judging section 230 judges whether or not it is "bandwidth insufficient".

When compared to the QoS controlling section 270 of the second embodiment, the QoS controlling section 275 only differs from that by including the packet blocking section 286 instead of the bandwidth reserving section 281. If the condition judging section 230 judges that it is "bandwidth insufficient", the packet blocking section 286 conducts a control that does not allow the transfer of the communication request packet detected by the packet detecting section 212 to the destination apparatus 310. For example, the packet blocking section 286 discards the communication request packet.

Figure 40:
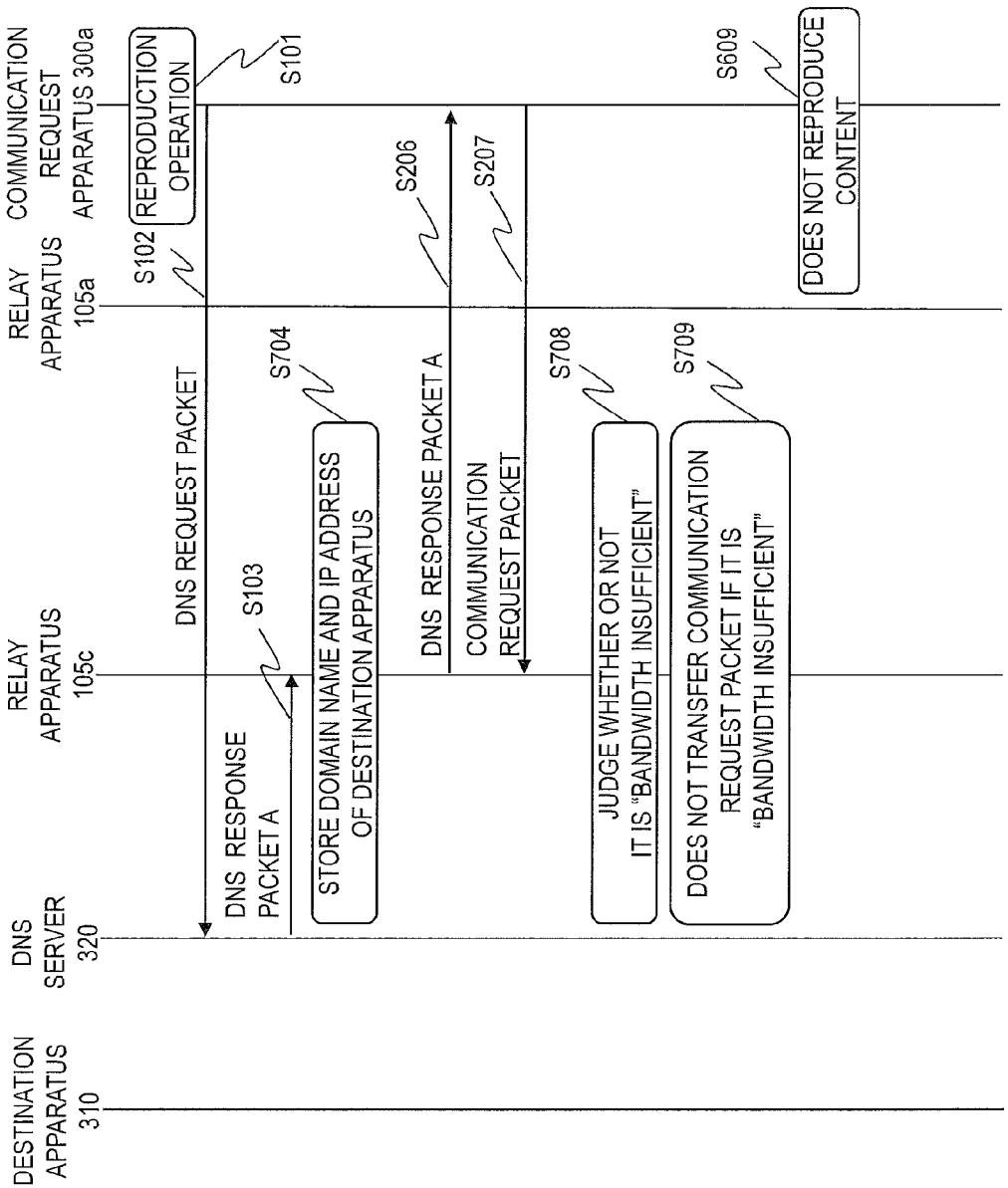
FIG. 40 shows a sequence of operations by each instrument when it is "bandwidth insufficient" in a network with the sixth embodiment of the present invention.

FIG. 40 is a sequence diagram showing operations of each of the instruments when it is "bandwidth insufficient" in the network in FIG. 22. In FIG. 40, operations identical to those in FIG. 36 are given the same reference characters, and descriptions of these operations are omitted.

When the communication bandwidth control device 205 of the relay apparatus 105c receives the DNS response packet A, the communication bandwidth control device 205 refers to the "DNS inquiry name (domain name)" and the "reply IP address" in the DNS response packet A, and stores the domain name and the IP address of the destination apparatus 310 (S704).

Then, the PLC communication section 605 of the relay apparatus 105c transmits the DNS response packet A to the communication request apparatus 300a without rewriting the DNS response packet A (S206).

Since the DNS response packet A has not been rewritten, the communication request apparatus 300a transmits the communication request packet in which the destination apparatus 310 is defined as the destination (S207). When the communication bandwidth control device 205 of the relay apparatus 105c receives the communication request packet, the communication bandwidth control device 205 judges whether or not it is "bandwidth insufficient" (S708). Then, if the communication bandwidth control device 205 judges that it is "bandwidth insufficient", the communication bandwidth control device 205 does not transfer the communication request packet to the destination apparatus 310 (S709).

FIG. 41 is a flowchart showing operations of S704 in FIG. 40 conducted by the communication bandwidth control device 205 of the relay apparatus 105c. In FIG. 41, when the packet detecting section 212 detects the DNS response packet (S10), the destination apparatus information storing section 262 judges whether the domain name included in the detected DNS response packet exists in the service information table 510 (S71). If the domain name does not exist in the service information table 510 (No at S71), the destination apparatus information storing section 262 does not conduct any processes and all the processes end. If the domain name exists in the service information table 510 (Yes at S71), the destination apparatus information storing section 262 stores the domain name and the IP address, both belonging to the destination apparatus 310 and being included in the DNS response packet, in the apparatus management table 550 of the storage section 225 (S72).

FIG. 42 is a flowchart showing operations of S708 and S709 in FIG. 40. In FIG. 42, operations identical to those in FIG. 37 are given the same reference characters, and detail descriptions of these operations are omitted. When the packet detecting section 212 of the relay apparatus 104c receives the communication request packet from the communication request apparatus 300a (S61), the condition judging section 235 refers to the apparatus management table 550, and acquires the domain name of the destination apparatus 310, which is the destination of the communication packet (S73). Then, the condition judging section 235 judges whether it will be "bandwidth insufficient" as a result of a communication with the destination apparatus 310 (S74). Since the process at S74 is a process identical at S20 in FIG. 12, detailed description of it is omitted. If the condition judging section 235 judges that it is not "bandwidth insufficient" (No at S74), the packet blocking section 286 transfers the communication request packet to the destination apparatus 310 via the Ethernet communication section 110 (S64). On the other hand, if the condition judging section 235 judges that it is "bandwidth insufficient" (Yes at S74), the packet blocking section 286 does not transfer the communication request packet to the destination apparatus 310 (S63).

As described above, when compared to the fifth embodiment, in the sixth embodiment, the communication bandwidth control device 205 of the present invention can judge whether or not it is "bandwidth insufficient" based on a network condition at a time point close to the time of the content transmission, since the communication bandwidth control device 205 judges whether or not it is "bandwidth insufficient" at a timing close to the time of content transmission.

The communication bandwidth control device 205 of the sixth embodiment may also further include the application processing section 291, and may also transmit the "bandwidth insufficient information" to the communication request apparatus 300 when the communication request packet is not transferred to the destination apparatus 310. Alternatively, the information provision apparatus 290 may further be included in the network; and when the communication request packet is not transferred to the destination apparatus 310, the communication bandwidth control device 204 may transfer it to the information provision apparatus 290 and the information provision apparatus 290 may transmit the "bandwidth insufficient information" to the communication request apparatus 300. As a result, the user of the communication request apparatus 300 can understand the situation of "bandwidth insufficient", and can take the appropriate measures such as to wait until the bandwidth becomes vacant.

Besides being used alone, the communication bandwidth control device 205 of the sixth embodiment may be combined with the communication bandwidth control devices 201 and 203 of the second and fourth embodiments.

The communication bandwidth control devices according to the first to sixth embodiment and the communication bandwidth control methods may be applied not only to power line communications but also to communications that utilize wireless communication, a telephone line, a coaxial cable, an optical cable, and the like. It may also be applied to communications such as USB (Universal Serial Bus), HDMI (High-Definition Multimedia Interface) (registered trademark), IEEE1394 and the like. Thus, the communication bandwidth control device and the communication bandwidth control method of the present invention are applicable to various transmission media.

Furthermore, the communication bandwidth control devices according to the first to sixth embodiment and the communication bandwidth control methods may be applied not only to a bridge such as PLC bridge but also to a router, a gateway, a layer 2 switch, a layer 3 switch, a layer 7 switch, and a brouter. The bridge and the layer 2 switch refer to a relay apparatus with a data link layer of the OSI (Open System Interconnection) reference type. The router refers to a relay apparatus with a network layer or a transport layer of the OSI reference type. The gateway refers to a relay apparatus with five or more layers of the OSI reference type. The layer 3 switch refers to a relay apparatus with a network layer of the OSI reference type. The layer 7 switch refers to a relay apparatus with the application layer of the OSI reference type. The brouter refers to a relay apparatus having both a router function and a bridging function. Thus, the communication bandwidth control device and the communication bandwidth control method of the present invention are applicable to not only the PLC bridge but also to various relay apparatuses.

Each functional block disclosed in each of the embodiments of the present invention may be realized as a LSI, which is an integrated circuit. Each of these functional blocks may be individually realized in a single chip; or a portion or all of these functional blocks may be realized in a single chip.

The LSI may be referred to as an IC, a system LSI, a super LSI, or an ultra LSI depending on difference in the degree of integration.

Furthermore, the method for circuit-integration is not limited to an LSI, and may be realized through circuit-integration of a dedicated circuit or a general-purpose processor. An FPGA (Field Programmable Gate Array), which is programmable after production of an LSI, and a reconfigurable processor in which the connection and the setting of a circuit cell inside the LSI are reconfigurable, may be used. Still further, a configuration may be used in which, a hardware resource includes a processor, a memory, and the like, and the processor executes and controls a control program stored in a ROM.

Furthermore, if a technology for circuit integration replacing the LSI is introduced with an advance in semiconductor technology or a derivation from other technologies, obviously, such technologies may be used for the integration of the functional block. Biotechnology or the like will be possibly applied.

INDUSTRIAL APPLICABILITY

The present invention is applicable to various communication apparatuses, such as a PLC bridge, a router, a gateway, a layer 2 switch, a layer 3 switch, a layer 7 switch, a brouter, or the like, which require a bandwidth control of communication.

DESCRIPTION OF THE REFERENCE CHARACTERS

100 to 105 relay apparatus
110 Ethernet communication section
120 PLC communication section
130 available bandwidth estimating section
131 total communication bandwidth estimating section
200 to 205 communication bandwidth control device
210, 212 packet detecting section
220, 221, 223, 224, 225 storage section
230, 233, 235 condition judging section
240 to 245 QoS configuring section
250, 252 DNS modifying section
260 bandwidth configuring section
261 IP address storing section
262 destination apparatus information storing section
270, 273, 274, 275 QoS controlling section
281 bandwidth reserving section
282 priority-control section
285, 286 packet blocking section
290 information provision apparatus
291 application processing section
300 communication request apparatus
310 destination apparatus
320 DNS server
400 Internet

The invention claimed is:

1. A communication bandwidth control device which is included in a relay apparatus and which controls a communication bandwidth of a communication processed by the relay apparatus, the relay apparatus relaying data that is transmitted and received between, a destination apparatus which is a communication partner, and a communication request apparatus which is on a communication network and which requests for communication, the communication bandwidth control device comprising:
 a packet detecting section which detects a DNS response packet transmitted by a DNS server in order to respond to an inquiry, the inquiry being sent to the DNS server by the communication request apparatus regarding an IP address corresponding to a domain name of the destination apparatus;
 a storage section which stores, a first correspondence relationship between the domain name of the destination apparatus and a required bandwidth which is determined in advance and which is necessary for the relay apparatus to communicate with another relay apparatus during communication between the destination apparatus and the communication request apparatus, and a bandwidth currently available between the relay apparatus and the other relay apparatus;
 a condition judging section, which specifies the domain name of the destination apparatus based on a communication packet generated in association with a communication request from the communication request apparatus, and which acquires the required bandwidth from the first correspondence relationship, and which judges if a first condition that the required bandwidth is larger than the bandwidth currently available is satisfied; and
 a QoS configuring section which establishes, if the first condition is satisfied, a configuration to block the communication between the communication request apparatus and the destination apparatus, based on information included in the DNS response packet, wherein
 the condition judging section specifies the domain name of the destination apparatus based on a domain name included in the DNS response packet; and
 the QoS configuring section further includes a DNS modifying section which rewrites the IP address that belongs to the destination apparatus and that is included in the DNS response packet, to a specified IP address, if the condition judging section judges that the first condition is satisfied.

2. The communication bandwidth control device according to claim 1, wherein the specified IP address is an IP address of an information provision apparatus which transmits, to the communication request apparatus, information indicating that the bandwidth currently available is insufficient.

3. The communication bandwidth control device according to claim 1, wherein:
 the specified IP address is an IP address of the relay apparatus;
 the packet detecting section further detects a communication request packet from the communication request apparatus destined to the IP address of the relay apparatus; and
 the packet detecting section further includes an application processing section that transmits, if the communication request packet is detected, to the communication request apparatus, information indicating that the bandwidth currently available is insufficient.

4. The communication bandwidth control device according to claim 1, wherein the DNS modifying section rewrites a cache time included in the DNS response packet transmitted to the communication request apparatus to 0.

5. A communication bandwidth control device which is included in a relay apparatus and which controls a communication bandwidth of a communication processed by the relay apparatus, the relay apparatus relaying data that is transmitted and received between, a destination apparatus which is a communication partner, and a communication request apparatus which is on a communication network and which requests for communication, the communication bandwidth control device comprising:
 a packet detecting section which detects a DNS response packet transmitted by a DNS server in order to respond to an inquiry, the inquiry being sent to the DNS server by the communication request apparatus regarding an IP address corresponding to a domain name of the destination apparatus;
 a storage section which stores, a first correspondence relationship between the domain name of the destination apparatus and a required bandwidth which is determined in advance and which is necessary for the relay apparatus to communicate with another relay apparatus during communication between the destination apparatus and the communication request apparatus, and a bandwidth currently available between the relay apparatus and the other relay apparatus;
 a condition judging section, which specifies the domain name of the destination apparatus based on a communication packet generated in association with a communication request from the communication request apparatus, and which acquires the required bandwidth from the first correspondence relationship, and which judges if a first condition that the required bandwidth is larger than the bandwidth currently available is satisfied; and
 a QoS configuring section which establishes, if the first condition is satisfied, a configuration to block the communication between the communication request apparatus and the destination apparatus, based on information included in the DNS response packet, wherein
 the storage section further stores, a second correspondence relationship between the domain name of the destination apparatus and a priority of communication between the destination apparatus and the communication request apparatus, and a third correspondence relationship between communication currently conducted among the relay apparatus and the other relay apparatus and a priority of the communication; and
 the condition judging section is operable to:
  obtain, if it is judged that the first condition is satisfied, from among the communication currently conducted between the relay apparatus and the other relay apparatus, communication that has a priority lower than the priority of the communication between the destination apparatus and the communication request apparatus by referencing the storage section; and
  further judge if a second condition that it is not possible to secure the required bandwidth even when the obtained communication is terminated is satisfied,
 the condition judging section specifies the domain name of the destination apparatus based on a domain name included in the DNS response packet; and
 the QoS configuring section further includes a DNS modification section which rewrites the IP address that belongs to the destination apparatus and that is included in the DNS response packet, to a specified IP address, if the condition judging section judges that the second condition is satisfied.

6. A communication bandwidth control device which is included in a relay apparatus and which controls a communication bandwidth of a communication processed by the relay apparatus, the relay apparatus relaying data that is transmitted and received between, a destination apparatus which is a communication partner, and a communication request apparatus which is on a communication network and which requests for communication, the communication bandwidth control device comprising:
  a packet detecting section which detects a DNS response packet transmitted by a DNS server in order to respond to an inquiry, the inquiry being sent to the DNS server by the communication request apparatus regarding an IP address corresponding to a domain name of the destination apparatus;
  a storage section which stores, a first correspondence relationship between the domain name of the destination apparatus and a required bandwidth which is determined in advance and which is necessary for the relay apparatus to communicate with another relay apparatus during communication between the destination apparatus and the communication request apparatus, and a bandwidth currently available between the relay apparatus and the other relay apparatus;
  a condition judging section, which specifies the domain name of the destination apparatus based on a communication packet generated in association with a communication request from the communication request apparatus, and which acquires the required bandwidth from the first correspondence relationship, and which judges if a first condition that the required bandwidth is larger than the bandwidth currently available is satisfied; and
  a QoS configuring section which establishes, if the first condition is satisfied, a configuration to block the communication between the communication request apparatus and the destination apparatus, based on information included in the DNS response packet, wherein
  the condition judging section specifies the domain name of the destination apparatus based on a domain name included in the DNS response packet;
  the storage section further stores the IP address of the destination apparatus as an unapproved address which is not approved by the relay apparatus for communication;
  the QoS configuring section includes an IP address storing section which stores, in the storage section, the IP address that belongs to the destination apparatus and that is included in the DNS response packet as the unapproved address, if the condition judging section judges that the first condition is satisfied; and
  the communication bandwidth control device further comprises a packet blocking section which does not transfer, to the destination apparatus, a communication request packet that is destined to the unapproved address stored in the storage section.

7. A communication bandwidth control device which is included in a relay apparatus and which controls a communication bandwidth of a communication processed by the relay apparatus, the relay apparatus relaying data that is transmitted and received between, a destination apparatus which is a communication partner, and a communication request apparatus which is on a communication network and which requests for communication, the communication bandwidth control device comprising:
  a packet detecting section which detects a DNS response packet transmitted by a DNS server in order to respond to an inquiry, the inquiry being sent to the DNS server by the communication request apparatus regarding an IP address corresponding to a domain name of the destination apparatus;
  a storage section which stores, a first correspondence relationship between the domain name of the destination apparatus and a required bandwidth which is determined in advance and which is necessary for the relay apparatus to communicate with another relay apparatus during communication between the destination apparatus and the communication request apparatus, and a bandwidth currently available between the relay apparatus and the other relay apparatus;
  a condition judging section, which specifies the domain name of the destination apparatus based on a communication packet generated in association with a communication request from the communication request apparatus, and which acquires the required bandwidth from the first correspondence relationship, and which judges if a first condition that the required bandwidth is larger than the bandwidth currently available is satisfied; and
  a QoS configuring section which establishes, if the first condition is satisfied, a configuration to block the communication between the communication request apparatus and the destination apparatus, based on information included in the DNS response packet, wherein
  the storage section further stores, a second correspondence relationship between the domain name of the destination apparatus and a priority of communication between the destination apparatus and the communication request apparatus, and a third correspondence relationship between communication currently conducted among the relay apparatus and the other relay apparatus and a priority of the communication; and
  the condition judging section is operable to:
    obtain, if it is judged that the first condition is satisfied, from among the communication currently conducted between the relay apparatus and the other relay apparatus, communication that has a priority lower than the priority of the communication between the destination apparatus and the communication request apparatus by referencing the storage section; and
    further judge if a second condition that it is not possible to secure the required bandwidth even when the obtained communication is terminated is satisfied,
  the condition judging section specifies the domain name of the destination apparatus based on a domain name included in the DNS response packet;
  the storage section further stores the IP address of the destination apparatus as an unapproved address which is not approved by the relay apparatus for communication;
  the QoS configuring section includes an IP address storing section which stores, in the storage section, the IP address that belongs to the destination apparatus and that is included in the DNS response packet as the unapproved address, if the condition judging section judges that the second condition is satisfied; and
  the communication bandwidth control device further comprises a packet blocking section which does not transfer, to the destination apparatus, a communication request packet that is destined to the unapproved address stored in the storage section.

8. A communication bandwidth control device which is included in a relay apparatus and which controls a communication bandwidth of a communication processed by the relay apparatus, the relay apparatus relaying data that is transmitted and received between, a destination apparatus which is a communication partner, and a communication request apparatus which is on a communication network and which requests for communication, the communication bandwidth control device comprising:

a packet detecting section which detects a DNS response packet transmitted by a DNS server in order to respond to an inquiry, the inquiry being sent to the DNS server by the communication request apparatus regarding an IP address corresponding to a domain name of the destination apparatus;

a storage section which stores, a first correspondence relationship between the domain name of the destination apparatus and a required bandwidth which is determined in advance and which is necessary for the relay apparatus to communicate with another relay apparatus during communication between the destination apparatus and the communication request apparatus, and a bandwidth currently available between the relay apparatus and the other relay apparatus;

a condition judging section, which specifies the domain name of the destination apparatus based on a communication packet generated in association with a communication request from the communication request apparatus, and which acquires the required bandwidth from the first correspondence relationship, and which judges if a first condition that the required bandwidth is larger than the bandwidth currently available is satisfied; and a QoS configuring section which establishes, if the first condition is satisfied, a configuration to block the communication between the communication request apparatus and the destination apparatus, based on information included in the DNS response packet, wherein the storage section further stores a fourth correspondence relationship between the domain name and the IP address of the destination apparatus;

the QoS configuring section includes a destination apparatus information storing section which stores, in the storage section, the domain name and the IP address, both belonging to the destination apparatus and being included in the DNS response packet, as the fourth correspondence relationship;

the packet detecting section further detects a communication request packet from the communication request apparatus destined to the destination apparatus;

the condition judging section, when the packet detecting section detects the communication request packet, references the fourth correspondence relationship, and specifies the domain name of the destination apparatus from a destination IP address in the communication request packet; and the communication bandwidth control device further comprises a packet blocking section which does not transfer the communication request packet to the destination apparatus, if the condition judging section judges that the first condition is satisfied.

9. A communication bandwidth control device which is included in a relay apparatus and which controls a communication bandwidth of a communication processed by the relay apparatus, the relay apparatus relaying data that is transmitted and received between, a destination apparatus which is a communication partner, and a communication request apparatus which is on a communication network and which requests for communication, the communication bandwidth control device comprising:

a packet detecting section which detects a DNS response packet transmitted by a DNS server in order to respond to an inquiry, the inquiry being sent to the DNS server by the communication request apparatus regarding an IP address corresponding to a domain name of the destination apparatus;

a storage section which stores, a first correspondence relationship between the domain name of the destination apparatus and a required bandwidth which is determined in advance and which is necessary for the relay apparatus to communicate with another relay apparatus during communication between the destination apparatus and the communication request apparatus, and a bandwidth currently available between the relay apparatus and the other relay apparatus;

a condition judging section, which specifies the domain name of the destination apparatus based on a communication packet generated in association with a communication request from the communication request apparatus, and which acquires the required bandwidth from the first correspondence relationship, and which judges if a first condition that the required bandwidth is larger than the bandwidth currently available is satisfied; and a QoS configuring section which establishes, if the first condition is satisfied, a configuration to block the communication between the communication request apparatus and the destination apparatus, based on information included in the DNS response packet, wherein the storage section further stores, a second correspondence relationship between the domain name of the destination apparatus and a priority of communication between the destination apparatus and the communication request apparatus, and a third correspondence relationship between communication currently conducted among the relay apparatus and the other relay apparatus and a priority of the communication; and the condition judging section is operable to:

obtain, if it is judged that the first condition is satisfied, from among the communication currently conducted between the relay apparatus and the other relay apparatus, communication that has a priority lower than the priority of the communication between the destination apparatus and the communication request apparatus by referencing the storage section; and further judge if a second condition that it is not possible to secure the required bandwidth even when the obtained communication is terminated is satisfied, the storage section further stores a fourth correspondence relationship between the domain name and the IP address of the destination apparatus;

the QoS configuring section includes a destination apparatus information storing section which stores, in the storage section, the domain name and the IP address, both belonging to the destination apparatus and being included in the DNS response packet, as the fourth correspondence relationship;

the packet detecting section further detects a communication request packet from the communication request apparatus destined to the destination apparatus;

the condition judging section, when the packet detecting section detects the communication request packet, references the fourth correspondence relationship, and specifies the domain name of the destination apparatus from a destination IP address in the communication request packet; and the communication bandwidth control device further comprises a packet blocking section which does not transfer the communication request packet to the destination apparatus, if the condition judging section judges that the second condition is satisfied.

* * * * *